US012555733B2

(12) United States Patent
Lee et al.

(10) Patent No.: US 12,555,733 B2
(45) Date of Patent: Feb. 17, 2026

(54) ARC EXTINGUISHING UNIT, INTERRUPTION UNIT, AND AIR CIRCUIT BREAKER COMPRISING SAME

(71) Applicant: LS ELECTRIC CO., LTD., Anyang-si (KR)

(72) Inventors: Kyu Ho Lee, Anyang-si (KR); Il Hyun Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 253 days.

(21) Appl. No.: 18/282,042

(22) PCT Filed: Apr. 29, 2022

(86) PCT No.: PCT/KR2022/006178

§ 371 (c)(1),
(2) Date: Sep. 14, 2023

(87) PCT Pub. No.: WO2022/240032

PCT Pub. Date: Nov. 17, 2022

(65) Prior Publication Data

US 2024/0153728 A1 May 9, 2024

(30) Foreign Application Priority Data

May 14, 2021 (KR) ........................ 10-2021-0062893
Jul. 13, 2021 (KR) ........................ 10-2021-0091734

(51) Int. Cl.
*H01H 33/08* (2006.01)
*H01H 73/04* (2006.01)
*H01H 73/18* (2006.01)

(52) U.S. Cl.
CPC ............ *H01H 73/18* (2013.01); *H01H 33/08* (2013.01); *H01H 73/04* (2013.01)

(58) Field of Classification Search
CPC ........ H01H 9/302; H01H 9/346; H01H 9/362; H01H 9/36; H01H 9/383; H01H 9/443;
(Continued)

(56) References Cited

U.S. PATENT DOCUMENTS 3,585,329 A * 6/1971 Walker .................. H01H 9/383
218/15
4,405,847 A * 9/1983 Morton .................. H01H 33/10
218/149

(Continued)

FOREIGN PATENT DOCUMENTS

CN 102005345 * 4/2011 ............... H01H 9/00
EP 2064718 B1 6/2016

(Continued)

OTHER PUBLICATIONS

Translation of CN102005345 (Original document published Apr. 6, 2011) (Year: 2011).*

(Continued)

*Primary Examiner* — William A Bolton
(74) *Attorney, Agent, or Firm* — K&L Gates LLP

(57) ABSTRACT

Disclosed are an arc extinguishing unit, a circuit breaking unit, and an air circuit breaker including the same. The present disclosure provides an arc extinguishing unit, a circuit breaking unit, and an air circuit breaker, including: side plates spaced apart from each other and disposed to face each other; a plurality of grids disposed between the side plates, spaced apart from each other, and coupled to the side plates, respectively; and a grid cover located above the grid and covering the grid, wherein the grid includes a grid leg extending downward to surround from both sides a protruding contact disposed to extend upward from a movable contact; and a first protective part formed to surround at least a portion of the grid leg at a lower portion of the grid leg.

28 Claims, 56 Drawing Sheets

(58) Field of Classification Search
CPC ...... H01H 9/44; H01H 9/46; H01H 2009/365; H01H 33/08; H01H 31/02; H01H 73/04; H01H 73/18
USPC ...... 218/43, 38, 34, 15, 22, 23, 46, 81, 103, 218/105
See application file for complete search history.

(56) References Cited

U.S. PATENT DOCUMENTS

| | | | | |
|---|---|---|---|---|
| 6,248,970 B1 * | 6/2001 | DiMarco | H01H 9/46 218/15 |
| 7,186,941 B2 * | 3/2007 | Yeon | H01H 9/36 218/15 |
| 7,674,996 B2 * | 3/2010 | Shea | H01H 9/362 335/201 |
| 8,237,074 B2 * | 8/2012 | Tetik | H01H 9/362 218/156 |
| 8,772,665 B2 * | 7/2014 | An | H01H 9/346 218/16 |
| 9,006,601 B2 * | 4/2015 | Zhou | H01H 33/08 218/148 |
| 9,530,592 B1 * | 12/2016 | Blankemeyer | H01H 9/346 |
| 9,673,004 B1 * | 6/2017 | Ruempler | H01H 9/36 |
| 10,840,047 B2 * | 11/2020 | Oh | H01H 9/32 |
| 2008/0067042 A1 | 3/2008 | Shea et al. | |
| 2013/0284702 A1 * | 10/2013 | Hamada | H01H 9/346 218/26 |
| 2022/0208488 A1 | 6/2022 | Kim | |

FOREIGN PATENT DOCUMENTS

| | | | |
|---|---|---|---|
| EP | 3236482 | A1 | 10/2017 |
| EP | 3846192 | A1 | 7/2021 |
| EP | 4117009 | A1 | 1/2023 |
| GB | 2090067 | A | 6/1982 |
| KR | 20050011921 | A | 1/2005 |
| KR | 20130133555 | A | 12/2013 |
| KR | 101352912 | B1 | 1/2014 |
| KR | 20140012034 | A | 1/2014 |
| KR | 20160019757 | A | 2/2016 |
| KR | 20180027098 | A | 3/2018 |
| WO | 2020204388 | A1 | 10/2020 |
| WO | 2022018053 | A1 | 1/2022 |

OTHER PUBLICATIONS

International Search Report for related International Application No. PCT/KR2022/006178; action dated Nov. 17, 2022; (3 pages).
Written Opinion for related International Application No. PCT/KR2022/006178; action dated Nov. 17, 2022; (5 pages).
Office Action for related Korean Application No. 10-2021-0062893; action dated Sep. 26, 2023; (6 pages).
Extended European Search Report for related European Application No. 22807680.8; action dated May 23, 2025; (16 pages).

* cited by examiner (a)

(b)

ARC EXTINGUISHING UNIT, INTERRUPTION UNIT, AND AIR CIRCUIT BREAKER COMPRISING SAME

CROSS-REFERENCE TO RELATED APPLICATION

This application is a National Stage of International Application No. PCT/KR2022/006178, filed on Apr. 29, 2022, which claims priority to and the benefit of Korean Patent Application No. 10-2021-0062893, filed on May 14, 2021, and Korean Patent Application No. 10-2021-0091734, filed Jul. 13, 2021, the disclosures of which is incorporated herein by reference in its entirety.

FIELD

The present disclosure relates to an arc extinguishing unit, a circuit breaking unit, and an air circuit breaker including the same, and more particularly, to an arc extinguishing unit, a circuit breaking unit, and an air circuit breaker including the same capable of effectively extinguishing an arc generated by breaking an electric current.

BACKGROUND

A circuit breaker refers to a device capable of allowing or blocking energization with the outside by contacting and separating fixed contacts and movable contacts. A fixed contact and a movable contact provided in the circuit breaker are respectively connected energizably to an external power source or load.

The movable contact is movably provided in the circuit breaker. The movable contact can be moved towards or away from the fixed contact. When the movable contact and the fixed contact come into contact to each other, the circuit breaker may be energizably connected to an external power source or load.

When an overcurrent or abnormal current flows in the circuit breaker, the movable contact and the fixed contact in contact are spaced apart from each other. In this case, the current energized between the movable contact and the fixed contact does not immediately disappear, but changes into an arc form and extends along the movable contact.

An arc can be defined as a flow of electrons at high temperature and high pressure. Therefore, when the generated arc stays in the inner space of the circuit breaker for a long time, there is a concern that each component of the circuit breaker may be damaged. In addition, when the arc is discharged to the outside of the circuit breaker without a separate treatment process, there is a risk of injury to the user.

Accordingly, circuit breakers are generally provided with an extinguishing device for extinguishing and discharging an arc. The generated arc passes through the extinguishing device, the arc pressure is increased, the moving speed is increased, and it is cooled at the same time and can be discharged to the outside.

Therefore, the generated arc must be quickly guided to an arc extinguishing device.

However, in the case of a direct current air circuit breaker in which a small current flows among DC air breakers, the power of the generated arc is relatively weak. In addition, in the case of direct current, because zero point does not exist in the current, there is a problem in that arc extinguishing is more difficult than that of alternating current.

In particular, since the power of the arc generated inside the DC air circuit breaker is relatively weak when a small current is broken, there is a problem in that the arc generated after the break is not moved to the grid of the arc extinguishing unit. The arc that has not been extinguished in this way stays adjacent to the movable contact and the fixed contact, causing problems such as melting the contact.

Therefore, it is necessary to consider effectively extinguishing the arc generated when the small current is broken in the DC air circuit breaker.

SUMMARY

The present disclosure is directed to providing an air circuit breaker having a structure capable of solving the above problems.

First, the present disclosure is directed to providing an air circuit breaker having a structure capable of quickly extinguishing and moving a generated arc.

In addition, the present disclosure is directed to providing an air circuit breaker having a structure in which an arc generated when a small current is broken in a direct current air circuit breaker can quickly move to a grid and be extinguished.

In addition, the present disclosure is directed to providing an air circuit breaker having a structure in which a part that forms a magnetic field associated with an arc movement path can be reduced from being damaged by an arc.

In addition, the present disclosure is directed to providing an air circuit breaker having a structure in which damage to a grid leg in relation to an arc movement path can be reduced.

In addition, the present disclosure is directed to providing an air circuit breaker having a structure capable of increasing the pressure generated when an arc is generated by reducing a space in which an arc is generated in relation to an arc movement path.

In addition, the present disclosure is directed to providing an air circuit breaker having a structure in which even when a magnet forming a magnetic field associated with an arc movement path is provided, a space occupied by the magnetic body is not excessively increased.

In order to achieve the above objects, the present disclosure provides an arc extinguishing unit, including side plates spaced apart from each other and disposed to face each other; a plurality of grids disposed between the side plates, spaced apart from each other, and coupled to the side plates, respectively; and a grid cover located above the grid and covering the grid, wherein the grid includes a grid leg extending downward to surround from both sides a protruding contact disposed to extend upward from a movable contact; and a first protective part formed to surround at least a portion of the grid leg at a lower portion of the grid leg.

In addition, the first protective part may be formed to be long along the longitudinal direction of the side plate.

In addition, the first protective part may be provided in plurality and be respectively disposed on the side plates facing each other and formed to face each other.

In addition, the first protective part may include a first surface surrounding a lower surface of the grid leg, and a second surface extending at a predetermined angle with the first surface and surrounding a side surface of the grid leg facing a grid leg disposed on the other side.

In addition, the first protective part spaced apart from each other to face each other may form an air gap between it and the protruding contact.

In addition, the first protective part may be disposed to be spaced apart from each other along the longitudinal direction to be formed long and may have an insertion groove into which the grid leg is inserted so that the grid legs respectively formed in the plurality of grids are inserted thereinto.

In addition, the first protective part may be coupled to and fixed to the side plate disposed adjacent thereto.

In addition, the arc extinguishing unit may further include an arc runner disposed on one side of the side plate and extending toward the grid by a predetermined length, wherein the first protective part may further include a mounting portion protruding downward from the arc runner and having a coupling groove into which a coupling member for coupling with the side plate can be inserted.

In addition, the arc extinguishing unit may further include a second protective part disposed below the first protective part and formed to surround at least a portion of an area where the first protective part is exposed to the outside.

In addition, the second protective part may be formed long along the longitudinal direction of the side plate and surrounding the first protective part.

In addition, the second protective part may be provided in plurality, and be formed to surround the first protective part formed to face each other by being coupled to the side plate, respectively.

In addition, the second protective part may include a gassing material that generates molecules that extinguish an arc when heat generated by the arc generated when the movable contact and the fixed contact are spaced apart is applied.

In addition, an outermost grid closest to the fixed contact among the grids may have a grid leg with a width narrower than the rest of the grids.

In addition, an outermost insertion groove for accommodating the grid leg of the outermost grid of the first protective part may be formed to correspond to the width of the grid leg of the outermost grid, and a concave region may be formed in the first protective part by being recessed in a direction toward the protruding contact of the outermost insertion groove disposed in a direction toward the fixed contact.

In addition, the first protective part may be formed to be long along the longitudinal direction of the side plate, be provided in plurality, be respectively disposed on the side plates facing each other and formed to face each other, and include a first surface surrounding a lower surface of the grid leg; and a second surface extending at a predetermined angle with the first surface and surrounding a side surface of the grid leg facing a grid leg disposed on the other side, and the second protective part may include a first portion formed to cover the first surface of the first protective part; and a second portion formed to cover the second surface of the first protective part and extending by being bent with the first portion.

In addition, the second protective part may include a third portion that is bent with the first portion, extends between the first protective part and the side plate to be coupled to the first protective part and the side plate; a fourth portion that is bent with the second portion and extends, and is formed to surround a direction away from the fixed contact of the first protective part; and a fifth portion that is bent with the fourth portion and extends between the first protective part and the side plate to be coupled to the first protective part and the side plate.

In addition, a mounting portion may be formed concave inward in the first protective part so that the third portion and the fifth portion can be inserted between the side plate and the first protective part and coupling holes may be formed in the third portion and the fifth portion so that a coupling member inserted from the outside of the side plate is inserted.

In addition, an air gap may be formed between the second protective part and the protruding contact.

In addition, in order to achieve the above objects, the present disclosure provides a circuit breaking unit, including a fixed contact terminal having a fixed contact disposed at a lower end thereof and extending upward; a movable contact terminal comprising a movable contact and configured such that the movable contact is formed to move in a direction toward the fixed contact or in a direction away from the fixed contact; a low runner disposed extending upward from the fixed contact, one end thereof coupled to the fixed contact terminal, and the other end thereof spaced apart from the fixed contact terminal; and a protruding contact disposed to extend upward from the movable contact and formed to be in contact with the low runner or spaced apart from the low runner, wherein the protruding contact is arranged to be surrounded by a grid leg that extends downward from both sides of a grid of an arc extinguishing unit.

In addition, the circuit breaking unit may further include a U assembly disposed between the low runner and the fixed contact terminal, extending away from the fixed contact terminal and toward the movable contact, and formed to surround a side of the grid leg.

In addition, the circuit breaking unit may further include a first protective part formed to surround the grid leg, configured to extend in a section corresponding to a section in which the movable contact terminal is moved, and disposed between the U assembly and the grid leg.

In addition, the U assembly may extend between the first protective parts provided in plurality and spaced apart from each other.

In addition, the U assembly may include a holder inserted between the low runner and the fixed contact terminal and protruding from both sides of the low runner; and a fixing part coupled to the holder and the fixed contact terminal at an upper side of the holder so that the holder is not separated from the fixed contact terminal.

In addition, the holder may have a space formed therein, and the U assembly may further include a U magnetic body stored in the inner space of the holder and made of a magnetic body.

In addition, the holder may include a main body surrounding a side of the grid leg; and a side wing portion formed to cover a lower surface of the grid leg.

In addition, the first protective part may include a first surface surrounding a lower surface of the grid leg, and a second surface extending at a predetermined angle with the first surface and surrounding a side surface of the grid leg facing a grid leg disposed on the other side, and the holder may include a main body surrounding the second surface of the first protective part, and a side wing portion formed to surround the first surface.

In addition, an air gap may be formed between the main body of the holder and the protruding contact.

In addition, the protruding contact may be disposed adjacent to a first protective part and a second protective part surrounding a grid leg that extends downward from both sides of a grid of an arc extinguishing unit.

In addition, the first protective part may be formed to surround the grid leg and configured to extend in a section corresponding to a section in which the movable contact terminal is moved, and the second protective part may be disposed between the first protective part and the protruding contact.

In addition, in order to achieve the above objects, the present disclosure provides an air circuit breaker, including a fixed contact terminal having a fixed contact disposed at a lower end thereof and extending upward; a movable contact terminal comprising a movable contact and configured such that the movable contact is formed to move in a direction toward the fixed contact or in a direction away from the fixed contact; a low runner disposed extending upward from the fixed contact, one end thereof coupled to the fixed contact terminal, and the other end thereof spaced apart from the fixed contact terminal; a protruding contact disposed to extend upward from the movable contact and formed to be in contact with the low runner or spaced apart from the low runner, and an arc extinguishing unit positioned adjacent to the fixed contact and the movable contact, and configured to extinguish an arc generated when the fixed contact and the movable contact are spaced apart, wherein the arc extinguishing unit includes side plates spaced apart from each other and disposed to face each other; a plurality of grids disposed between the side plates, spaced apart from each other, and coupled to the side plates, respectively; and a grid cover located above the grid and covering the grid, wherein the grid includes a grid leg extending downward to surround from both sides the protruding contact; and a first protective part formed to surround at least a portion of the grid leg at a lower portion of the grid leg.

In addition, the grid may include a second protective part disposed below the first protective part and formed to surround at least a portion of an area where the first protective part is exposed to the outside.

In addition, in order to achieve the above objects, the present disclosure provides an air circuit breaker, including a cover; an arc extinguishing unit disposed within the cover and comprising a plurality of side plates and a grid coupled between the side plates; and a circuit breaking unit disposed adjacent to the arc extinguishing unit, wherein the grid includes a grid leg extending downward to surround from both sides a protruding contact disposed to extend upward from a movable contact; and a plurality of first protective parts formed to surround at least a portion of the grid leg at a lower portion of the grid leg, wherein the circuit breaking unit includes a fixed contact terminal having a fixed contact disposed at a lower end thereof and extending upward; a movable contact terminal comprising a movable contact and configured such that the movable contact is formed to move in a direction toward the fixed contact or in a direction away from the fixed contact;

a low runner disposed extending upward from the fixed contact, one end thereof coupled to the fixed contact terminal, and the other end thereof spaced apart from the fixed contact terminal; and a protruding contact disposed to extend upward from the movable contact and formed to be in contact with the low runner or spaced apart from the low runner, and wherein the protruding contact is disposed between the plurality of first protective parts.

According to embodiments of the present disclosure, the following effects can be achieved.

According to an embodiment of the present disclosure, since the electromagnetic force received by the arc due to the magnetic field formed by the grid leg is applied to the arc in a direction directed toward the grid of the arc extinguishing unit regardless of the current flow direction of the arc, there is an advantage in that it is possible to quickly extinguish the arc regardless of the current flow direction of the arc.

In addition, according to an embodiment of the present disclosure, an arc-guided path A.P., which is to move the arc in a left or right direction depending on the current flow of the arc, is formed by a magnetic field formed by the magnet unit, so that the arc can be more quickly applied to the grid of the arc extinguishing unit.

In addition, the present disclosure provides a protruding contact and a low runner that are in contact with each other in a state in which a fixed contact and a movable contact are spaced apart in the first state of the trip state, and a protruding contact and a low runner that are spaced apart in the second state, and thus generates an arc closer to a grid when a small current breaking occurs in a DC air circuit breaker. Accordingly, there is an advantage in that the generated arc is more easily applied and extinguished through the grid.

In addition, since the first protective part surrounds the plurality of grid legs, and the second protective part surrounds the first protective part and is coupled to the side plate, the second protective part can protect the grid legs and the first protective part from a generated arc.

In addition, since the first protective part and the second protective part are disposed surrounding the grid, separation of the grid from the side plate when an arc is applied to the grid can be reduced.

In addition, since the second protective part is disposed below the first protective part to surround the two bent surfaces of the second protective part, an area of the first protective part exposed to the outside from inside the arc extinguishing unit can be minimized. Accordingly, since the direct contact between the first protective part and an arc is reduced, deterioration of the first protective part by the arc or impact caused by the arc can be reduced.

In addition, the second protective part forms an air gap between the protruding contact and the second protective part, thereby increasing the pressure in the space in which the arc is generated, thereby increasing the rising force of the generated arc.

Coupling holes and are formed in the third portion and the fifth portion of the second protective part, the coupling member coupled from the outside of the side plate of the arc extinguishing unit passes through the coupling holes, and the passed-through coupling member is coupled to the coupling grooves formed in the first protective part, and thus, there is an effect that the side plate, the second protective part, and the first protective part of the arc extinguishing unit can be firmly coupled to each other.

In addition, in the present disclosure, by forming an air gap A.G between the protruding contact and the grid leg, the second protective part or the U assembly, a pressure applied to an arc generated between the protruding contact and the low runner can be increased, and thus a force to rise can be applied to the generated arc.

A relatively narrow area of air gap A.G is formed in the area where the arc is generated, thereby reducing the space of the arc-generation area, and accordingly, a pressure applied to the generated arc is increased, so that the generated arc can be subjected to a rising force. Accordingly, the arc can be more easily applied to the grid or the grid leg and extinguished quickly.

DETAILED DESCRIPTION

Hereinafter, a circuit breaking unit and an air circuit breaker including the same according to an embodiment of the present disclosure will be described in detail with reference to the accompanying drawings.

In the following description, in order to clarify the features of the present disclosure, descriptions of some components may be omitted.

1. Term Definition

The term "energization" used in the following description means that a current or an electrical signal is transmitted between one or more members.

The term "magnet" used in the following description refers to any object capable of magnetizing a magnetic body or generating a magnetic field. In an embodiment, the magnet may be provided as a permanent magnet or an electromagnet.

The term "air circuit breaker" used in the following description refers to a circuit breaker configured to extinguish an arc using air or compressed air. It is assumed that each configuration described below is applied to an air circuit breaker.

However, each configuration described below may also be applied to an air-blast circuit breaker, a compressed air circuit breaker, a gas circuit breaker, an oil circuit breaker, a vacuum circuit breaker, and the like.

The term "magnetic field (M.F)" used in the following description means a magnetic field formed by a magnet. Alternatively, it means a magnetic field formed by a plurality of magnets disposed adjacent to each other. That is, the magnetic field (M.F) means a magnetic field formed by one magnet or a plurality of magnets.

The term "magnetic field area (M.F.A)" means an area of a magnetic field formed by a magnet or the like. In particular, it means a place where a magnetic field formed by a magnet or a magnetized magnetic body affects a section where an arc is generated.

The "arc-generation area (A.A)" means an area where an arc is generated. It means an area where arcing is likely to occur when a movable contact and a fixed contact are spaced apart, and in particular, it means an area where arcing is likely to occur when a protruding contact and a low runner are spaced apart in case there is a protruding contact.

The "arc-guided path (A.P)" means a direction of an electromagnetic force received by an arc generated by a magnet unit according to an embodiment of the present disclosure by a Lorentz force. The path of the arc may be guided by the electromagnetic force generated by the Lorentz force.

Figure 1:
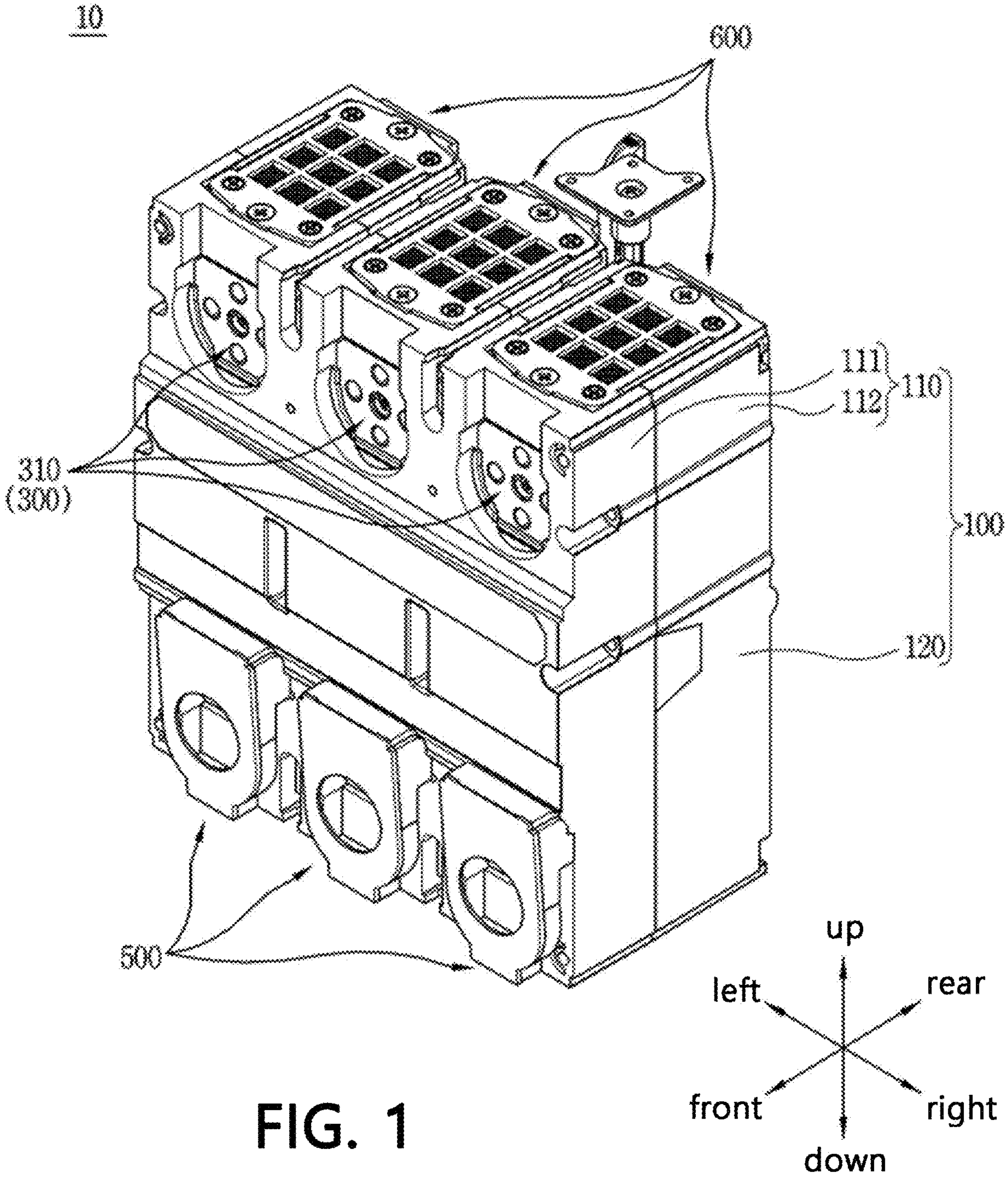
FIG. 1 is a perspective view of an air circuit breaker according to an exemplary embodiment of the present disclosure.
Figure 2:
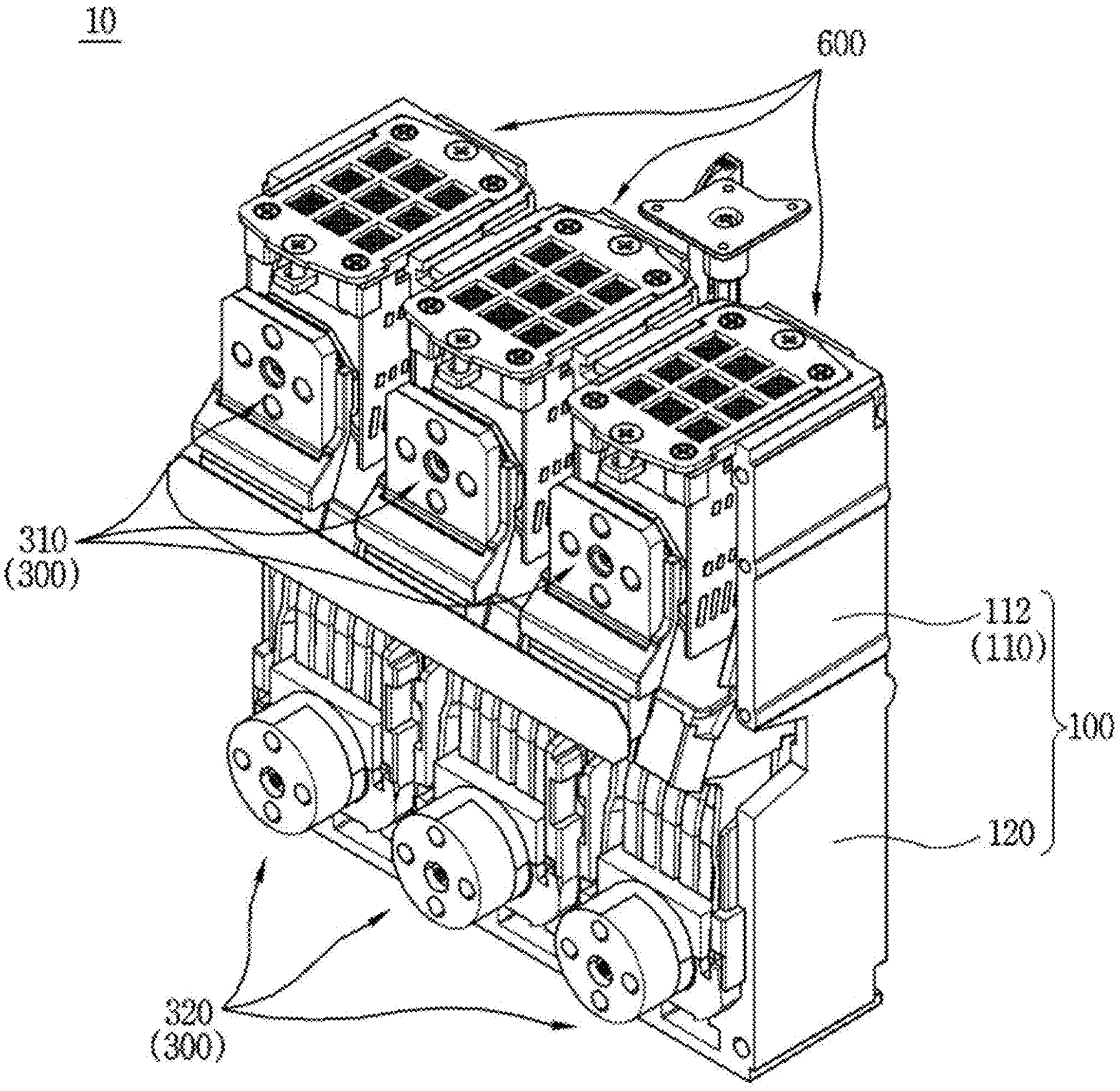
FIG. 2 is a perspective view illustrating a state in which a rear cover is removed from the air circuit breaker of FIG. 1.
Figure 3:
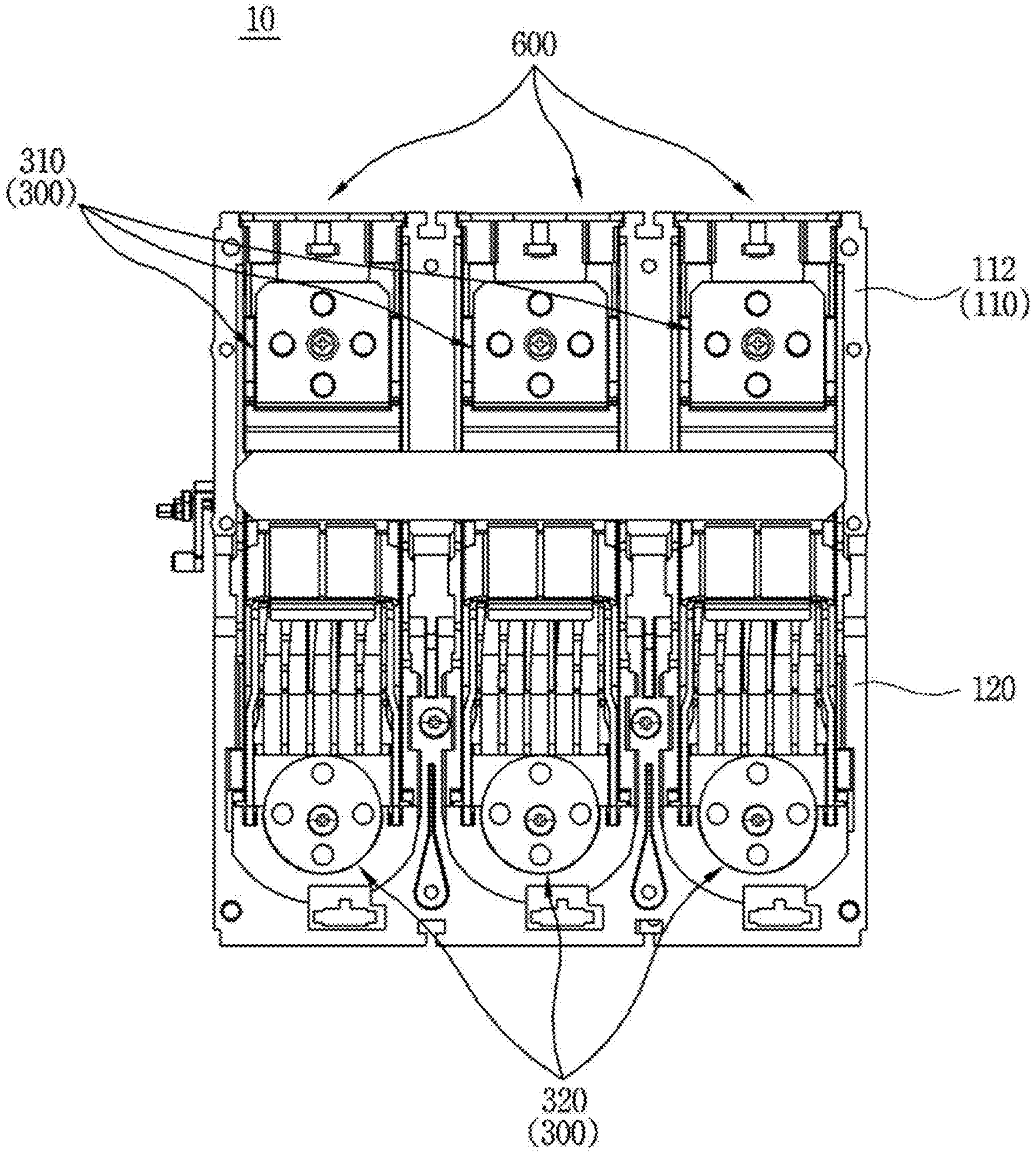
FIG. 3 is a front view illustrating a state in which a rear cover is removed from the air circuit breaker of FIG. 1.
Figure 4:
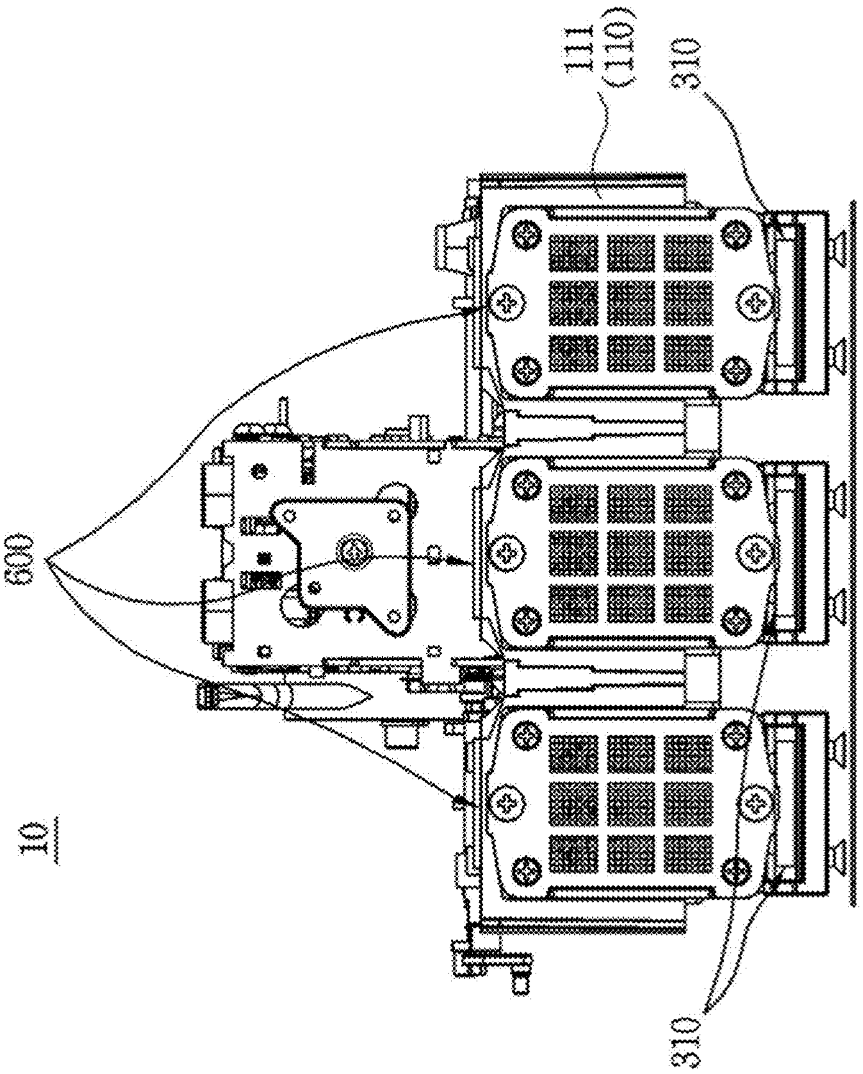
FIG. 4 is a plan view illustrating a state in which a rear cover is removed from the air circuit breaker of FIG. 1.
Figure 5:
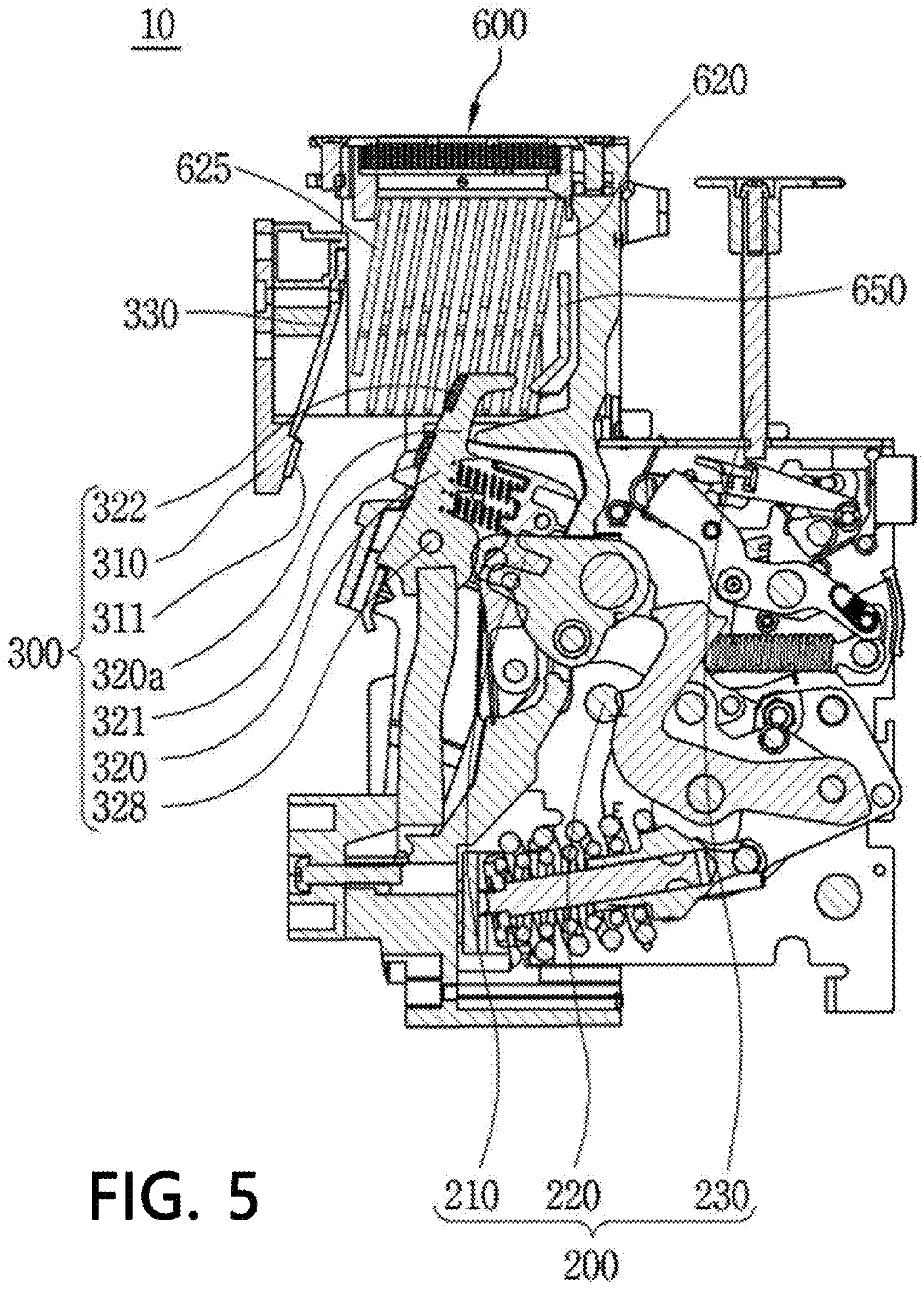
FIG. 5 is a cross-sectional view illustrating a state in which a rear cover is removed from the air circuit breaker of FIG. 1.

The terms "upper side or above", "lower side or below", "left side", "right side", "front side", and "rear side" used in the following description will be understood with reference to the coordinate system shown in FIG. 1.

2. Description of an Air Circuit Breaker 10 According to an Embodiment of the Present Disclosure Referring to FIGS. 1 to 40, the air circuit breaker 10 according to an embodiment of the present disclosure includes a cover unit 100, a driving unit 200, a circuit breaking unit 300, and an arc extinguishing unit 600.

(1) Description of the Cover Unit 100

Referring to FIGS. 1 to 5, the air circuit breaker 10 according to an embodiment of the present disclosure includes a cover unit 100.

The cover unit 100 forms the outer shape of the air circuit breaker 10. In addition, a space is formed inside the cover unit 100, and each component for operating the air circuit breaker 10 can be mounted in the space. That is, the cover unit 100 functions as a kind of housing.

The cover unit 100 may be formed of a material with high heat resistance and high rigidity. This is to prevent damage to each component mounted inside and to prevent damage caused by an arc generated inside. In an embodiment, the cover unit 100 may be formed of synthetic resin or reinforced plastic.

In the illustrated embodiment, the cover unit 100 has a quadrangular pillar shape with a height in the up and down direction. The shape of the cover unit 100 may be provided in any shape capable of mounting components for operating the air circuit breaker 10 therein.

The inner space of the cover unit 100 is energized to the outside. Each component mounted inside the cover unit 100 may be energizably connected to an external power source or load.

In the illustrated embodiment, the cover unit 100 includes an upper cover 110 and a lower cover 120.

The upper cover 110 forms the upper side of the cover unit 100. The upper cover 110 is positioned above the lower cover 120. In an embodiment, the upper cover 110 and the lower cover 120 may be integrally formed.

A space is formed inside the upper cover 110. Various components provided in the air circuit breaker 10 are mounted in the space. In an embodiment, the circuit breaking unit 300, the arc extinguishing unit 600, and the like may be mounted in the inner space of the upper cover 110.

The inner space of the upper cover 110 communicates with the inner space of the lower cover 120. Components such as the circuit breaking unit 300 may be accommodated throughout the inner space of the upper cover 110 and the inner space of the lower cover 120.

The arc extinguishing unit 600 is located on one side of the upper cover 110, i.e., on the upper surface in the illustrated embodiment. The arc extinguishing unit 600 may be partially exposed on the upper surface of the upper cover 110. The arc generated in the inner space of the upper cover 110 may pass through the arc extinguishing unit 600 and may be extinguished and discharged to the outside of the air circuit breaker 10.

On the other side of the upper cover 110, i.e., the front side in the illustrated embodiment, a fixed contact terminal 310 of the circuit breaking unit 300 is exposed. The fixed contact terminal 310 may be energizably connected to an external power source or load through the exposed portion.

In the illustrated embodiment, the upper cover 110 includes a first upper cover 111 and a second upper cover 112.

The first upper cover 111 is configured to cover one side of the upper side of the air circuit breaker 10, i.e., the front side in the illustrated embodiment. The first upper cover 111 is coupled to the second upper cover 112 by any fastening means.

An opening is formed in the first upper cover 111. The fixed contact terminal 310 may be exposed to the outside through the opening. In the illustrated embodiment, three of said openings are formed in the left-right direction.

The second upper cover 112 is configured to cover the other side of the upper side of the air circuit breaker 10, i.e., the rear side in the illustrated embodiment. The second upper cover 112 is coupled to the first upper cover 111 by any fastening means.

The lower cover 120 forms the lower side of the cover unit 100. The lower cover 120 is positioned below the upper cover 110.

A space is formed inside the lower cover 120. Various components provided in the air circuit breaker 10 are mounted in the space. In an embodiment, the driving unit 200, the circuit breaking unit 300, and the like may be mounted in the inner space of the lower cover 120.

The inner space of the lower cover 120 communicates with the inner space of the upper cover 110. Components such as the circuit breaking unit 300 may be accommodated throughout the inner space of the lower cover 120 and the inner space of the upper cover 110.

On one side of the lower cover 120, i.e., the front side in the illustrated embodiment, a movable contact terminal 320 of the circuit breaking unit 300 is located. The movable contact terminal 320 may be exposed to the outside through an opening formed in the lower cover 120. The movable contact terminal 320 may be energizably connected to an external power source or load through the exposed portion.

(2) Description of the Driving Unit 200

Referring to FIGS. 1 to 5, the air circuit breaker 10 according to an embodiment of the present disclosure includes a driving unit 200.

The driving unit 200 is rotated as the fixed contact 311 and the movable contact 321 of the circuit breaking unit 300 are spaced apart, thereby performing a trip mechanism. Accordingly, the air circuit breaker 10 may break energization with the outside, and the user can recognize that an operation to break energization has been performed.

The driving unit 200 is accommodated inside the air circuit breaker 10. Specifically, the driving unit 200 is partially accommodated in a space inside the cover unit 100. In addition, the remaining portion of the driving unit 200 is accommodated inside a case provided on one side (the rear side in the illustrated embodiment) of the cover unit 100, which is not given with reference numerals.

The driving unit 200 is connected to the circuit breaking unit 300. Specifically, a crossbar 220 of the driving unit 200 is configured to rotate together with the rotation of the movable contact terminal 320 of the circuit breaking unit 300.

Therefore, when the movable contact terminal 320 of the circuit breaking unit 300 is rotated and moved, the driving unit 200 may be rotated together. The driving unit 200 is rotatably accommodated inside the air circuit breaker 10.

In the illustrated embodiment, the driving unit 200 includes a shooter 210, a crossbar 220 and a lever 230.

The shooter 210 is rotated together as the movable contact terminal 320 of the circuit breaking unit 300 is rotated away from the fixed contact terminal 310. The shooter 210 is connected to the crossbar 220 and the lever 230.

Specifically, one end of the shooter 210 is restrained by the crossbar 220. An elastic member is provided at the other end of the shooter 210. Accordingly, in a state in which the fixed contact 311 and the movable contact 321 are in contact, the shooter 210 presses the elastic member and stores restoring force. The external force for the pressing may be provided by a state in which the crossbar 220 is rotated toward the fixed contact terminal 310.

When the movable contact 321 is spaced apart from the fixed contact 311, the movable contact terminal 320 is rotated in a direction away from the fixed contact terminal 310. Accordingly, the crossbar 220 is also rotated, and one end of the shooter 210 is released and rotated by the restoring force provided by the elastic member.

The shooter 210 is connected to the lever 230. As the shooter 210 is rotated and strikes the lever 230, the lever 230 may be also rotated, and a trip mechanism may be performed.

The crossbar 220 is connected to the movable contact terminal 320 and is rotated together as the movable contact terminal 320 is rotated. Accordingly, the shooter 210 restrained by the crossbar 220 may be released, and a trip mechanism may be performed.

The crossbar 220 may extend between the plurality of circuit breaking units 300. In the illustrated embodiment, a total of three movable contact terminals 320 of the circuit breaking unit 300 are provided and disposed in the left-right direction. The crossbar 220 may be connected through the plurality of movable contact terminals 320 disposed in the left-right direction.

The crossbar 220 contacts the one end of the shooter 210 to restrain the shooter 210. When the crossbar 220 is rotated together with the movable contact terminal 320, the crossbar 220 releases the one end of the shooter 210.

The lever 230 may be hit and rotated by the rotating shooter 210. The lever 230 may be partially exposed to the outside of the air circuit breaker 10. When the trip mechanism is performed by the circuit breaking unit 300, the lever 230 is rotated in a preset direction.

Accordingly, the user can easily recognize that the trip mechanism has been performed. In addition, the user can rotate the lever 230 to adjust the air circuit breaker 10 to a state in which it can be energized again.

The process of performing the trip mechanism by the driving unit 200 is a well-known technique, and thus a detailed description thereof will be omitted.

(3) Description of the Circuit Breaking Unit 300

Referring to FIGS. 1 to 5, the air circuit breaker 10 according to an embodiment of the present disclosure includes a circuit breaking unit 300.

The circuit breaking unit 300 includes a fixed contact terminal 310 and a movable contact terminal 320 spaced apart from each other or in contact with each other.

When the fixed contact terminal 310 and the movable contact terminal 320 are in contact with each other, the air circuit breaker 10 may be energized with an external power source or load. When the fixed contact terminal 310 and the movable contact terminal 320 are spaced apart from each other, the air circuit breaker 10 is de-energized from an external power source or load. In this case, the external power applied to the air circuit breaker 10 may be DC power. In addition, the external power applied to the air circuit breaker 10 may be a small current.

The circuit breaking unit 300 is accommodated inside the air circuit breaker 10. Specifically, the circuit breaking unit 300 is rotatably accommodated in the inner space of the cover unit 100.

The circuit breaking unit 300 may be energized with the outside. In an embodiment, current from an external power source or load may flow into any one of the fixed contact terminal 310 and the movable contact terminal 320. In addition, current may flow from the other one of the fixed contact terminal 310 and the movable contact terminal 320 to an external power source or load.

The circuit breaking unit 300 may be partially exposed to the outside of the air circuit breaker 10. Accordingly, the circuit breaking unit 300 may be energizably connected to an external power source or load through a member such as a conducting wire (not shown).

A plurality of circuit breaking units 300 may be provided. The plurality of circuit breaking units 300 may be disposed to be spaced apart from each other in one direction. A partition wall may be provided between each of the circuit breaking units 300 to prevent interference between currents energized to each of the circuit breaking units 300.

In the illustrated embodiment, three circuit breaking units 300 are provided. In addition, the three circuit breaking units 300 are disposed to be spaced apart from each other in the left-right direction of the air circuit breaker 10. The number of circuit breaking units 300 may be changed according to the amount of current flowing through the air circuit breaker 10.

In the illustrated embodiment, the circuit breaking unit 300 includes a fixed contact terminal 310 and a movable contact terminal 320.

The fixed contact terminal 310 may be in contact with or spaced apart from the movable contact terminal 320. When the movable contact terminal 310 contacts the fixed contact terminal 320, the air circuit breaker 10 may be energized with an external power source or load. When the fixed contact terminal 310 and the movable contact terminal 320 are spaced apart from each other, the air circuit breaker 10 is de-energized from an external power source or load.

The fixed contact terminal 310 extends upward and may extend toward the low runner 330 at a predetermined angle.

As can be seen from the name, the fixed contact terminal 310 is fixedly installed in the cover unit 100. Thus, the contact and separation of the fixed contact terminal 310 and the movable contact terminal 320 are achieved by the rotation of the movable contact terminal 320.

In the illustrated embodiment, the fixed contact terminal 310 is accommodated in the inner space of the upper cover 110.

The fixed contact terminal 310 may be partially exposed to the outside of the air circuit breaker 10. Through the exposed portion, the fixed contact terminal 310 may be energizably connected to an external power source or load.

In the illustrated embodiment, the fixed contact terminal 310 is exposed to the outside through an opening formed on the front side of the upper cover 110.

The fixed contact terminal 310 may be formed of a material having electrical conductivity. In an embodiment, the fixed contact terminal 310 may be formed of copper (Cu) or iron (Fe) and an alloy material including the same.

In the illustrated embodiment, the fixed contact 311 is disposed at the lower end of the fixed contact terminal 310. In addition, the fixed contact terminal 310 extends upward.

The fixed contact 311 may be in contact with or spaced apart from the movable contact 321. The fixed contact 311 is located on one side of the fixed contact terminal 310 towards the movable contact terminal 320, i.e., on the rear side in the illustrated embodiment.

The fixed contact 311 is energized with the fixed contact terminal 310. In the illustrated embodiment, the fixed contact 311 is located on the rear side of the fixed contact terminal 310. In an embodiment, the fixed contact 311 may be integrally formed with the fixed contact terminal 310.

When the fixed contact 311 and the movable contact 321 are in contact with each other, the air circuit breaker 10 is energizably connected to an external power source or load. In addition, when the fixed contact 311 is spaced apart from the movable contact 321, the air circuit breaker 10 is de-energized from an external power source or load.

A low runner 330 may extend and protrude above the fixed contact terminal 310. The low runner 330 may extend upward toward the arc extinguishing unit 600. One end of the low runner 330 is coupled to the fixed contact terminal 310 and the other end is formed to be spaced apart from the fixed contact terminal 310. That is, the low runner 330 may be formed such that the distance it is separated from the fixed contact terminal 310 increases as it goes upward.

The low runner 330 is energized with the fixed contact terminal 310. In the illustrated embodiment, the low runner 330 is located on the rear side of the fixed contact terminal 310. In an embodiment, the low runner 330 may be integrally formed with the fixed contact terminal 310.

When the fixed contact terminal 310 and the movable contact terminal 320 are in contact with each other, the low runner 330 may be energized by contact with a protruding contact 322 to be described later.

The low runner 330 may serve to guide an arc generated when the fixed contact terminal 310 and the movable contact terminal 320 are separated from each other and transfer it to a grid 620. To this end, the low runner 330 may be formed of a magnetic body having magnetism. This is to apply an attractive force to the arc, which is a flow of electrons.

In addition, as the low runner 330 and the protruding contact 322 are spaced apart from a state in which they are in contact with each other, an arc may occur between the low runner 330 and the protruding contact 322. This will be described in detail later.

The movable contact terminal 320 may be in contact with or spaced apart from the fixed contact terminal 310. It is as described above that the air circuit breaker 10 can be energized or de-energized from an external power source or load by contact and separation between the movable contact terminal 320 and the fixed contact terminal 310.

The movable contact terminal 320 may include an extension portion 320*a* in which the movable contact 321 is disposed and at least a portion thereof extends upward. Specifically, referring to the drawings, at least a portion of the movable contact terminal 320 may extend upward. The protruding contact 322 may be disposed on the extension portion 320*a*.

The movable contact terminal 320 is rotatably installed in the inner space of the cover unit 100. The movable contact terminal 320 may be rotated in a direction toward the fixed contact terminal 310 and in a direction away from the fixed contact terminal 310.

In the illustrated embodiment, the movable contact terminal 320 is accommodated in the inner spaces of the upper cover 110 and the lower cover 120. It is as described above that the inner spaces of the upper cover 110 and the lower cover 120 may communicate with each other.

The movable contact terminal 320 may be partially exposed to the outside of the air circuit breaker 10. Through the exposed portion, the movable contact terminal 320 may be energizably connected to an external power source or load.

In the illustrated embodiment, the movable contact terminal 320 is exposed to the outside through an opening formed on the front side of the lower cover 120.

The movable contact terminal 320 may be formed of a material having electrical conductivity. In an embodiment, the movable contact terminal 320 may be formed of copper or iron and an alloy material including the same.

The movable contact terminal 320 is connected to the driving unit 200. Specifically, the movable contact terminal 320 is connected to the crossbar 220 of the driving unit 200. In an embodiment, the crossbar 220 may be coupled through the movable contact terminal 320.

When the movable contact terminal 320 is rotated, the crossbar 220 may also be rotated. Accordingly, it is as described above that the driving unit 200 is operated, and the trip mechanism can be performed.

In the illustrated embodiment, the movable contact terminal 320 includes a movable contact 321 and a rotation shaft 328.

The movable contact 321 may be in contact with or spaced apart from the fixed contact 311. The movable contact 321 is located on one side of the movable contact terminal 320 towards the fixed contact terminal 310, i.e., on the front side in the illustrated embodiment.

The movable contact 321 may be rotated together with the movable contact terminal 320. When the movable contact terminal 320 is rotated toward the fixed contact terminal 310, the movable contact 321 may also be rotated toward the fixed contact 311 to contact the fixed contact 311.

In addition, when the movable contact terminal 320 is rotated in a direction away from the fixed contact terminal 310, the movable contact 321 may also be spaced apart from the fixed contact 311.

The movable contact 321 is energized with the movable contact terminal 320. In the illustrated embodiment, the movable contact 321 is located on the front side of the movable contact terminal 320. In an embodiment, the movable contact 321 may be integrally formed with the movable contact terminal 320.

It is as described above that the air circuit breaker 10 is energized with or de-energized from an external power source or load by contact and separation between the movable contact 321 and the fixed contact 311.

When the fixed contact 311 and the movable contact 321 are spaced apart from each other in a state in which the fixed contact 311 and the movable contact 321 are brought into contact with each other and are energized, an arc is generated. The air circuit breaker 10 according to an embodiment of the present disclosure includes various components for effectively forming a path of an arc generated. This will be described later in detail.

The rotation shaft 328 is a portion where the movable contact terminal 320 is rotatably coupled to the cover unit 100. The movable contact terminal 320 may be rotated in a direction toward the fixed contact terminal 310 or in a direction away from the fixed contact terminal 310 about the rotation shaft 328.

The rotation shaft 328 is located on the other side of the movable contact terminal 320 opposite to the fixed contact terminal 310, i.e., on the rear side in the illustrated embodiment.

(4) Description of the Arc Extinguishing Unit 600

Referring to FIGS. 6 to 10, the air circuit breaker 10 according to an embodiment of the present disclosure includes an arc extinguishing unit 600.

The arc extinguishing unit 600 is configured to extinguish an arc generated when the fixed contact 311 and the movable contact 321 are spaced apart. The generated arc may pass through the arc extinguishing unit 600 and be discharged to the outside of the air circuit breaker 10 after being extinguished and cooled.

The arc extinguishing unit 600 is coupled to the cover unit 100. One side of the arc extinguishing unit 600 for arc discharge may be exposed to the outside of the cover unit 100. In the illustrated embodiment, the upper side of the arc extinguishing unit 600 is exposed to the outside of the cover unit 100.

The arc extinguishing unit 600 is partially accommodated in the cover unit 100. The remaining portion of the arc extinguishing unit 600 except for the portion exposed to the outside may be accommodated in the inner space of the cover unit 100. In the illustrated embodiment, the arc extinguishing unit 600 is partially accommodated on the upper side of the upper cover 110.

The arrangement may be changed according to the position of the fixed contact 311 and the movable contact 312. That is, the arc extinguishing unit 600 may be positioned adjacent to the fixed contact 311 and the movable contact 312. Accordingly, an arc extending along the movable contact 312 rotated away from the fixed contact 311 may easily enter the arc extinguishing unit 600.

A plurality of arc extinguishing units 600 may be provided. The plurality of arc extinguishing units 600 may be disposed to be physically and electrically spaced apart from each other. In the illustrated embodiment, three arc extinguishing units 600 are provided.

That is, each arc extinguishing unit 600 is positioned adjacent to each fixed contact 311 and movable contact 321. In the illustrated embodiment, each arc extinguishing unit 600 is positioned adjacent to the upper side of each fixed contact 311 and movable contact 321.

The arc extinguishing units 600 may be disposed adjacent to each other. In the illustrated embodiment, the three arc extinguishing units 600 are disposed side by side in the left-right direction of the air circuit breaker 10.

In the illustrated embodiment, the arc extinguishing unit 600 includes a side plate 610, a grid 620, a grid cover 630, and an arc runner 650.

Side plates 610 form both sides of arc extinguishing unit 600, i.e., right and left in the illustrated embodiment. The side plate 610 is coupled to each component of the arc extinguishing unit 600 and supports the components.

Specifically, the side plate 610 is coupled to the grid 620, the grid cover 630, and the arc runner 650.

A plurality of side plates 610 are provided. The plurality of side plates 610 may be spaced apart from each other and disposed to face each other. In the illustrated embodiment, two side plates 610 are provided, forming the right and left sides of the arc extinguishing unit 600, respectively.

The side plate 610 may be formed of an insulating material. This is to prevent the generated arc from flowing toward the side plate 610.

The side plate 610 may be formed of a heat-resistant material. This is to prevent damage or shape deformation by the generated arc.

A plurality of through holes are formed in the side plate 610. The grid 620 and the arc runner 650 may be inserted and coupled to some of the through holes. In addition, fastening members for fastening the grid cover 630 to the side plate 610 may be coupled through some of the other through holes.

In the illustrated embodiment, the side plate 610 is provided in a plate shape having a plurality of edges formed at vertices. The side plate 610 may be provided in any shape capable of forming both sides of the arc extinguishing unit 600 and supporting each component of the arc extinguishing unit 600.

The side plate 610 is coupled to the grid 620. Specifically, insertion protrusions provided at opposite sides of the grid 620, i.e., the right end and the left end in the illustrated embodiment, are inserted into and coupled to some of the through holes of the side plate 610.

The side plate 610 is coupled to the grid cover 630. Specifically, the grid cover 630 is coupled to the upper side of the side plate 610. The above coupling may be achieved by a fitting coupling between the side plate 610 and the grid cover 630 or by a separate fastening member.

The side plate 610 is coupled to the arc runner 650. Specifically, the arc runner 650 is coupled to the rear side of the side plate 610, that is, to one side opposite to the fixed contact 311. The above coupling may be achieved by a separate fastening member.

The grid 620 guides an arc generated when the fixed contact 311 and the movable contact 321 are spaced apart to the arc extinguishing unit 600.

The grid 620 may be formed of a material having magnetism. This is to apply an attractive force to the arc, which is a flow of electrons.

A plurality of grids 620 may be provided. The plurality of grids 620 may be spaced apart from each other and stacked. In the illustrated embodiment, a plurality of grids 620 are provided and stacked in the front-rear direction.

The number of grids 620 may be changed. Specifically, the number of grids 620 may be changed according to the size and performance of the arc extinguishing unit 600, or the rated capacity of the air circuit breaker 10 in which the arc extinguishing unit 600 is provided, or the like.

An introduced arc may be subdivided and flowed through a space formed by the plurality of grids 620 being spaced apart from each other. Accordingly, the pressure of the arc may be increased, and the moving speed and the extinguishing speed of the arc may be increased.

The arc runner 650 is positioned adjacent to the grid 620 furthest from the fixed contact 311 among the plurality of grids 620, i.e., the grid 620 on the rear side in the illustrated embodiment.

An end of the grid 620 in the width direction, i.e., left-right direction in the illustrated embodiment, may be formed to protrude toward the fixed contact 311, that is, toward the lower side. That is, the grid 620 is formed in a peak shape with left and right ends pointing downward.

Accordingly, the generated arc may effectively proceed toward the end of the grid 620 in the left-right direction, and may easily flow to the arc extinguishing unit 600.

The grid 620 is coupled to the side plate 610. Specifically, a plurality of coupling protrusions are formed at the edges of the grid 620 in the width direction, i.e., the left-right direction in the illustrated embodiment, in the extension direction, i.e., the up and down direction in the illustrated embodiment. The coupling protrusions of the grid 620 are inserted into and coupled to the through holes formed in the side plate 610.

One side of the grid 620 facing the grid cover 630, i.e., the upper end in the illustrated embodiment, may be positioned adjacent to the grid cover 630. The arc flowing along the grid 620 may pass through the grid cover 630 and be discharged to the outside.

The grid cover 630 forms the upper side of the arc extinguishing unit 600. The grid cover 630 is configured to cover the upper end of the grid 620. The arc passing through the space formed by the plurality of grids 620 spaced apart from each other may be discharged to the outside of the air circuit breaker 10 through the grid cover 630.

The grid cover 630 is coupled to the side plate 610. A protrusion inserted into the through hole of the side plate 610 may be formed at an edge of the grid cover 630 in the width direction, i.e., the left-right direction in the illustrated embodiment. In addition, the grid cover 630 and the side plate 610 may be coupled by a separate fastening member.

The grid 620 is coupled to the side plate 610. Specifically, a plurality of coupling protrusions are formed at the edges of the grid 620 in the width direction, i.e., the left-right direction in the illustrated embodiment, in the extension direction, i.e., the up and down direction in the illustrated embodiment. The coupling protrusions of the grid 620 are inserted into and coupled to the through holes formed in the side plate 610.

One side of the grid 620 facing the grid cover 630, i.e., the upper end in the illustrated embodiment, may be positioned adjacent to the grid cover 630. The arc flowing along the grid 620 may pass through the grid cover 630 and be discharged to the outside.

The grid cover 630 forms the upper side of the arc extinguishing unit 600. The grid cover 630 is configured to cover the upper end of the grid 620. The arc passing through the space formed by the plurality of grids 620 spaced apart from each other may be discharged to the outside of the air circuit breaker 10 through the grid cover 630.

The grid cover 630 is coupled to the side plate 610. A protrusion inserted into the through hole of the side plate 610 may be formed at an edge of the grid cover 630 in the width direction, i.e., the left-right direction in the illustrated embodiment. In addition, the grid cover 630 and the side plate 610 may be coupled by a separate fastening member.

The grid cover 630 is formed to extend in one direction, i.e., in the front-rear direction in the illustrated embodiment. It will be understood that the above direction is the same as the direction in which the plurality of grids 620 are stacked.

The length of the grid cover 630 in the other direction, i.e., the width direction in the illustrated embodiment, may be determined according to the length of the plurality of grids 620 in the width direction.

In the illustrated embodiment, the grid cover 630 includes a cover body 631, an upper frame 632, a mesh part 633, and a circuit breaking plate (not shown).

The cover body 631 forms the outer shape of the grid cover 630. The cover body 631 is coupled to the side plate 610. In addition, the upper frame 632 is coupled to the cover body 631.

A predetermined space is formed inside the cover body 631. The space may be covered by the upper frame 632. The mesh part 633 and the circuit breaking plate are accommodated in the space. Accordingly, the space may be referred to as an “accommodation space”.

The accommodation space communicates with a space formed by spacing the grids 620 apart. As a result, the accommodation space communicates with the inner space of the cover unit 100. Accordingly, the generated arc can flow into the accommodation space of the cover body 631 by passing through the space formed by the separation of the grids 620.

An upper end of the grid 620 may be in contact with one side of the cover body 631 facing the grid 620, i.e., the lower side in the illustrated embodiment. In an embodiment, the cover body 631 may support the upper end of the grid 620.

The cover body 631 may be formed of an insulating material. This is to prevent distortion of the magnetic field for forming an arc-guided path A.P.

The cover body 631 may be formed of a heat-resistant material. This is to prevent damage or shape deformation by the generated arc.

In the illustrated embodiment, the length of the cover body 631 in the front-rear direction is longer than the length in the left-right direction. The shape of the cover body 631 may be changed according to the shape of the side plate 610 and the shape and number of the grids 620.

The upper frame 632 is coupled to one side of the cover body 631 opposite to the grid 620, i.e., the upper side in the illustrated embodiment.

The upper frame 632 is coupled to the upper side of the cover body 631. The upper frame 632 is configured to cover the accommodation space formed in the cover body 631, the mesh part 633 accommodated in the accommodation space, and the circuit breaking plate.

In the illustrated embodiment, the length of the upper frame 632 in the front-rear direction is longer than the length in the left-right direction. The upper frame 632 may be provided in an arbitrary shape capable of stably being coupled to the upper side of the cover body 631 and covering the accommodation space and components accommodated in the accommodation space.

A plurality of through holes are formed in the upper frame 632. Through the through hole, an arc passing between the grids 620 and extinguished may be discharged. In the illustrated embodiment, three through-holes are provided in three rows in the front-rear direction, three in the left-right direction, and a total of nine through holes are formed. The number of through holes may be changed.

The through holes are located to be spaced apart from each other. A kind of rib is formed between the through holes. The rib may press the mesh part 633 accommodated in the space of the cover body 631, and the circuit breaking plate from the upper side.

Accordingly, even though an arc is generated, the mesh part 633 and the circuit breaking plate do not arbitrarily move away from the accommodation space of the cover body 631.

The upper frame 632 may be fixedly coupled to an upper side of the cover body 631. In the illustrated embodiment, the upper frame 632 is fixedly coupled to the upper side of the cover body 631 by a fastening member.

The mesh part 633 and the circuit breaking plate are positioned in the accommodation space of the cover body 631 between the upper frame 632 and the cover body 631, that is, in the lower side of the upper frame 632. In other words, the mesh part 633 and the circuit breaking plate are stacked from an upper side to a lower side in the accommodation space of the cover body 631.

The mesh part 633 passes through a space formed between the grids 620 and serves to filter out impurities remaining in the extinguished arc. The extinguished arc may pass through the mesh part 633 and be discharged to the outside after remaining impurities are removed. That is, the mesh part 633 functions as a kind of filter.

The mesh part 633 includes a plurality of through holes. It is preferable that the size, that is, the diameter of the through hole is smaller than the diameter of the impurity particles remaining in the arc. In addition, it is preferable that the diameter of the through hole is sufficiently large so that the gas included in the arc can pass through.

A plurality of mesh parts 633 may be provided. The plurality of mesh parts 633 may be stacked in the up and down direction. Accordingly, impurities remaining in the arc passing through the mesh part 633 can be effectively removed.

The mesh part 633 is accommodated in the accommodation space formed inside the cover body 631. The shape of the mesh part 633 may be determined according to the shape of the accommodation space.

The mesh part 633 is located below the upper frame 632. The plurality of through holes formed in the mesh part 633 communicate with the plurality of through holes formed in the upper frame 632. Accordingly, the arc passing through the mesh part 633 may pass through the upper frame 632 and be discharged to the outside.

The plurality of through holes formed in the mesh part 633 communicate with a space in which the grids 620 are spaced apart. As a result, the plurality of through holes formed in the mesh part 633 communicate with the inner space of the cover unit 100.

The circuit breaking plate is positioned below the mesh part 633. The circuit breaking plate provides a passage for the arc passing through the space formed between the grids 620 to flow toward the mesh part 633. The circuit breaking plate is accommodated in the accommodation space of the cover body 631. The circuit breaking plate is located at the lowermost side of the accommodation space of the cover body 631.

In the illustrated embodiment, the circuit breaking plate is formed to have a rectangular cross-section in which the length in the front-rear direction is longer than the length in the left-right direction. The shape of the circuit breaking plate may be changed according to the shape of the cross-section of the accommodation space of the cover body 631.

The grid 620 is positioned below the circuit breaking plate. In an embodiment, the upper end of the grid 620, i.e., one end of the grid 620 facing the circuit breaking plate, may be in contact with the circuit breaking plate. The circuit breaking plate includes a through hole (not shown).

The through hole is a passage through which an arc passing through a space formed by spacing the plurality of grids 620 from each other flows into the accommodation space of the cover body 631. The through hole is formed through in a direction perpendicular to the circuit breaking plate, i.e., in the up and down direction in the illustrated embodiment.

A plurality of through holes may be formed. The plurality of through holes may be disposed to be spaced apart from each other.

The arc runner 650 is located on one side of the side plate 610 facing the fixed contact 311 and the movable contact 321. In the illustrated embodiment, the arc runner 650 is located on the lower side of the side plate 610.

The arc runner 650 is located on the other side of the side plate 610 opposite to the fixed contact 311. Specifically, the arc runner 650 is located on the rear side in the lower side of the side plate 610 so as to be opposite to the fixed contact 311 located on the front side of the side plate 610.

The arc runner 650 is coupled to the side plate 610. The coupling may be formed by inserting a protrusion formed at an end of the arc runner 650 in the left-right direction into a through hole formed in the side plate 610.

The arc runner 650 may be formed of a conductive material. This is to guide the arc effectively by applying an attractive force to the flowing arc. In an embodiment, the arc runner 650 may be formed of copper, iron, or an alloy including the same.

The arc runner 650 extends toward the grid 620 by a predetermined length. In an embodiment, the arc runner 650 may be disposed to cover the grid 620 located farthest from the fixed contact 311, i.e., the grid 620 located at the rearmost side in the illustrated embodiment, from the rear side.

Accordingly, since the arc does not extend beyond the grid 620 located at the rearmost side, damage to the cover unit 100 can be prevented. Also, the generated arc can be effectively guided toward the grid 620.

(5) Description of the Protruding Contact 322

Referring to FIGS. 11 to 15, the circuit breaking unit 300 according to an embodiment of the present disclosure may further include a protruding contact 322.

The protruding contact 322 may be disposed on the extension portion **320*a* to be spaced apart from the movable contact 321. That is, the protruding contact 322 is spaced apart from the movable contact 321 along the extension portion 320*a* and disposed above the movable contact 321. In this case, the protruding contact 322 may be disposed to contact the low runner 330 while the movable contact 321 is in contact with the fixed contact 311**.

As the protruding contact 322 and the low runner 330 are in contact with each other, and thus, there may be energized between the protruding contact 322 and the low runner 330.

And, when the movable contact terminal 320 is tripped, the protruding contact 322 and the low runner 330 are also spaced apart from each other, and during this process, an arc may be generated between the protruding contact 322 and the low runner 330.

The protruding contact 322 is disposed extending from at least one of the plurality of movable contacts 321.

For example, the protruding contact 322 may be formed by protruding the middle three of the five movable contacts 321, or by protruding the first, third, and fifth movable contacts 321, or by protruding the second, fourth movable contacts 321. Alternatively, in a case different from the case described above, the protruding contact 322 may be formed extending from at least one of the movable contacts 321.

Figure 11:
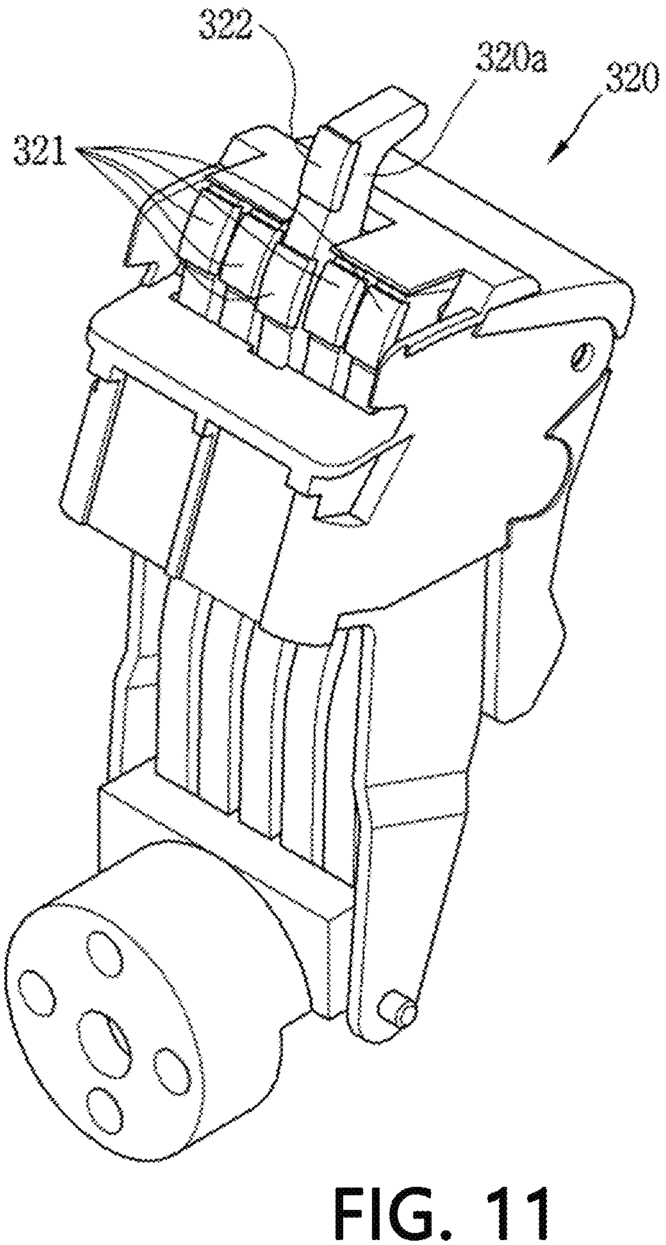
FIG. 11 is a perspective view illustrating an exemplary embodiment of a movable contact terminal shown in FIG. 5.

In an embodiment of the present disclosure, as shown in FIG. 11, the protruding contact 322 may protrude from an upper side of the centrally disposed movable contact 321 among the plurality of movable contacts 321.

The protruding contact 322 may extend upward so as to overlap at least a portion of the side plate 610 of the arc extinguishing unit 600 disposed above the protruding contact 322.

Figure 15:
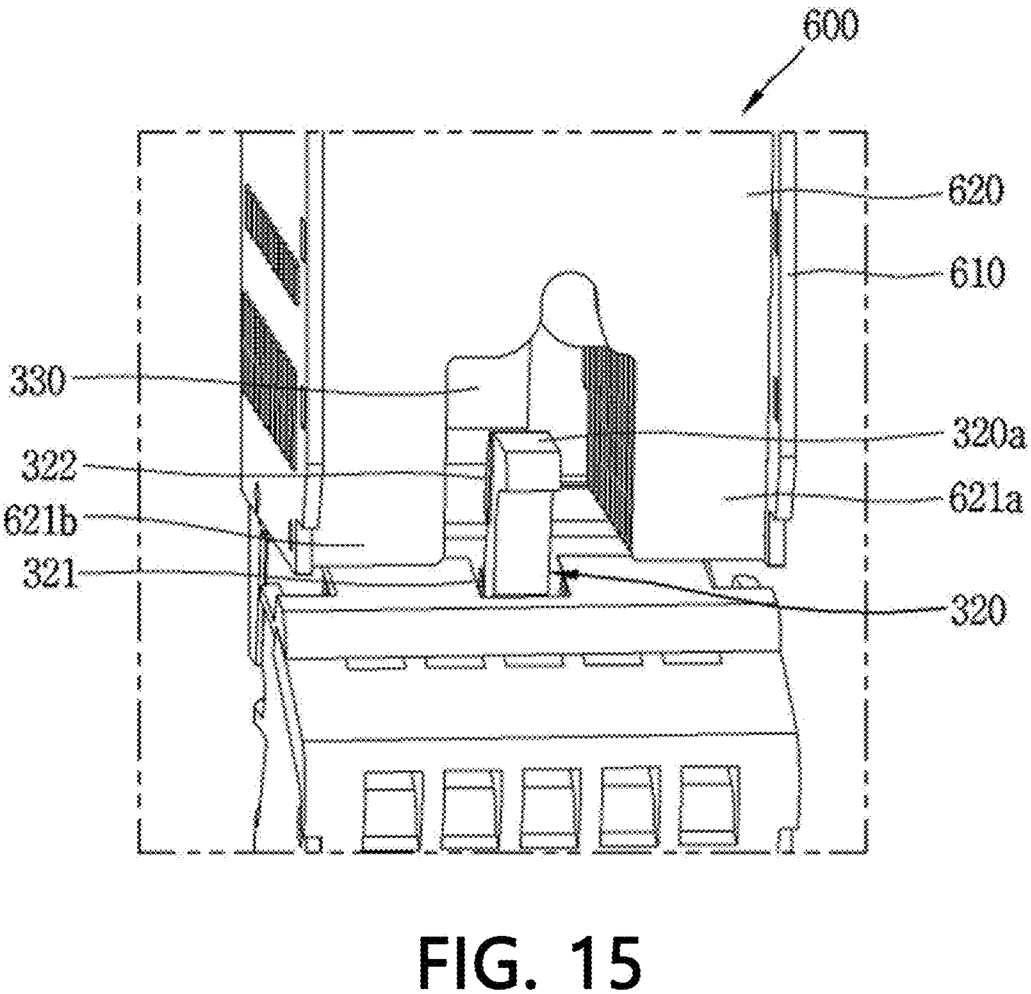
FIG. 15 is a perspective view of the circuit breaking unit and the arc extinguishing unit shown in FIG. 14 viewed from another direction.

Specifically, as shown in FIG. 15, the protruding contact 322 may extend so that an upper portion of the protruding contact 322 overlaps the side plate 610 of the arc extinguishing unit 600. Through this, the generated arc can be more quickly applied to the grid 620 and extinguished.

The width of the protruding contact 322 may be formed to correspond to the width of the movable contact 321 from which the protruding contact 322 extends.

Specifically, referring to FIG. 11, the width of the protruding contact 322 is formed to correspond to the width of the movable contact 321 from which the protruding contact 322 extends. In other words, the width of the protruding contact 322 may be the same as or similar to the width of the movable contact 321 from which the protruding contact 322 extends. Through this, interference with an adjacent movable contact 321 or interference between adjacent protruding contacts 322 when a plurality of protruding contacts 322 are formed can be reduced.

(6) Trip Mechanism of the Movable Contact Terminal 320 and Movement of the Arc-Generation Area A.A Referring to FIGS. 12 to 16, in the present embodiment, the arc-generation area includes a first arc-generation area A.A1 and a second arc-generation area A.A2.

The first arc-generation area A.A1 is formed between the fixed contact 311 and the movable contact 321. The second arc-generation area A.A2 is formed between the protruding contact 322 and the low runner 330.

The low runner 330 may play the same role as the fixed contact 311 in relation to the protruding contact 322. Thus, the second arc-generation area A.A2 may be formed between the protruding contact 322 and the low runner 330.

The protruding contact 322 is disposed above the movable contact 321 on the movable contact terminal 320. In this case, the protruding contact 322 and the low runner 330 are separated from each other a very short moment later than when the movable contact 321 and the fixed contact 311 are separated.

Figure 13:
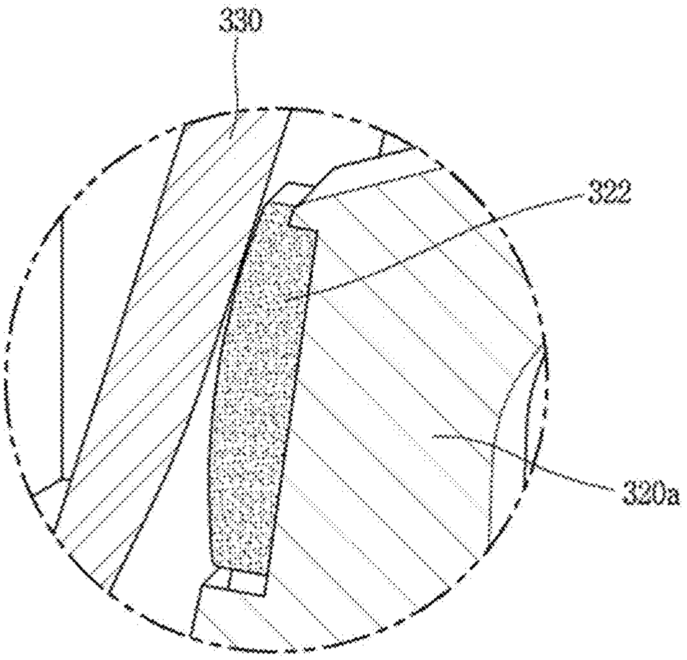
FIG. 13 is a partially enlarged view illustrating a state in which a protruding contact and a low runner, and a fixed contact and a movable contact of the circuit breaking unit and the arc extinguishing unit shown in FIG. 12 are brought into contact with each other or separated from each other in a first state of a trip state.
Figure 13:
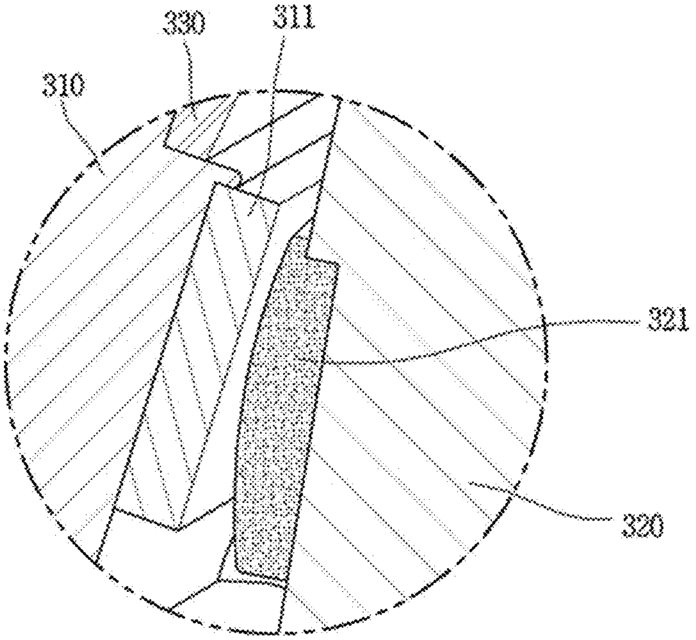

Specifically, referring to FIG. 13, when the trip mechanism of the movable contact terminal 320 occurs to separate the movable contact 321 from the fixed contact 311, the movable contact 321 and the fixed contact 311 may be first separated with a very short time difference, and then the protruding contact 322 and the low runner 330 may be separated.

That is, when the circuit breaking unit 300 performs the trip mechanism, the protruding contact 322 and the lower runner 330 are separated later in time than the movable contact 321 and the fixed contact 311, and thus even after energization is cut off between the movable contact 321 and the fixed contact 311, energization occurs between the protruding contact 322 and the low runner 330 for a short time.

In relation to this, the trip state will be described as follows.

The movable contact terminal 320 is made movable between an energized state in which the movable contact 321 and the fixed contact 311 are in contact with each other and the low runner 330 and the protruding contact 322 are in contact with each other, and a trip state in which the movable contact 321 and the fixed contact 311 are spaced apart from each other and the low runner 330 and the protruding contact 322 are spaced apart from each other.

Figure 12:
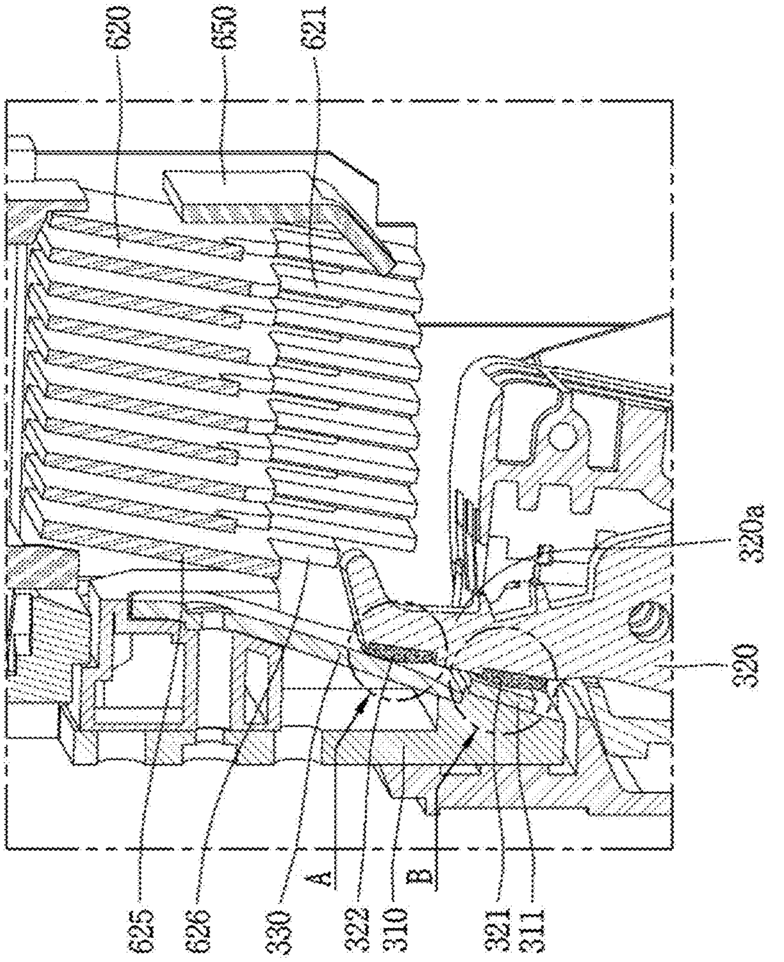
FIG. 12 is a perspective view illustrating a circuit breaking unit and an arc extinguishing unit shown in FIG. 5.

Specifically, FIG. 12 is a diagram showing an energized state. The movable contact 321 and the protruding contact 322 contact the fixed contact 311 and the low runner 330, respectively, and are energized, respectively.

In this case, since DC power is applied as described above, current may flow from the fixed contact 311 and the low runner 330 to the movable contact 321 and the protruding contact 322 or vice versa.

The trip state of the movable contact terminal 320 includes a first state in which the movable contact 321 and the fixed contact 311 are spaced apart from each other and contact of the low runner 330 and the protruding contact 322 is maintained, and a second state in which the movable contact 321 and the fixed contact 311 are spaced apart from each other and the low runner 330 and the protruding contact 322 are spaced apart from each other. And, the trip state of the movable contact terminal 320 may be sequentially changed to the first state and the second state.

Figure 14:
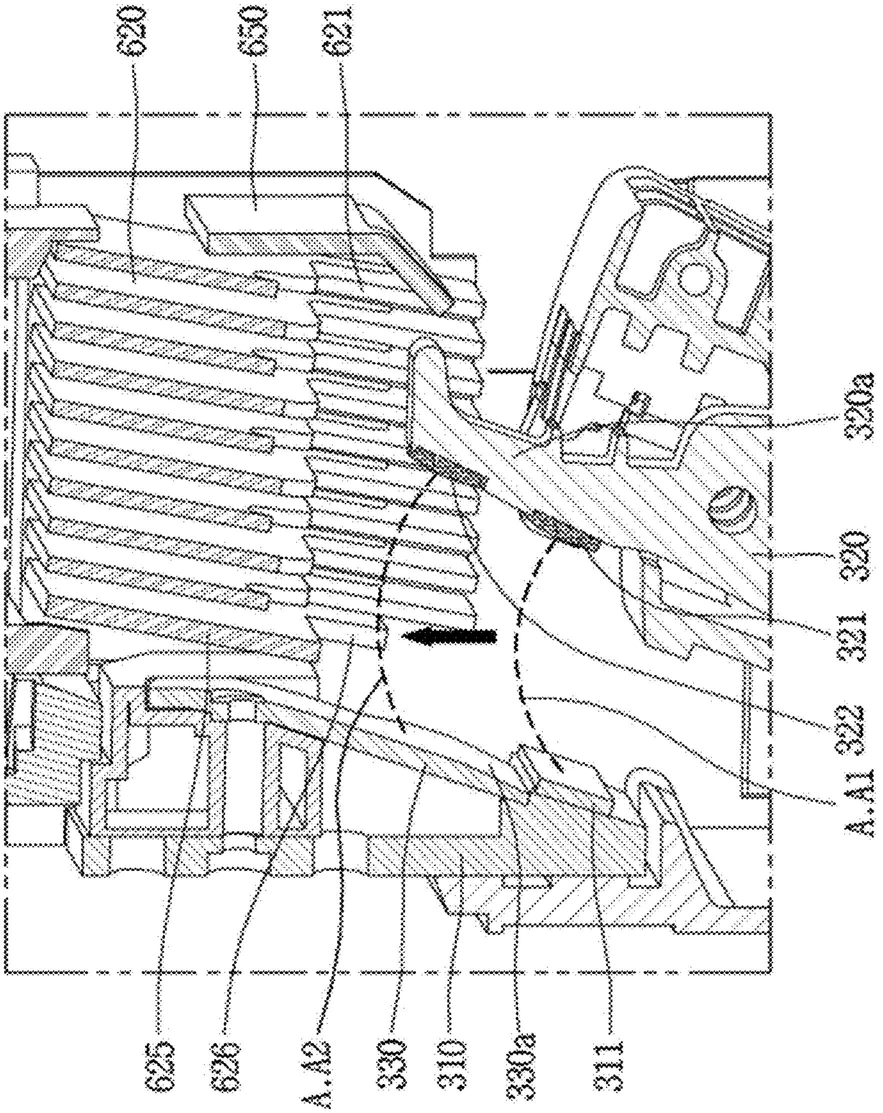
FIG. 14 is a perspective view illustrating a state in which the circuit breaking unit and the arc extinguishing unit shown in FIG. 12 are disposed in a trip state.

Specifically, FIG. 12 shows an energized state, FIG. 13 shows the first state, and FIG. 14 shows the second state.

Referring to FIG. 13, in the first state, the movable contact 321 and the fixed contact 311 are spaced apart from each other. And, in the first state, contact is maintained between the low runner 330 and the protruding contact 322. Therefore, in the first state, a complete trip has not yet occurred, and energization is achieved through the low runner 330 and the protruding contact 322.

And, referring to FIG. 14, the second state is formed when the protruding contact 322 and the low runner 330 are spaced apart. An arc is generated at the final separation site.

In a state where the protruding contact 322 is not provided, an arc is generated through the first arc-generation area A.A1. However, in the first state of the trip state, since the protruding contact 322 maintains contact with the low runner 330 and the movable contact 321 and the fixed contact 311 are spaced apart from each other, when changing from the first state to the second state, the final separation site becomes the low runner 330 and the protruding contact 322.

Therefore, the arc generated in the first arc-generation area A.A1 when the protruding contact 322 is not provided is generated in the second arc-generation area A.A2 by the protruding contact 322 and the low runner 330 having the above-described features.

According to an embodiment of the present disclosure, by providing the low runner 330 and the protruding contact 322, there is an effect that the location where the arc is generated is moved upward. That is, according to an embodiment of the present disclosure, there is an effect that an area where an arc is generated is moved upward by a distance in which the protruding contact 322 protrudes upward from the movable contact 321.

In other words, in the circuit breaking unit including the protruding contact 322 and the low runner 330 according to an embodiment of the present disclosure, the arc-generation area is moved from between the movable contact 321 and the fixed contact 311 (the first arc-generation area A.A1) to between the protruding contact 322 and the low runner 330 (the second arc-generation area A.A2), and thus is moved close to the arc extinguishing unit 600, i.e., the grid 620.

The present disclosure provides a protruding contact 322 and a low runner 330 that are in contact with each other in a state in which a fixed contact 311 and a movable contact 321 are spaced apart in the first state of the trip state, and a protruding contact 322 and a low runner 330 that are spaced apart in the second state, and thus generates an arc closer to a grid 620 when a small current breaking occurs in a DC air circuit breaker. Since the distance between the generated arc and the grid 620 decreases, the time at which the arc is applied to the grid 620 becomes shorter, and thus the arc can be quickly extinguished.

(7) Description of the U Assembly 400

Referring to FIGS. 30 to 37, the air circuit breaker according to an embodiment of the present disclosure further includes a U assembly 400.

Figure 31:
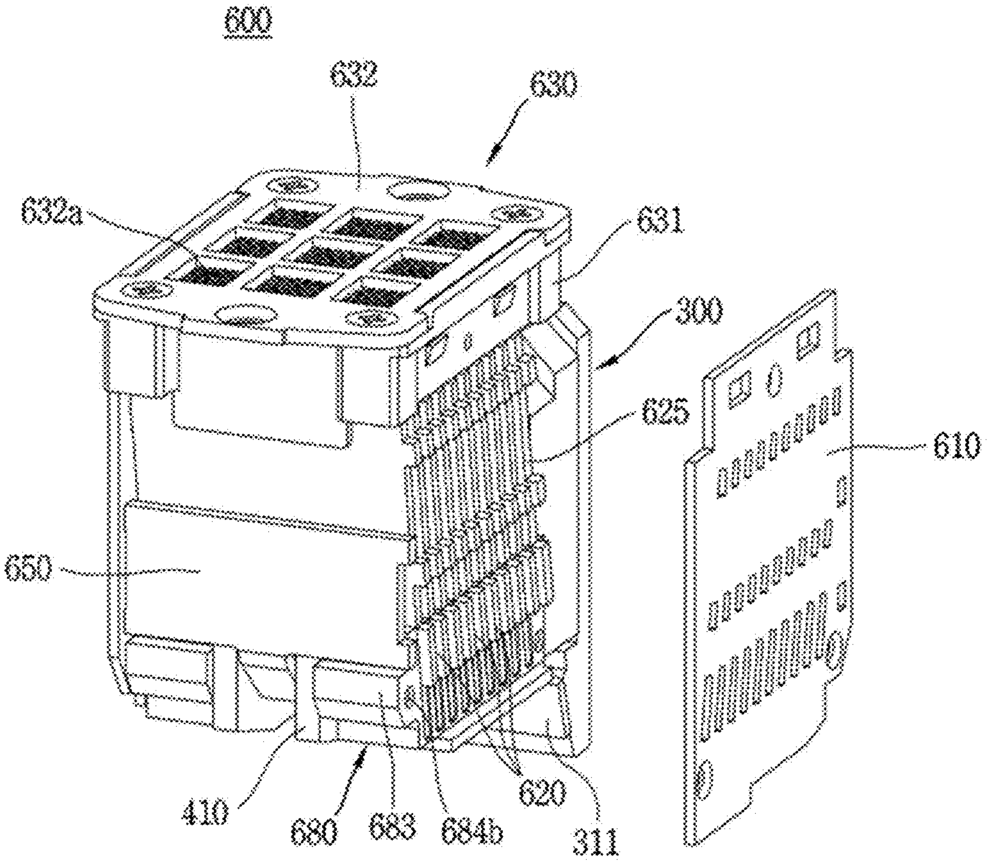
FIGS. 31 and 32 are perspective views illustrating an arc extinguishing unit provided in the air circuit breaker of FIG. 30.

Referring to FIG. 31 and the like, the U assembly 400 is disposed between the low runner 330 and the fixed contact terminal 310.

Figure 32:
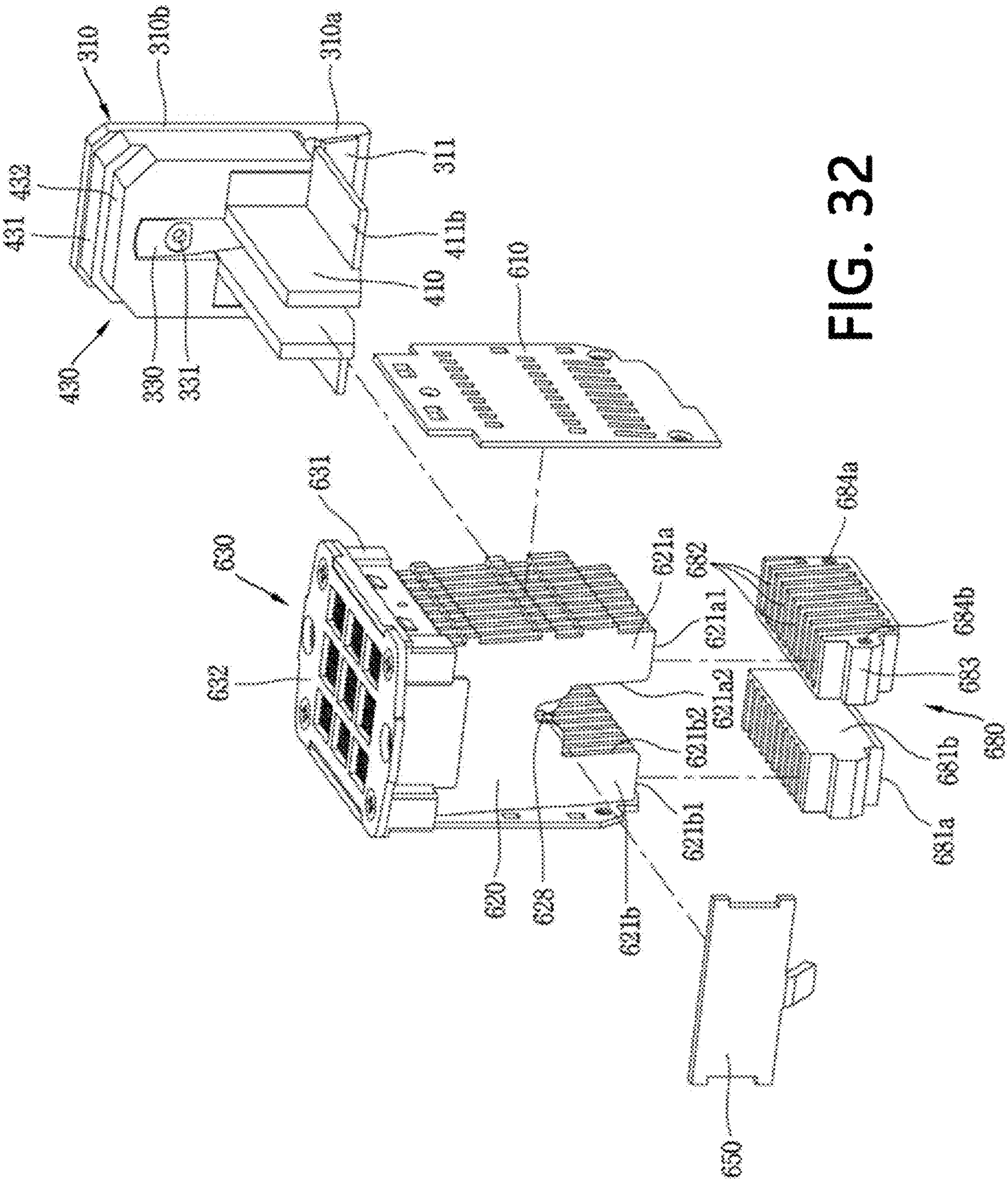

Referring to FIG. 32, the fixed contact terminal 310 includes a base 310*a* on which the fixed contact 311 is disposed, and a vertical portion 310*b* extending upward from the base 310*a*. The low runner 330 may be disposed on the base 310*a*. A coupling hole 331 through which a coupling member coupling the fixing part 430 and the fixed contact terminal 310 can pass may be formed at an end side of the low runner 330. A plurality of opening holes 310*b*1 communicating with the outside may be formed in the vertical portion 310*b*.

The U assembly 400 extends between the arc extinguishing unit 600 and the protruding contact 322. That is, the U assembly 400 goes away from the fixed contact terminal 310 and extends toward the movable contact 321. The U assembly 400 may extend between the first protective part 680 that are disposed to be spaced apart from each other.

Figure 22:
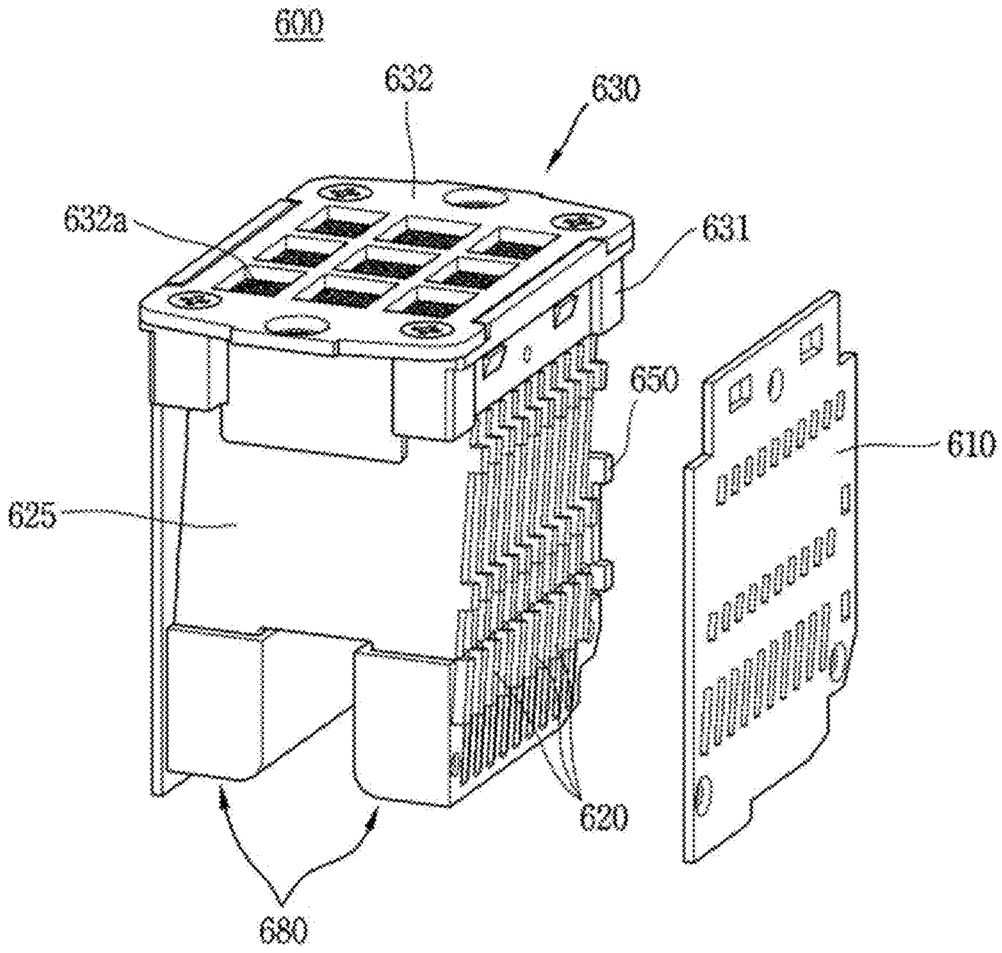
FIGS. 22 and 23 are perspective views illustrating an arc extinguishing unit provided in the air circuit breaker of FIG. 21.

Referring to FIG. 22 and the like, the U assembly 400 is disposed between the low runner 330 and the fixed contact terminal 310.

Figure 23:
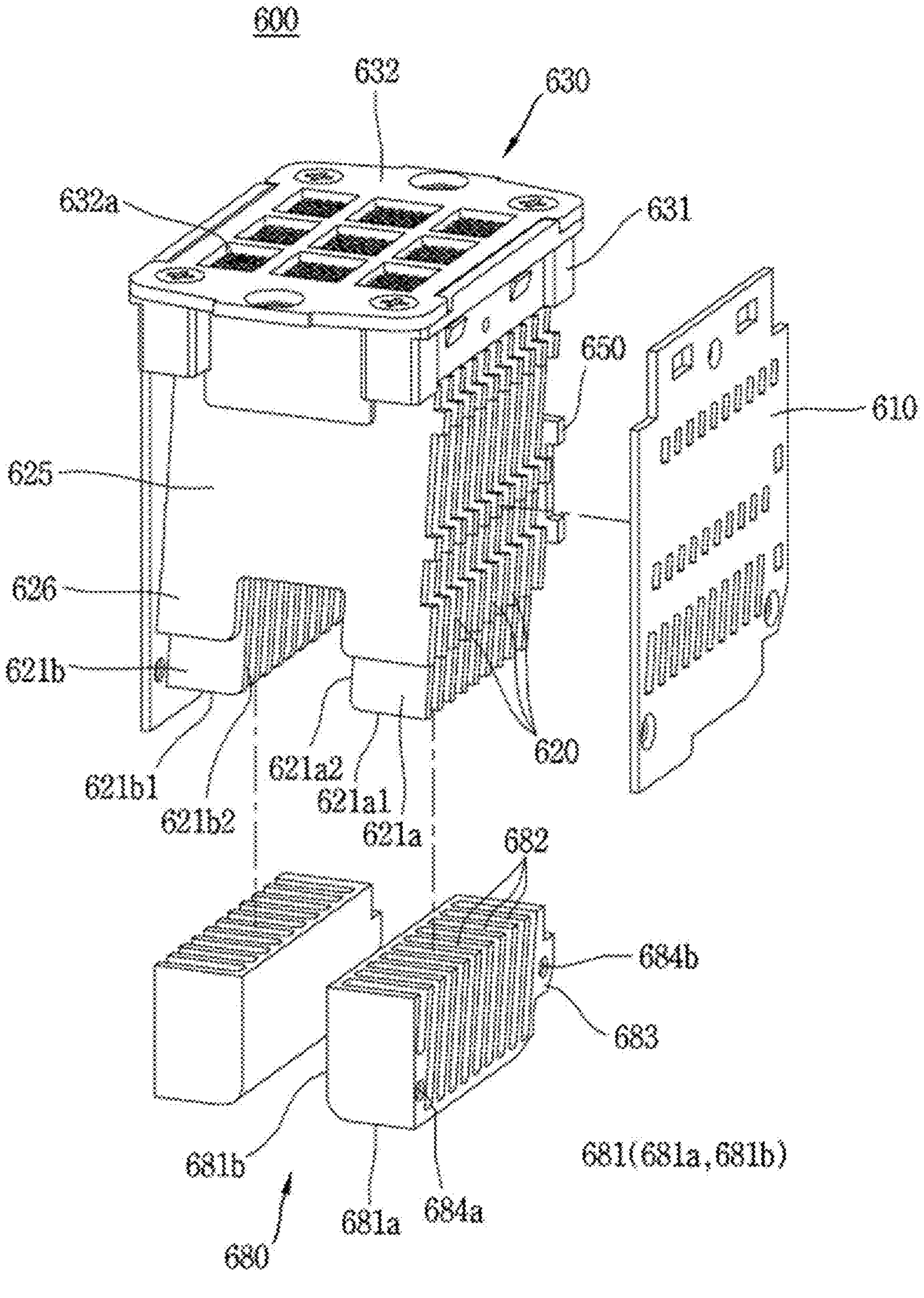

Referring to FIG. 23, the fixed contact terminal 310 includes a base 310*a* on which the fixed contact 311 is disposed, and a vertical portion 310*b* extending upward from the base 310*a*. The low runner 330 may be disposed on the base 310*a*. A coupling hole 331 through which a coupling member coupling the fixing part 430 and the fixed contact terminal 310 can pass may be formed at an end side of the low runner 330. A plurality of opening holes 310*b*1 communicating with the outside may be formed in the vertical portion 310*b*.

The U assembly 400 extends between the arc extinguishing unit 600 and the protruding contact 322. That is, the U assembly 400 goes away from the fixed contact terminal 310 and extends toward the movable contact 321. The U assembly 400 may extend between the first protective part 680 that are disposed to be spaced apart from each other.

Specifically, the U assembly 400 extends between the arc extinguishing unit 600 and the movable contact terminal 320 or between the arc extinguishing unit 600 and the protruding contact 322 in the trip state. That is, the U assembly 400 extends between the arc extinguishing unit 600 and the protruding contact 322 from both sides of the low runner 330. The U assembly 400 may extend to surround a side surface of the protruding contact 322 when the protruding contact 322 is disposed in a trip state.

An air gap A.G, which is a separation space, may be formed between the U assembly 400 and the protruding contact 322.

Specifically, the U assembly 400 extends between the arc extinguishing unit 600 and the movable contact terminal 320 or between the arc extinguishing unit 600 and the protruding contact 322 in the trip state. That is, the U assembly 400 extends between the arc extinguishing unit 600 and the protruding contact 322 from both sides of the low runner 330. The U assembly 400 may extend to surround a side surface of the protruding contact 322 when the protruding contact 322 is disposed in a trip state.

An air gap A.G, which is a separation space, may be formed between the U assembly 400 and the protruding contact 322.

Figure 33:
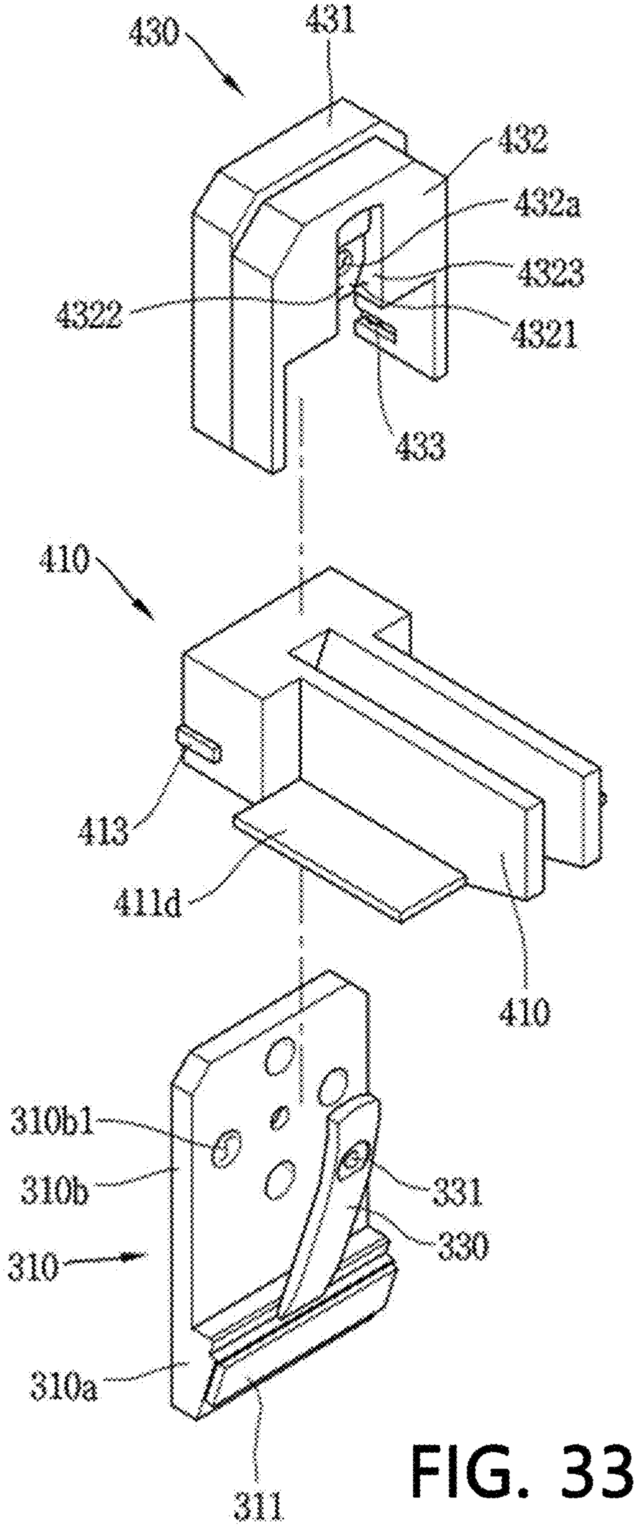
FIG. 33 is an exploded perspective view illustrating the U assembly of FIG. 30.

Referring to FIG. 33, the U assembly 400 includes a holder 410 inserted between the low runner 330 and the fixed contact terminal 310 and protruding from both sides of the low runner 330, and a fixing part 430 coupled to the holder 410 and the fixed contact terminal 310 on the upper side of the holder 410 so that the holder 410 is not separated from the fixed contact terminal 310.

The holder 410 is inserted between the low runner 330 and the fixed contact terminal 310, has a space formed therein, and protrudes from both sides of the low runner 330.

The holder 410 includes a main body 411. The main body 411 is spaced apart from each other on opposite sides and protrudes in parallel. The above-described protruding contact point 322 may move between the intervals of the main body 411. Thus, an arc may be generated in the interval portion of the main body 411. However, the main body 411 may be extended so as to be farther away or closer to each other.

The main body 411 is formed to surround the second surface 681*b* of the first protective part 680. Specifically, referring to FIG. 35, the main body 411 is formed to surround the second surface 681*b* of the first protective part 680 from the protruding contact 322.

Referring to FIG. 23, the U assembly 400 includes a holder 410 inserted between the low runner 330 and the fixed contact terminal 310 and protruding from both sides of the low runner 330, and a fixing part 430 coupled to the holder 410 and the fixed contact terminal 310 on the upper side of the holder 410 so that the holder 410 is not separated from the fixed contact terminal 310.

The holder 410 is inserted between the low runner 330 and the fixed contact terminal 310, has a space formed therein, and protrudes from both sides of the low runner 330.

The holder 410 includes a main body 411. The main body 411 is spaced apart from each other on opposite sides and protrudes in parallel. The above-described protruding contact point 322 may move between the intervals of the main body 411. Thus, an arc may be generated in the interval portion of the main body 411. However, the main body 411 may be extended so as to be farther away or closer to each other.

The main body 411 is formed to surround the second surface 681*b* of the first protective part 680. Specifically, referring to FIG. 35, the main body 411 is formed to surround the second surface 681*b* of the first protective part 680 from the protruding contact 322.

Meanwhile, in another embodiment, the U assembly 400 may be provided, but the first protective part 680 surrounding the grid leg 621 may not be provided. In this case, the main body 411 of the U assembly 400 may be formed to surround the side of the grid leg 621.

A side wing portion 411*d* may protrude to the outside of the main body 411. The side wing portion 411*d* may protect the first surface 681*a* of the first protective part 680 from the rotating movable contact terminal 320.

Meanwhile, in another embodiment, the U assembly 400 may be provided, but the first protective part 680 surrounding the grid leg 621 may not be provided. In this case, the side wing portion 411*d* may be formed to protect the bottom surface of the grid leg 621.

Figure 35:
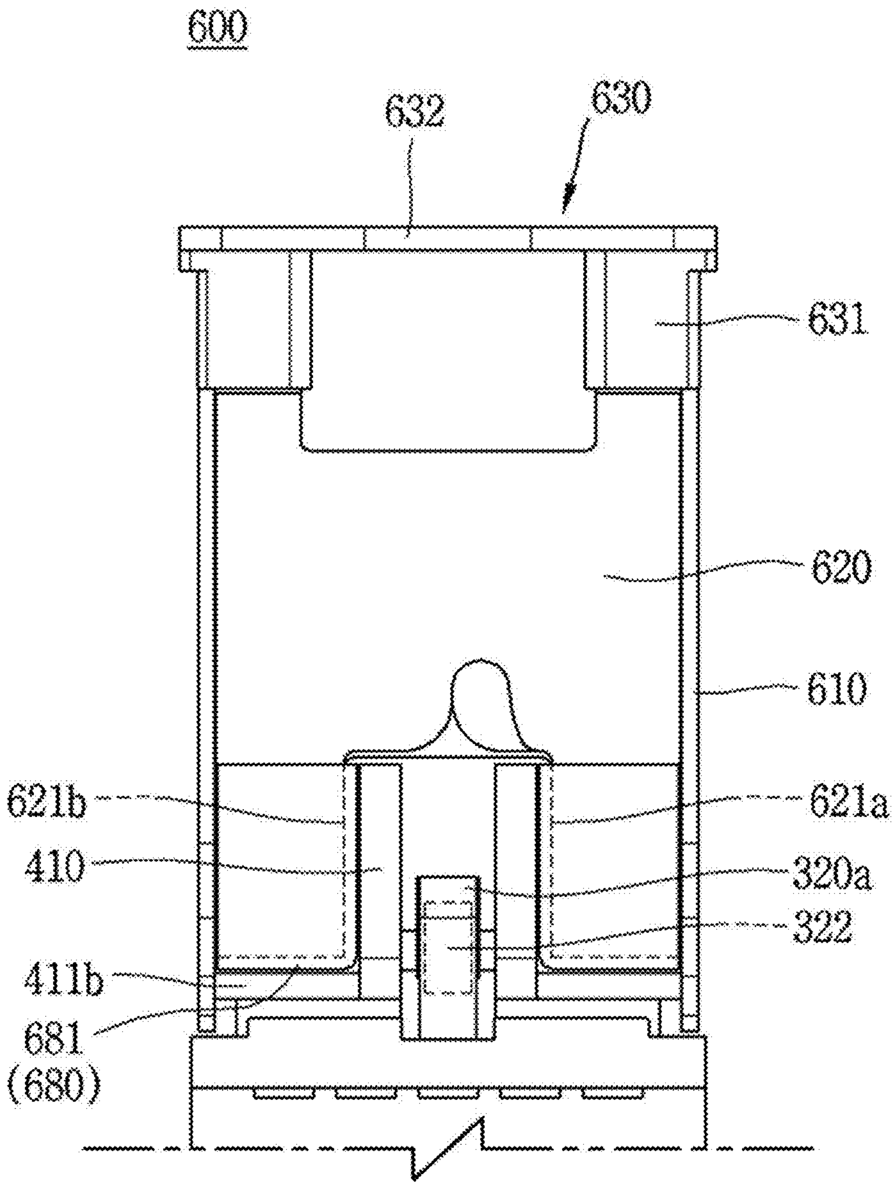
FIG. 35 is a front view illustrating the circuit breaking unit and the arc extinguishing unit shown in FIG. 30.
Figure 36:
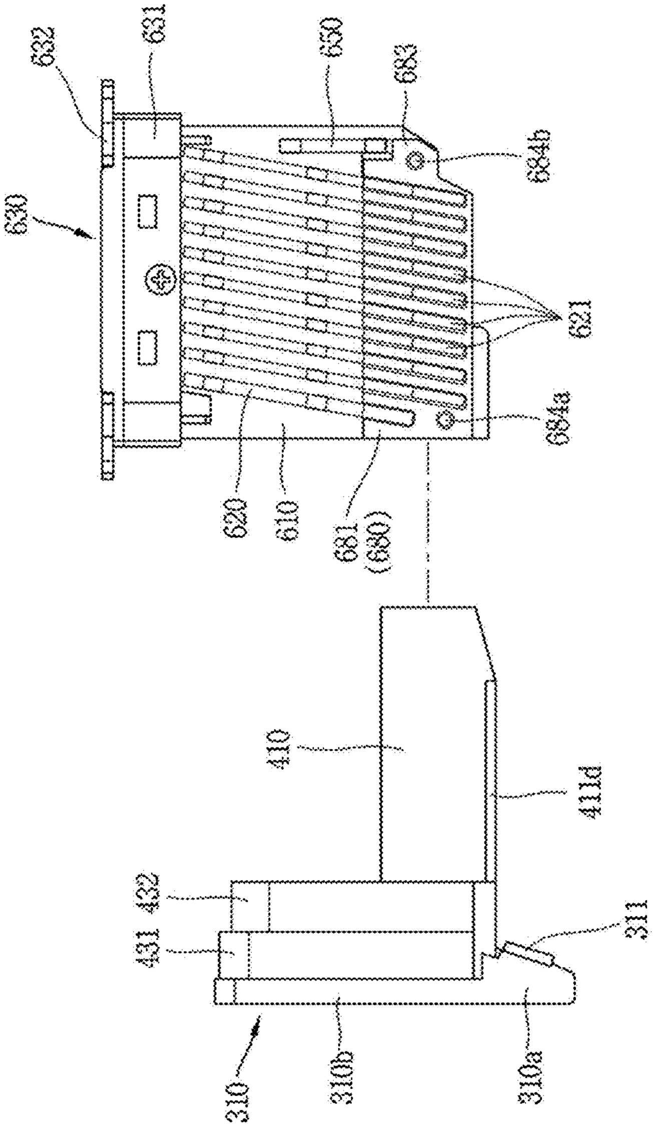
FIG. 36 is a side view illustrating the arc extinguishing unit and the U assembly shown in FIG. 30.
Figure 37:
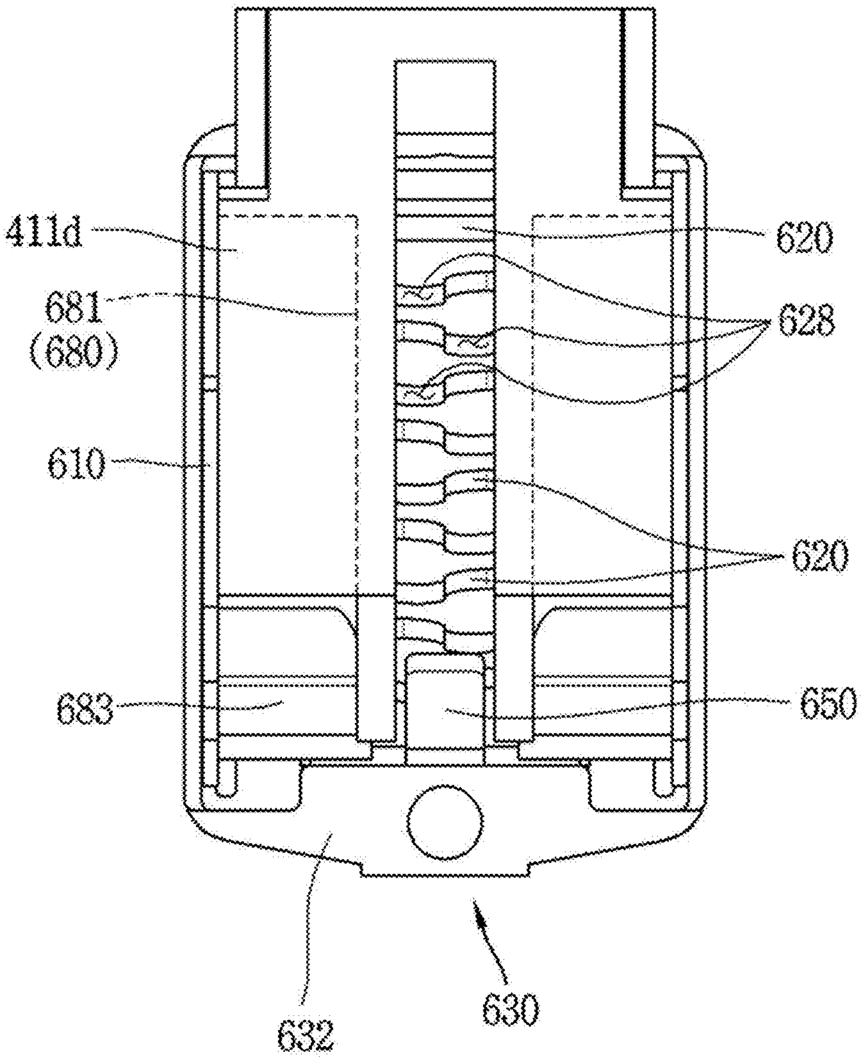
FIG. 37 is a bottom view illustrating the arc extinguishing unit shown in FIG. 30.

Meanwhile, an air gap A.G may be formed between the main body 411 of the holder 410 and the protruding contact 322. Specifically, as shown in FIG. 35, an air gap A.G is formed between the main body 411 of the holder 410 and the protruding contact 322. In this case, the air gap A.G may be formed narrower than the air gap A.G between the grid leg 621 and the protruding contact 322 in the above-described embodiment.

A coupling protrusion 413 may protrude from the rear surface of the main body 411, that is, the central surface of the main body 411 toward the side where the main body 411 is close to the fixed contact terminal 310. The coupling protrusion 413 may be coupled to a coupling groove 433 of the fixing part 430 to couple the holder 410 and the fixing part 430.

The fixing part 430 may be provided between the low runner 330 and the fixed contact terminal 310. Since the fixing part 430 is provided, the holder 410 can be stably coupled to the fixed contact terminal 310.

The fixing part 430 may include a first fixing part 431 and a second fixing part 432.

Specifically, the first fixing part 431 may contact the fixed contact terminal 310 and have a width corresponding to the width of the fixed contact terminal 310. Specifically, as shown in FIG. 33, the width of the fixed contact terminal 310 and the width of the first fixing part 431 may be the same or formed to be the same. Through this, movement of the first fixing part 431 in the left-right direction with respect to the fixed contact terminal 310 can be reduced. In addition, the first fixing part 431 can easily absorb the impact received by the low runner 330.

And, the first fixing part 431 may be formed to surround the lower side surface of the low runner 330.

The second fixing part 432 may be interposed between the first fixing part 431 and the low runner 330. And, the second fixing part 432 may be formed to surround the upper side surface of the low runner 330.

As the second fixing part 432 is formed to surround an upper portion of the low runner 330, as described above, an impact received by the low runner 330 due to contact with and separation from the protruding contact 322 or an impact received when an arc is applied may be absorbed by the second fixing part 432.

A concave portion 4321 may be formed in the second fixing part 432 to surround an upper portion of the low runner 330.

Specifically, referring to FIG. 33, the second fixing part 432 has a concave portion 4321 into which the low runner 330 protruding from the fixed contact terminal 310 at a predetermined angle can be inserted.

In this case, one surface forming the concave portion 4321 has a contact surface 4322 in contact with a surface where the upper portion of the low runner 330 faces the fixed contact terminal 310. And, a side surface 4323 may be formed that is perpendicular to the contact surface 4322. A coupling hole 432*a* opened for coupling with the low runner 330 and the fixed contact terminal 310 may be formed in the contact surface 4322.

The second fixing part 432 has a coupling groove 433 formed to be coupled with the coupling protrusion 413 of the main body 411 described above to fix the fixing part 430 to the holder 410.

The fixing part 430 may include a gassing material that generates molecules that extinguish the arc when heat generated by the arc is applied.

The gassing material generates molecules capable of extinguishing the arc as the arc is applied. Accordingly, the generated arc can be quickly extinguished.

Specifically, when heat generated by an arc is applied to the gassing material, the gassing material releases molecules capable of extinguishing the arc. In other words, the gassing material can generate gases that can extinguish the arc. Through this, the arc generated in the arc extinguishing unit 600 can be quickly extinguished.

As the fixing part 430 is inserted between the fixed contact terminal 310 and the low runner 330, the fixed contact terminal 310 is disposed on the rear surface and the low runner 330 is disposed on the front surface.

As described above, as the low runner 330 is in contact with and separation from the protruding contact 322, an arc may be generated. In addition, the generated arc may be applied to the low runner 330. Thus, the low runner 330 may be damaged upon application of an arc.

In this case, since the fixing part 430 includes the gassing material, damage to the low runner 330 may be reduced by rapidly extinguishing the arc.

The circuit breaking unit 300 according to an embodiment of the present disclosure has the fixing part 430 interposed between the fixed contact terminal 310 and the low runner 330, and thus, it is possible to prevent the low runner 330 from shaking or changing its position due to an external force.

In addition, since the fixing part 430 includes a gassing material, when an arc is applied to the low runner 330, there is an advantage in that it can quickly extinguish the arc.

Figure 34:
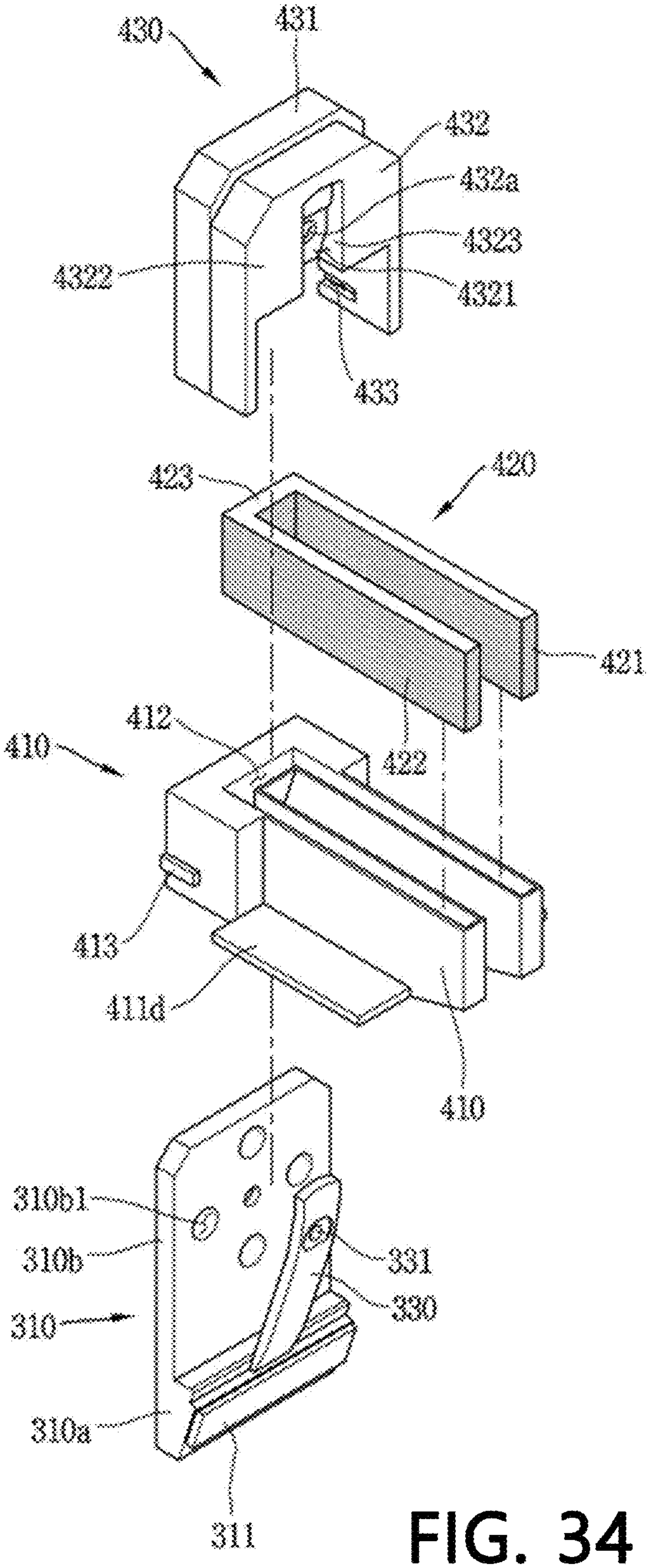
FIG. 34 is an exploded perspective view illustrating a U assembly according to another exemplary embodiment of the present disclosure.

Meanwhile, referring to FIG. 34 according to another embodiment, the holder 410 may have a storage part 412 formed therein. And, the U assembly 400 may further include a U magnetic body 420 stored in the storage part 412 of the holder 410 and made of a magnetic body.

The U magnetic body 420 is stored in the inner space of the holder 410 and is made of a magnetic body.

Meanwhile, according to another embodiment of the present disclosure, the U magnetic body 420 may include a first magnetic body 421, a second magnetic body 422, and a third magnetic body 423.

The first magnetic body 421 is disposed on one side of the storage part 412 of the main body 411. The first magnetic body 421 is disposed to extend between the arc extinguishing unit 600 and the protruding contact 322 from the fixed contact terminal 310.

The second magnetic body 422 is spaced apart from the first magnetic body 421 and disposed to face the first magnetic body 421. The second magnetic body 422 is disposed on the other side of the storage part 412 of the main body 411 to face the first magnetic body 421.

The third magnetic body 423 is integrally formed with the first magnetic body 421 and the second magnetic body 422 and is interposed between the low runner 330 and the fixed contact terminal 310.

The first magnetic body 421, the second magnetic body 422, and the third magnetic body 423 may be integrally formed. And, the first magnetic body 421, the second magnetic body 422, and the third magnetic body 423 may be formed by stacking magnetic bodies.

Through this, even when the thickness of the U assembly 400 is thick or thin, the U magnetic body 420 suitable for the holder 410 can be easily manufactured. In addition, by stacking and forming the U magnetic body 420, a strong induced magnetic field by an arc can be formed.

Due to the structure described above, when an arc is formed between the low runner 330 and the protruding contact 322 at the central opening of the main body 411, an induced magnetic field may be formed in the U magnetic body 420.

Specifically, when an arc is generated between the first magnetic body 421 and the second magnetic body 422, an induced magnetic field may be formed along the first magnetic body 421, the second magnetic body 422, and the third magnetic body 423. At this time, the induced magnetic field induced in the U magnetic body 420 may be formed so that the arc is subjected to the electromagnetic force upward.

The fixing part 430 is disposed between the low runner 330 and the fixed contact terminal 310 and is coupled to the low runner 330 and the fixed contact terminal 310. In addition, the fixing part 430 is coupled to the holder 410 and the fixed contact terminal 310 on the upper side of the holder 410 so that the holder 410 is not separated from the fixed contact terminal 310 and the U magnetic body is not separated from the inner space.

The lower end of the low runner 330 is coupled to the fixed contact terminal 310 and the upper end thereof is spaced apart from the fixed contact terminal 310. In addition, the low runner 330 repeatedly contacts and separates from the protruding contact 322 and may receive an impact when an arc generated is applied.

(8) Description of the Grid Leg 626 and the First Protective Part 680

Referring to FIGS. 21 to 29, the grid 620 may include a grid leg 621. The grid leg 621 may include a grid leg 621 that extends from at least one end in the width direction and extends downward to surround the protruding contact 322 from both sides.

Figure 6:
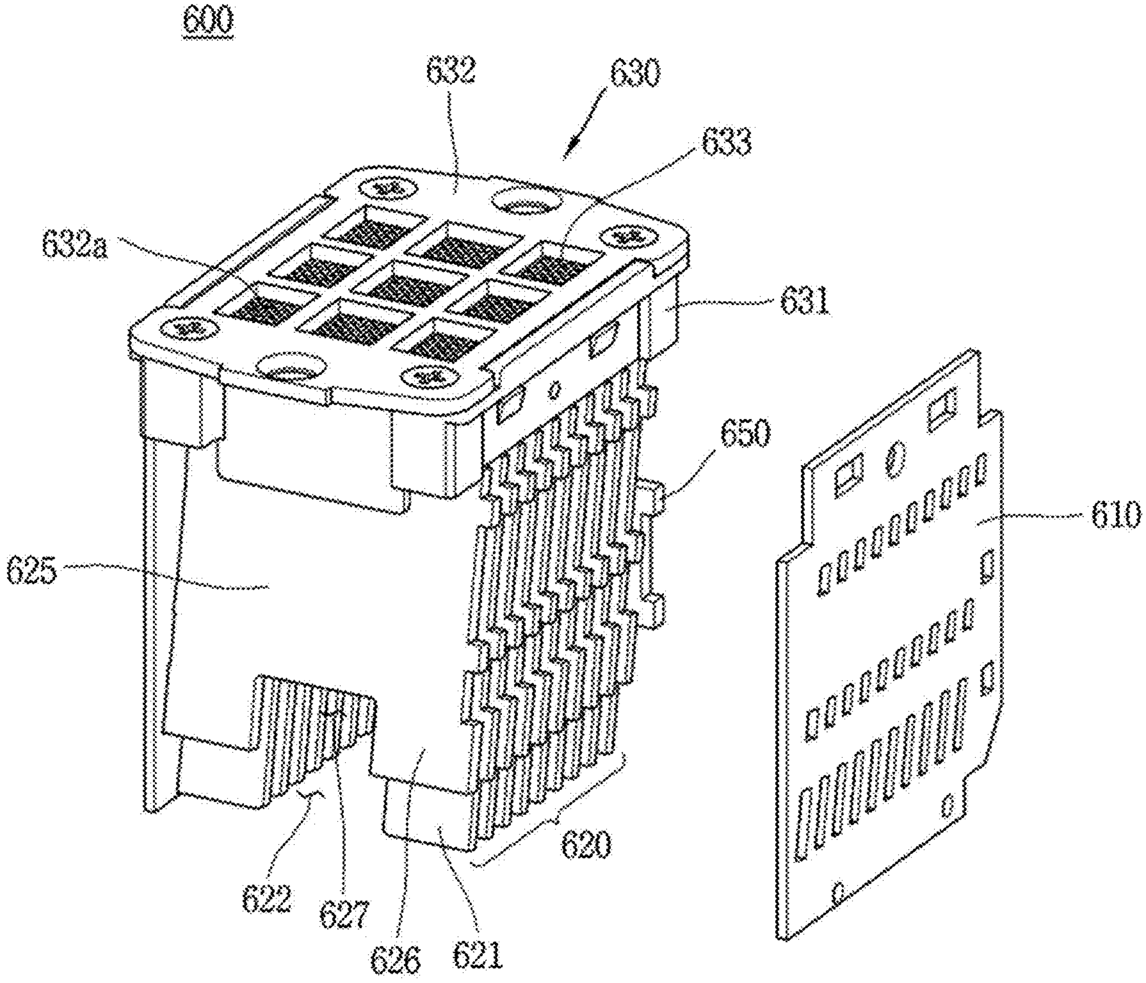
FIGS. 6 and 7 are perspective views illustrating an arc extinguishing unit provided in the air circuit breaker of FIG. 1 from different directions.
Figure 7:
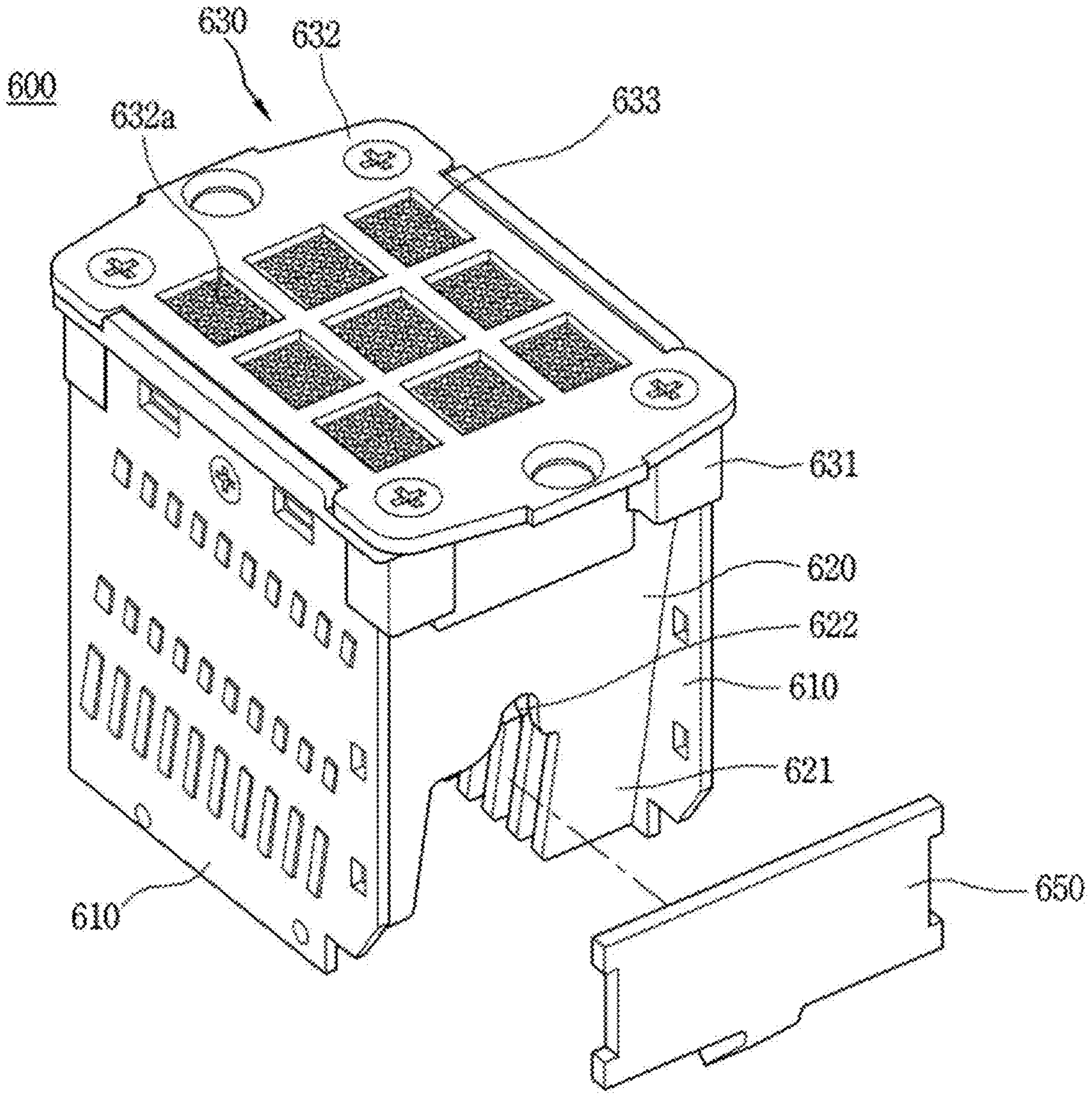
Figure 8:
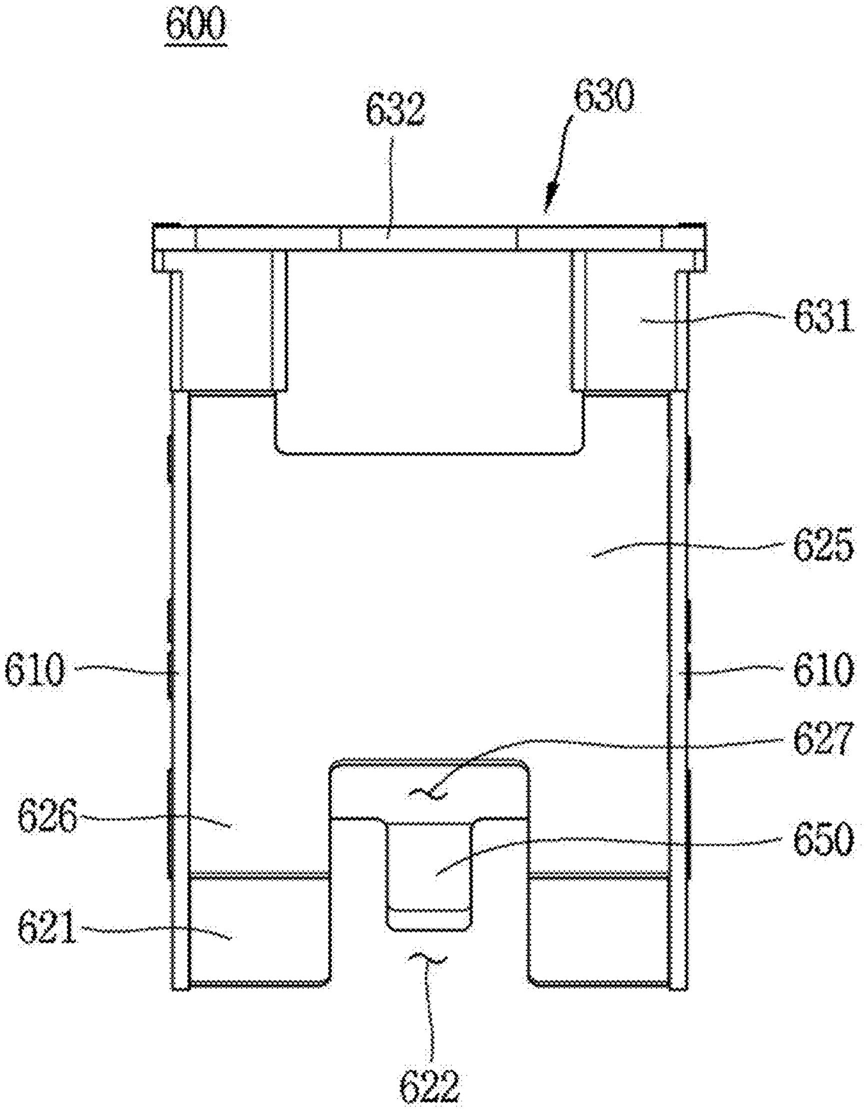
FIG. 8 is a front view illustrating an exemplary embodiment of the arc extinguishing unit shown in FIG. 6.
Figure 9:
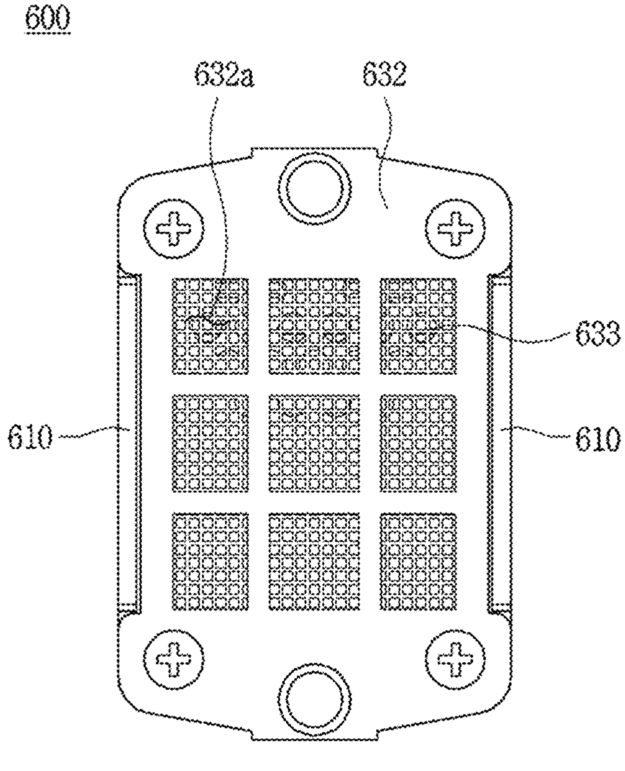
FIG. 9 is a plan view illustrating an exemplary embodiment of the arc extinguishing unit shown in FIG. 6.
Figure 10:
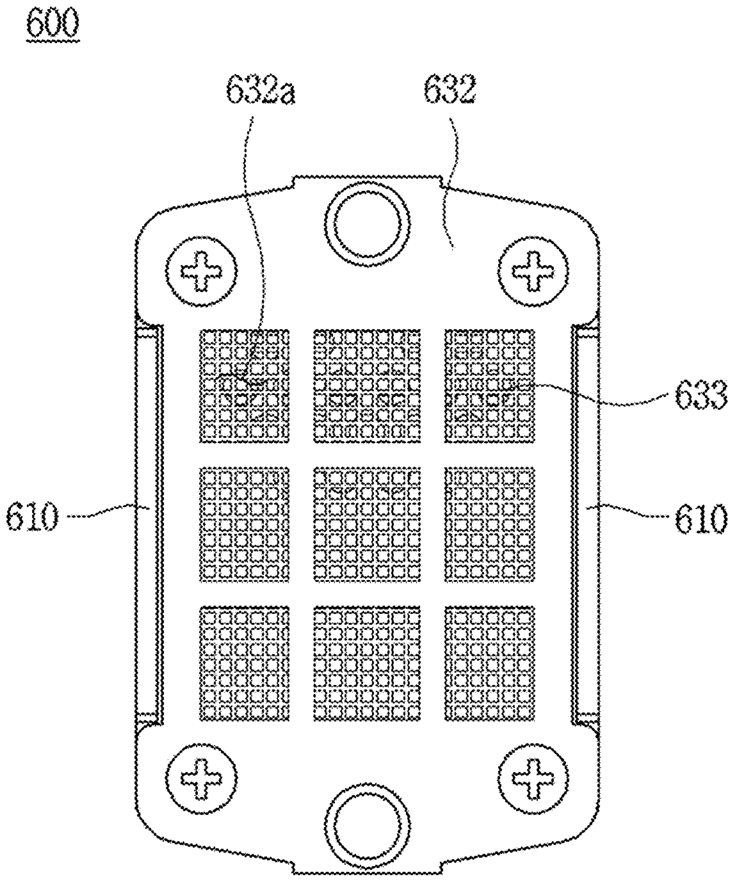
FIG. 10 is a side view illustrating an exemplary embodiment of the arc extinguishing unit shown in FIG. 6.
Figure 16:
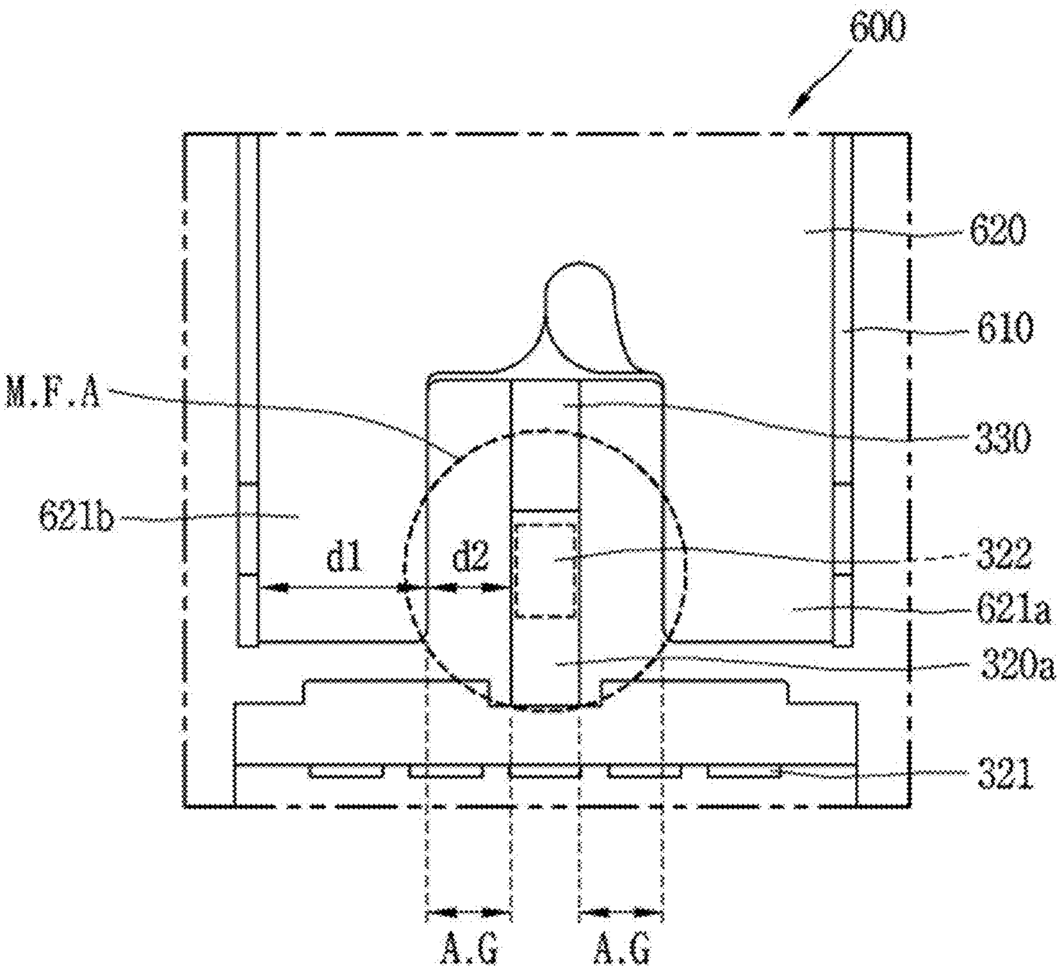
FIG. 16 is a front view illustrating the circuit breaking unit and the arc extinguishing unit shown in FIG. 15.

Specifically, referring to FIGS. 6 and 16, the grid leg 621 extends downward from both ends of the grid 620. In other words, the grid leg 621 extend from both ends of the grid 620 toward the movable contact terminal 320. That is, a first grid leg 621*a* and a second grid leg 621*b* may extend downward from both sides of the protruding contact 322 to surround the protruding contact 322.

Through the above-described structure, a magnetic field induced by an arc formed between the protruding contact 322 and the low runner 330 may be easily formed in the grid 620 and the grid leg 621.

In addition, according to an embodiment of the present disclosure, the grid leg 621 extending to be adjacent to the end of the side plate 610 may serve as an existing arc guide. That is, the arc generated under the arc extinguishing unit 600 may be easily applied to the grid leg 621 extended to the end of the side plate 610 and applied to the upper portion of the grid 620 and extinguished.

Referring to FIG. 16, the grid leg 621 includes a first grid leg 621*a* extending from one end in the width direction of the grid 620, and a second grid leg 621*b* extending from the opposite side of the first grid leg 621*a*. In this case, the first grid leg 621*a* and the second grid leg 621*b* may have the same width. In addition, a grid leg groove 622 may be formed between the grid legs 621.

According to an embodiment of the present disclosure, since the widths of the first grid leg 621*a* and the second grid leg 621*b* are the same, the induced magnetic field can be stably formed.

In addition, irrespective of the position of an arc generated under the arc extinguishing unit 600, the arc can be applied along the first grid leg 621*a* and/or the second grid leg 621*b* and extinguished quickly.

The grid leg 621 extend downward along the side plate 610. Specifically, the grid leg 621 extends adjacent to the lower end of the side plate 610.

Accordingly, since the physical distance to the arc generated in the arc-generation area A.A is close, the arc can be easily applied. Thus, the arc can be quickly extinguished. In addition, an air gap A.G, which is a separation space, may be formed between the grid leg 621 and the protruding contact 322.

The sum of lengths d1 of the first grid leg 621*a* and the second grid leg 621*b* in the width direction may be equal to or greater than half of the width of the grid 620.

A magnetic field may be induced in the grid leg 621 and the grid 620 by an arc generated under the arc extinguishing unit 600. At this time, the intensity of the magnetic field induced in the grid 620 and the grid leg 621 is inversely proportional to the distance between the arc and the grid leg 621.

Thus, if the width of the grid leg 621 is small, the distance of the air gap A.G, which is a distance between the generated arc and the grid leg 621, is relatively increased. Accordingly, the intensity of the magnetic field induced in the grid 620 and the grid leg 621 is relatively weak. Therefore, the electromagnetic force applied to the arc by the magnetic field induced in the grid 620 is relatively weak.

In the present disclosure, since the sum of the lengths of the first grid leg 621*a* and the second grid leg 621*b* in the width direction is formed to be equal to or greater than half of the width of the grid 620, an induced magnetic field due to an arc generated between the protruding contact 322 and the low runner can be formed more strongly.

The length in the width direction of the upper portion and the length in the width direction of the lower portion of the first grid leg 621*a* and the second grid leg 621*b* may have the same or similar.

Specifically, referring to FIG. 16, the first grid leg 621*a* and the second grid leg 621*b* extend from the upper portion so that the length in the width direction of the upper portion and the length in the width direction of the lower portion of the first grid leg 621*a* and the second grid leg 621*b* are the same or similar.

If the widths of the first grid leg 621*a* and the second grid leg 621*b* are changed while extending downward from the grid 620, it is difficult to form a uniform magnetic field induced in the first grid leg 621*a* and the second grid leg 621*b* by the arc generated between the first grid leg 621*a* and the second grid leg 621*b*.

Thus, through the structure of the first grid leg 621*a* and the second grid leg 621*b* as described above, an induced magnetic field formed through the grid leg 621 and the grid 620 can be stably formed.

The first grid leg 621*a* and the second grid leg 621*b* may be configured to have a width wider than a length of an air gap A.G which is a distance between the first grid leg 621*a* or the second grid leg 621*b* and the protruding contact 322.

Specifically, referring to FIG. 16, a width d1 of the first grid leg 621*a* is longer than a length of the air gap A.G which is a distance between the first grid leg 621*a* and the protruding contact 322.

Through the above-described structure, the intensity of the magnetic field induced in the grid 620 and the grid leg 621 may increase.

Specifically, the intensity of the magnetic field of the grid leg 621 and the grid 620 induced by the arc is formed inversely proportional to the distance between the protruding contact 322 and the grid leg 621, that is, the length of the air gap A.G. And, when the width of the grid leg 621 is widened, the length of the air gap A.G is relatively reduced.

Thus, when the width d1 of the grid leg 621 is longer than the length of the air gap A.G, the intensity of the magnetic field induced in the grid leg 621 may be increased.

In addition, according to the above-described structure, since the length of the air gap A.G is short, the pressure applied to the generated arc may increase. Accordingly, the rising force of the arc may also increase.

A ratio (d1/d2) of the width d1 of the grid leg 621 and the length d2 of the air gap A.G is as follows.

According to an embodiment of the present disclosure, the ratio (d1/d2) of the width d1 of the first grid leg 621*a* or the second grid leg 621*b* and the length d2 of the air gap A.G may be greater than or equal to 1.

Specifically, referring to FIG. 16, the ratio (d1/d2) of the width d1 of the first grid leg 621*a* or the second grid leg 621*b* and the length d2 of the air gap A.G may be greater than or equal to 1.

If the ratio (d1/d2) of the width d1 of the first grid leg 621*a* or the second grid leg 621*b* and the length d2 of the air gap A.G is less than 1, the intensity of the magnetic field induced in the grid 620 and the grid leg 621 may be weak, and the length of the air gap A.G may be increased so that the pressure applied to the arc may not be sufficient.

Therefore, electromagnetic forces caused by the magnetic field induced by the grid leg 621 and pressures in the area where the arcs are generated may not be sufficiently applied to raise the arcs generated under the arc extinguishing unit 600 to the arc extinguishing unit 600.

As for the grid leg 621 according to an embodiment of the present disclosure, since the ratio (d1/d2) of the width d1 of the first grid leg 621*a* or the second grid leg 621*b* and the length d2 of the air gap A.G is greater than or equal to 1, a magnetic field induced in the grid leg 621 may have sufficient intensity to apply an arc generated to the arc extinguishing unit 600 by means of an electromagnetic force.

In addition, as for the grid leg 621 according to an embodiment of the present disclosure, since the ratio (d1/d2) of the width d1 of the first grid leg 621*a* or the second grid leg 621*b* and the length d2 of the air gap A.G is greater than or equal to 1, an air gap A.G between the grid leg 621 and the protruding contact 322 is formed short, so that sufficient pressure can be formed to raise the generated arc to the arc extinguishing unit 600.

Referring to FIGS. 22 to 29, the grid leg 621 may extend downward to surround from both sides the protruding contact 322 disposed to extend upward from the movable contact 321.

The first protective part 680 is formed to surround at least a portion of the grid leg 621 at a lower portion of the grid leg 621. Specifically, referring to FIGS. 22 and 23, the first protective part 680 is formed to surround the grid leg 621 at a lower portion of the grid leg 621.

The first protective part 680 may be formed long along the longitudinal direction of the side plate 610. That is, the first protective part 680 is formed to surround the grid leg 621 and to extend in a section corresponding to a section in which the movable contact terminal 320 is moved.

The first protective part 680 may be formed to surround the entire grid leg 621 of the entire plurality of grids 620 by being formed long along the longitudinal direction of the side plate 610. However, in another embodiment, the first protective part 680 may be formed to surround only some of the grid legs 621 among the plurality of grids 620.

The first protective part 680 is provided in plurality. Specifically, two first protective parts 680 may be provided so as to be respectively disposed on the side plates 610 disposed on both sides. However, in another embodiment, the first protective part 680 may be divided in the longitudinal direction and connected to each other to be provided in three or more.

The first protective part 680 may be respectively disposed on the side plates 610 facing each other and may be formed to face each other. In addition, the first protective part 680 may be coupled to and fixed to the side plate 610 disposed adjacent thereto.

The first protective part 680 may include a first surface 681*a* surrounding a lower surface of a grid leg 621, and a second surface 681*b* extending at a predetermined angle with the first surface 681*a* and surrounding a side surface of the grid leg 621 facing a grid leg 621 disposed on the other side.

Specifically, the first protective party 680 includes a body 681 extending long along the longitudinal direction of the side plate 610.

The body 681 includes a first surface 681*a* surrounding the lower surface of the grid leg 621 and a second surface 681*b* surrounding the side surface of the grid leg 621. The first surface 681*a* is formed to surround the lower surface of the grid leg 621. The second surface 681*b* is formed to surround the side surface of the grid leg 621.

Due to the first surface 681*a* and the second surface 681*b*, damage to the grid leg 621 due to an arc generated when the protruding contact 322 and the low runner 330 are spaced apart can be reduced.

The first protective part 680 may be disposed to be spaced apart from each other along the longitudinal direction to be formed long and have an insertion groove 682 into which the grid leg 621 is inserted so that the grid legs 621 respectively formed in the plurality of grids 620 are inserted thereinto.

Specifically, an insertion groove 682 into which the grid leg 621 is inserted may be formed in the body 681.

Figure 24:
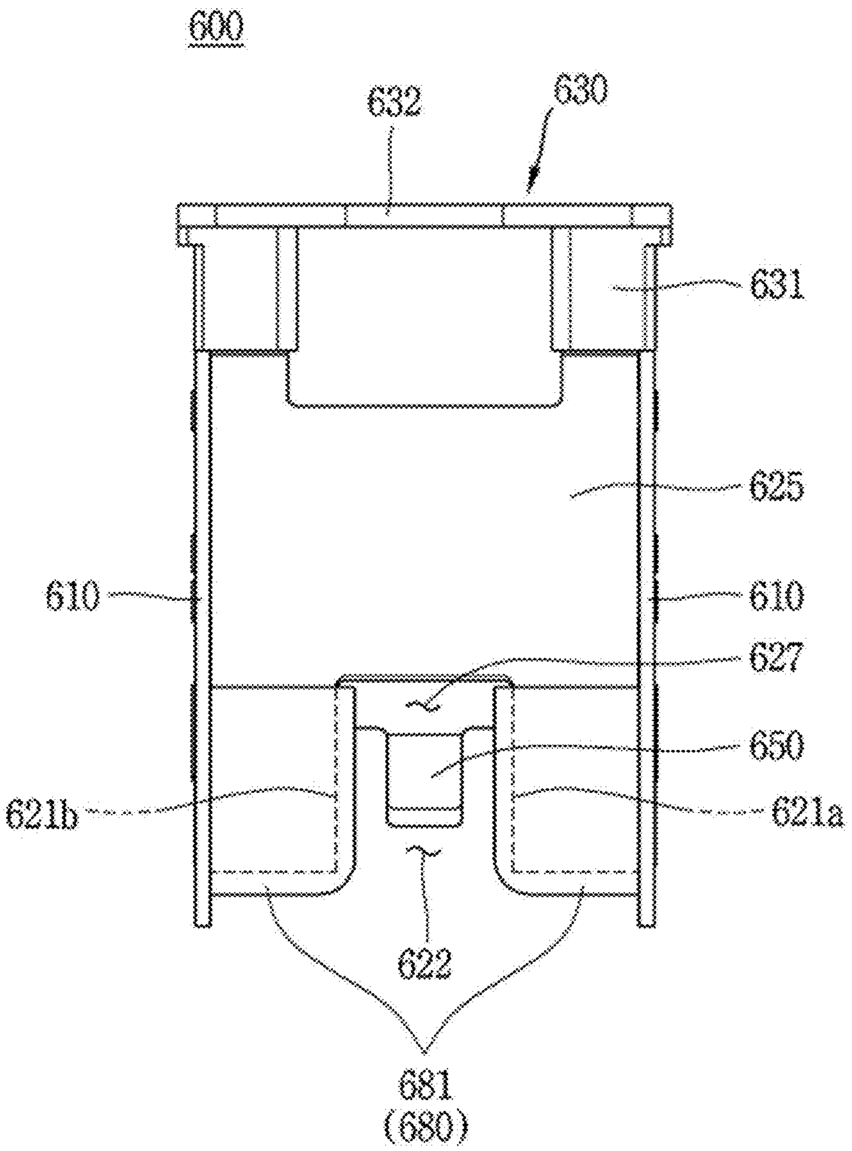
FIG. 24 is a front view illustrating an exemplary embodiment of the arc extinguishing unit shown in FIG. 21.
Figure 25:
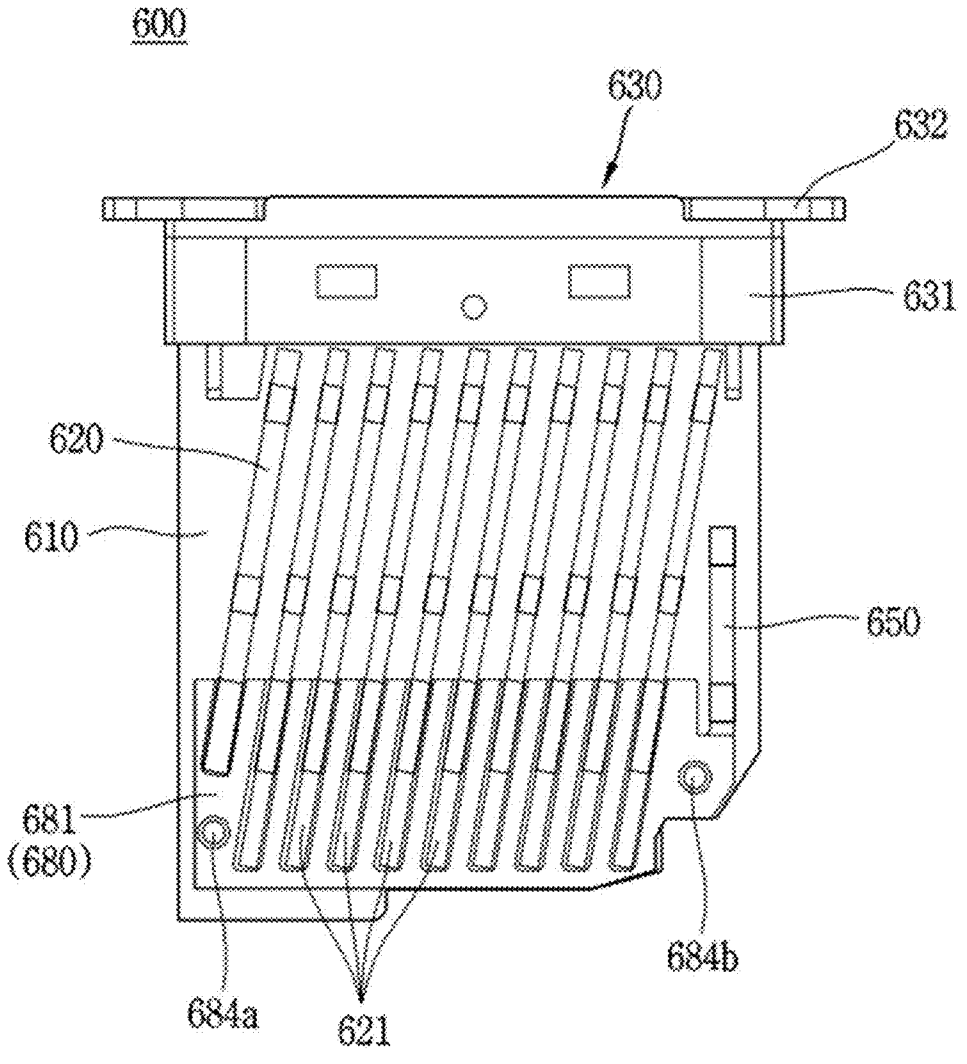
FIG. 25 is a side view illustrating an exemplary embodiment of the arc extinguishing unit shown in FIG. 21.
Figure 26:
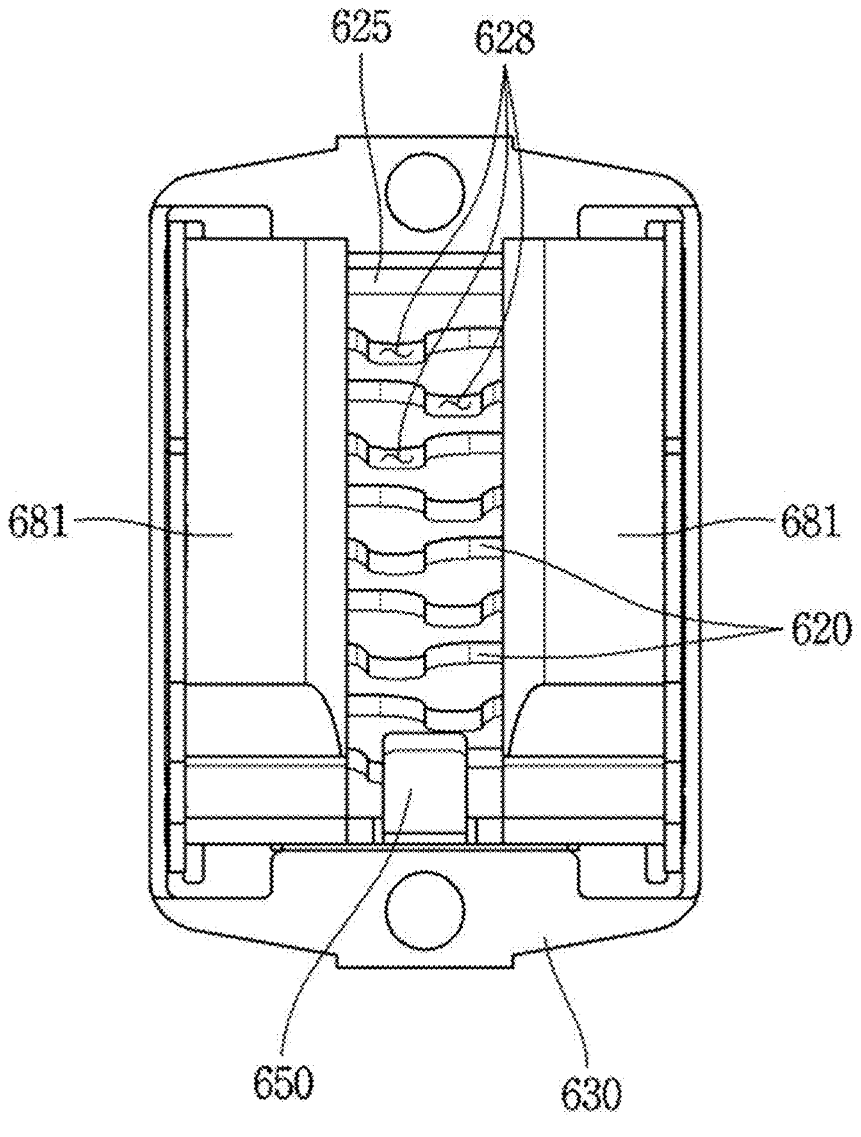
FIG. 26 is a bottom view illustrating an exemplary embodiment of the arc extinguishing unit shown in FIG. 21.

The insertion groove 682 is formed concavely into the body 681 so that the grid leg 621 extending from the grid 620 can be inserted. Referring to FIGS. 22 and 24, the insertion groove 682 may be formed so that most of the length of the grid leg 621 is inserted.

The insertion groove 682 may be formed obliquely so that the grid leg 621 can be inserted at an angle formed with respect to the side plate 610 according to the arrangement direction of the grid 620. In addition, the insertion groove 682 may be formed such that the grid leg 626 of the outermost grid 625 can also be inserted.

All of the grid legs 621 of the plurality of grids 620 are inserted into the insertion groove 682, and at the same time, the first protective part 680 is coupled to the side plate 610, so that separation of the grid 620 from the side plate 610 due to an impact generated when an arc is applied to the grid 620 can be reduced.

The first protective part 680 spaced apart from each other to face each other may form an air gap A.G between it and the protruding contact 322.

Figure 27:
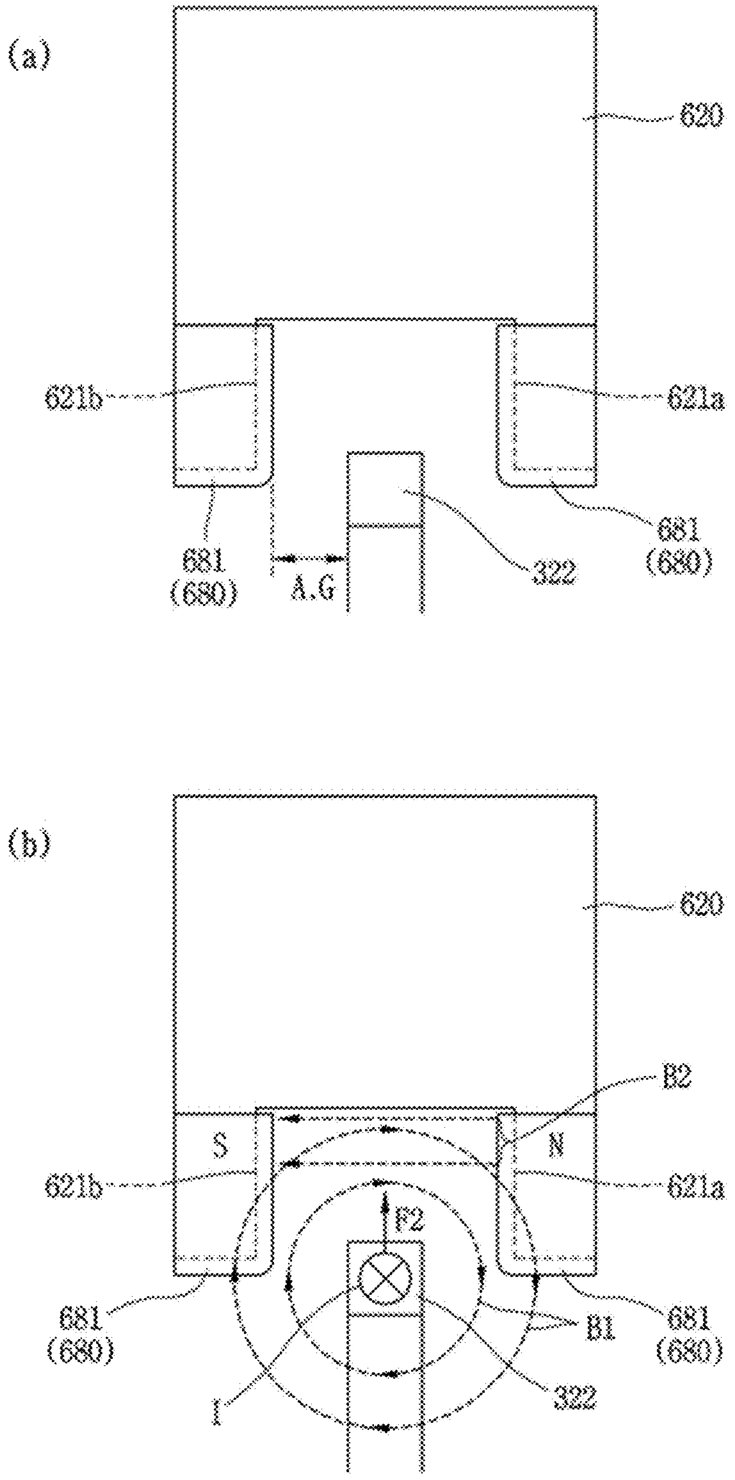
FIGS. 27 to 29 are conceptual views of a magnetic field induced in a grid leg, a magnetic field formed by a magnet unit, and an arc-guided path A.P in an air circuit breaker shown in FIG. 21.

Specifically, referring to FIG. 27(*a*), an air gap A.G is formed between the first protective part 680 and the protruding contact 322.

In this case, the length of the air gap A.G is formed shorter than the length of the grid leg 621 surrounded by the first protective part 680 and the protruding contact 322. That is, since the first protective part 680 is disposed, the length of the air gap A.G between the first protective part 680 and the protruding contact 322 is formed shorter than the length of the existing air gap A.G between the grid leg 621 and the protruding contact 322.

Through this, the space in which the arc is generated is reduced, and the pressure generated due to the generation of the arc increases, thereby increasing the rising force for the generated arc to rise.

Meanwhile, the first protective part 680 may further include a mounting portion 683 protruding downward from the arc runner 650 and having coupling grooves 684*a* and 684*b* into which a coupling member for coupling with the side plate 610 can be inserted.

Referring to FIGS. 23 and 31, the mounting portion 683 protrudes downward from the arc runner 650. The mounting portion 683 may protrude to both sides. The mounting portion 683 may support the arc runner 650 at a lower portion of the arc runner 650. Accordingly, when an arc is applied to the arc runner 650 and the arc runner 650 is subjected to an impact, the impact applied to the arc runner 650 may be transmitted along the mounting portion 683. Since the mounting portion 683 absorbs such an impact, the arc runner 650 can be supported so that the arc runner 650 can be firmly supported by the side plate 610.

According to an embodiment of the present disclosure, the first protective part 680 may surround the plurality of grid legs 621 and be coupled to the side plate 610 to protect the grid leg 621 from an arc that is generated and to further reduce the separation of the grid 620 from the side plate 610 when an arc is applied to the grid 620. In addition, the first protective part 680 forms an air gap A.G between the protruding contact 322 and the first protective part 680, thereby increasing the pressure in the space where the arc is generated, thereby increasing the rising force of the generated arc.

Referring to FIG. 6, an outermost grid 625 having a relatively short length may be included among the grids. The outermost grid 625 is a grid disposed closest to the fixed contact 311 among a plurality of grids.

By forming the length of the outermost grid 625 shorter, it is possible to secure a space required for contacting and separating the fixed contact terminal 310 and the movable contact terminal 320 disposed adjacent to the outermost grid 625 or a space required for arranging various components for inducing an arc.

The outermost grid 625 may also be provided with a grid leg 626. The grid leg 626 of the outermost grid 625 may be formed to be shorter than the grid leg 621 of the grid 620. A grid leg groove 627 may be formed between the grid legs 626 of the outermost grid 625.

(9) Description of the Magnet Unit 500

Figure 19:
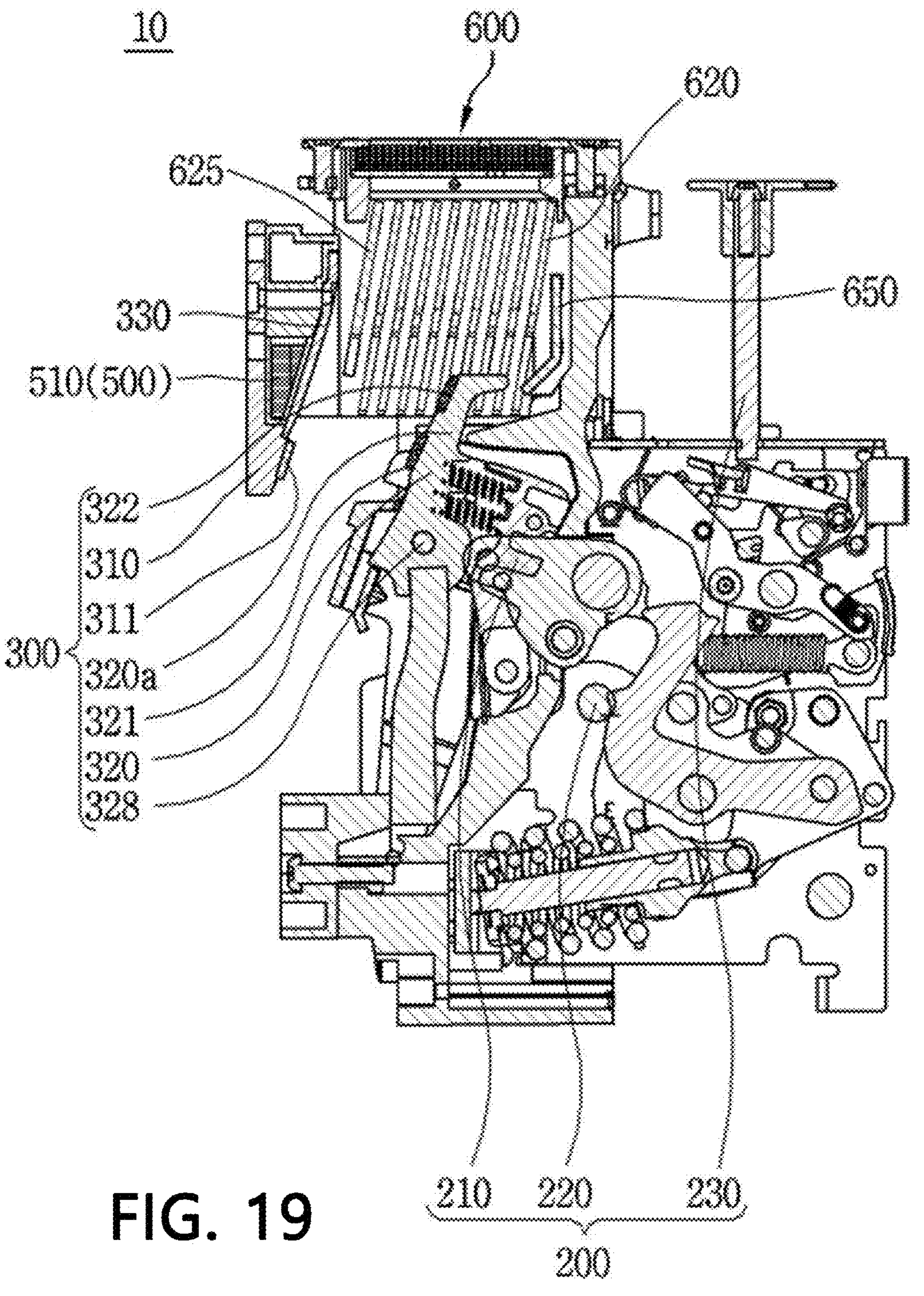
FIG. 19 is a cross-sectional view illustrating a state in which a rear cover is removed from an air circuit breaker in which a magnet unit is additionally disposed according to another exemplary embodiment of the present disclosure.
Figure 20:
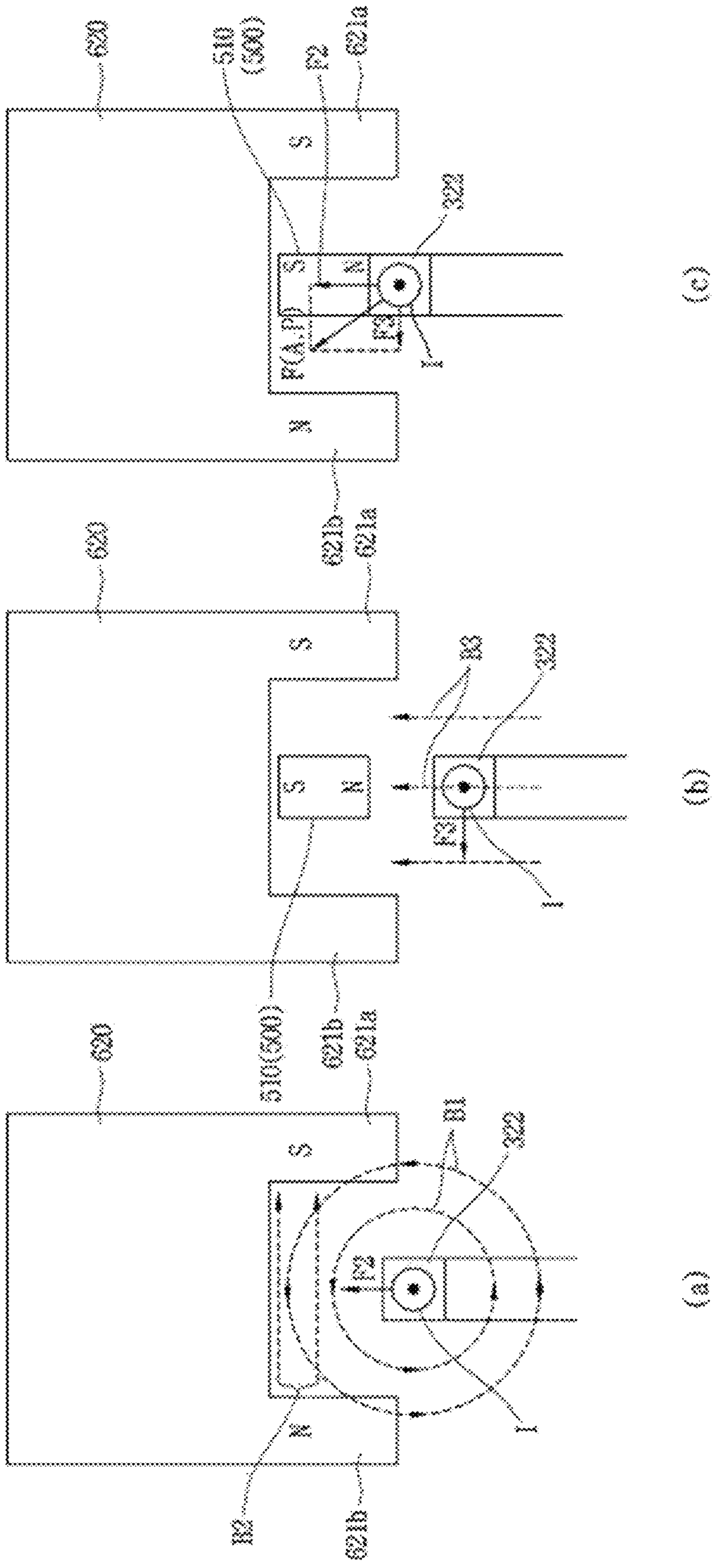
FIG. 20 is a conceptual view of a magnetic field induced in a grid leg, a magnetic field formed by a magnet unit, and an arc-guided path A.P of an arc according to FIG. 19.
Figure 21:
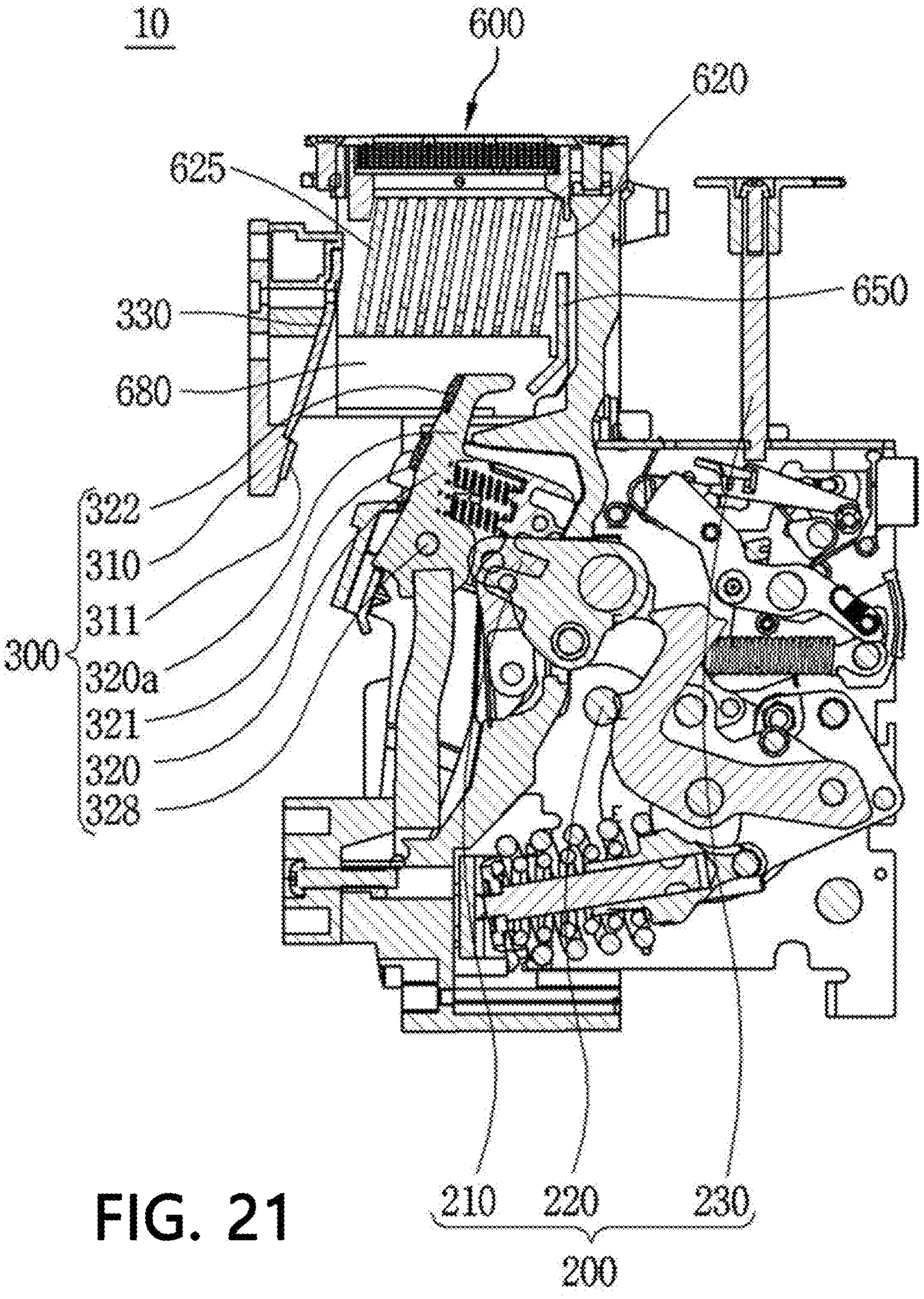
FIG. 21 is a cross-sectional view illustrating a state in which a rear cover is removed from an air circuit breaker in which a first protective part is additionally disposed according to another exemplary embodiment of the present disclosure.

Referring to FIGS. 19 to 20, the circuit breaking unit 300 according to an embodiment of the present disclosure may further include a magnet unit 500.

Referring to FIG. 19, the magnet unit 500 is disposed between the low runner 330 and the fixed contact terminal 310. The magnet unit 500 may be formed to fill a space part formed between the low runner 330 and the fixed contact terminal 310.

In another embodiment, the magnet unit 500 may be formed such that a portion of the space part between the low runner 330 and the fixed contact terminal 310 is empty. Specifically, when the space part is formed in a shape other than a rectangular hexagon, the magnet 510 filled in the space part may be formed in a rectangular hexagon shape. Accordingly, an empty space may be partially formed in the space part, filled with the magnet 510, between the low runner 330 and the fixed contact terminal 310.

Meanwhile, in another embodiment of the present disclosure, the magnet unit 500 may protrude and extend toward either of the two side directions of the low runner 330. Specifically, the magnet 510 of the magnet unit 500 may be wider than the width of the low runner 330. Accordingly, the intensity of the magnetic field M.F applied to the magnetic field area M.F.A may be increased.

In addition, in another embodiment of the present disclosure, the magnet unit 500 may protrude and extend toward the front of the low runner 330. That is, the magnet 510 of the magnet unit 500 may be wider than the width of the low runner 330 and may extend and protrude in a forward direction of the low runner 330, that is, in a direction toward the movable contact 321. Through this, as the distance between the magnet 510 and the magnetic field area M.F.A decreases, the intensity of the magnetic field M.F applied to the magnetic field area M.F.A may be increased.

Thus, the intensity of the magnetic field M.F forming the arc-guided path A.P may be enhanced. As a result, since the intensity of the electromagnetic force is also strengthened, the generated arc can be rapidly moved toward the arc extinguishing unit 600 along the arc-guided path A.P and extinguished.

However, in the above-described embodiment, in the magnet unit 500 protruding from the side of the low runner 330 or toward the front surface of the low runner 330, the protruding length toward the side of the low runner 330 or the protruding degree toward the front surface of the low runner 330 may be adjusted so as not to interfere with the grid 620 or the movable contact terminal 320.

Referring to FIG. 20(*b*), the magnet unit 500 forms a magnetic field M.F between the fixed contact 311 and the movable contact 321. The magnetic field formed by the magnet unit 500 may apply electromagnetic force to the arc to guide to the outside the path of the arc generated when the fixed contact 311 and the movable contact 321 are separated.

The magnetic field area formed by the magnet unit 500 may be between the fixed contact 311 and/or the low runner 330 and the movable contact 321. However, this is only an area set up to help to understand. That is, it means a space in which the magnetic field M.F formed by the magnet unit 500 directly affects the arc in the path where the arc is formed.

Magnet 510 includes a first surface and a second surface. The magnet 510 includes a first surface magnetized to the N pole and a second surface magnetized to the S pole, disposed on opposite sides of each other, and the first surface may be disposed in a direction adjacent to the fixed contact 311.

Specifically, referring to the drawings, the first surface magnetized to the N pole may be disposed toward the lower side, and the second surface magnetized to the S pole may be disposed toward the upper side.

Thus, the direction of the magnetic field M.F. may be formed in a direction in which lines of magnetic force come out from the first surface and enter the second surface. Specifically, referring to FIG. 20(*b*), the direction of the magnetic field M.F. may be formed in a direction from the bottom to the top in the arc-generation area. Through this arrangement, the magnetic field M.F applied to the magnetic field area generated by the magnet unit 500 may be directed upward.

(10) Description of the Arc-Guided Path A.P by Magnetic Field

Referring to FIGS. 16 to 20 and FIGS. 38 to 40, a magnetic field formed in the circuit breaking unit 300, electromagnetic force applied to the arc, and an arc-guided path A.P will be described below.

In the following description, the part marked with "⊙" means that the current (arc) flows in a direction of coming out of the paper. In addition, the part marked with "ⓧ" means that the current (arc) flows in a direction of entering toward the paper.

DC air circuit breaker 10 according to an embodiment of the present disclosure breaks direct current flowing from the movable contact 321 (the protruding contact 322) to the fixed contact 311 (the low runner 330), or vice versa. Therefore, the arc generated when tripped is also formed in the same direction as the energized direction.

Referring to FIG. 16, in a trip state in which the fixed contact 311 and the movable contact 321 are spaced apart from each other, a magnetic field area M.F.A in which an electromagnetic force is applied to an arc generated is formed in a space between the low runner 330 and the protruding contact 322 and a space below the grid 620.

The magnetic field area M.F.A may include a magnetic field formed by a permanent magnet and a magnetic field formed by a ferromagnetic body (grid leg 621) disposed around an area where an arc is generated.

For example, the magnetic field affecting the arc may be a magnetic field formed by the magnet unit 500. The magnetic field formed by the magnet unit 500, that is, by a permanent magnet, may form a direction of a magnetic field coming out of the N pole and entering the S pole. With this magnetic field, the arc may be subjected to an electromagnetic force due to the Lorentz force.

In addition, the ferromagnetic body disposed around the area where the arc is generated may be induced to form a magnetic field in a direction obstructing the magnetic field caused by the current of the generated arc. This can be referred to as an induced magnetic field of a ferromagnetic body.

The arc may be subjected to an electromagnetic force by Lorentz force by a magnetic field formed by a permanent magnet or an induced magnetic field by a ferromagnetic body.

The direction of the electromagnetic force received by the generated arc can be explained by Fleming's left-hand rule. According to Fleming's left-hand rule, when you point the third finger in the direction of the current (I) and the second finger in the direction of the magnetic field (B), the direction of the thumb is the direction of the electromagnetic force (F). Here, the angle between each finger should be a right angle.

At this time, according to Fleming's left-hand rule, the arc may move along the direction of the electromagnetic force received by the arc. This motion of the arc may be referred to as an arc-guided path (A.P).

Figure 17:
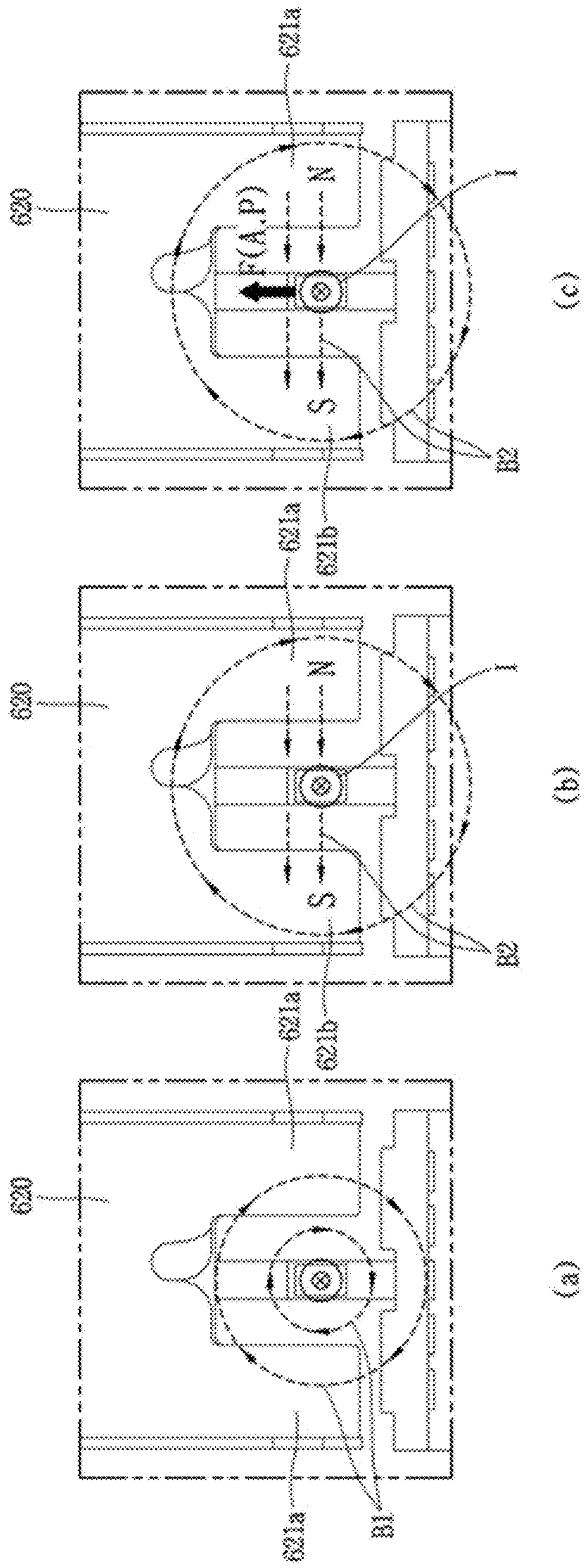
FIGS. 17 and 18 are conceptual views of a magnetic field guided to a grid leg and an arc-guided path A.P of an arc according to an exemplary embodiment of the present disclosure.

Referring to FIG. 17, a magnetic field is induced in the grid leg 621 by an arc generated under the arc extinguishing unit 600, and this is a diagram for explaining the direction in which an electromagnetic force by the magnetic field induced in the grid leg 621 is applied to the generated arc.

Referring to FIG. 17, the direction of the current of the arc generated when the air circuit breaker 10 is tripped flows from the movable contact 321 (the protruding contact 322) toward the fixed contact 311 (the low runner 330). That is, the current (arc) is formed in a direction of entering toward the paper.

In this case, when considering the current direction of the arc, a magnetic field B1 is formed in a direction surrounding the arc generated by Ampere's right-handed screw rule, that is, in a clockwise direction with respect to the drawing.

A magnetic field B2 induced in a direction obstructing the magnetic field B1 generated by the arc is generated in the grid leg 621. At this time, instantaneously, the first grid leg 621*a* may be magnetized to the N pole, and the second grid leg 621*b* may be magnetized to the S pole.

And, by the induced magnetic field B2, the arc is subjected to an electromagnetic force F toward the arc extinguishing unit 600, i.e., the upper side, according to Fleming's left-hand rule. In this case, the arc-guided path A.P is toward the same upper side as the direction of the electromagnetic force F, and accordingly, the generated arc can be quickly applied to the grid 620.

Figure 18:
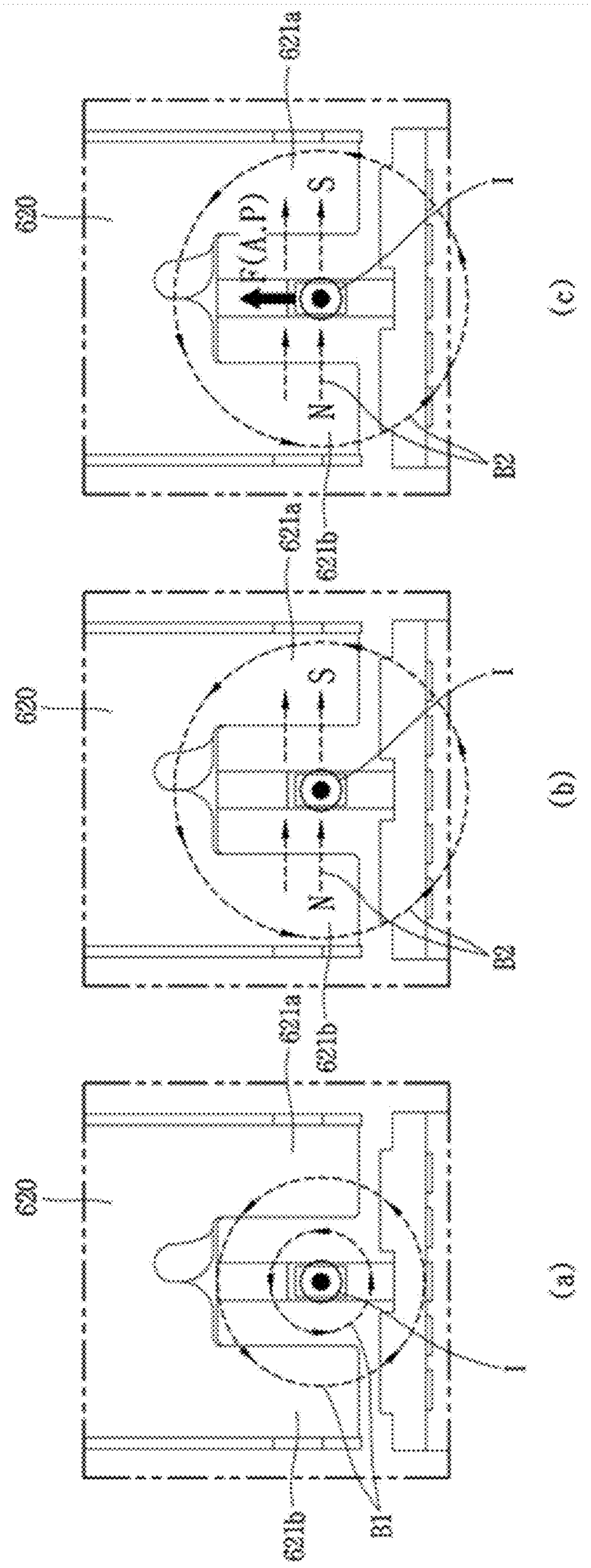

Referring to FIG. 18, the direction of the current of the arc generated when the air circuit breaker 10 is tripped flows from the fixed contact 311 (the low runner 330) toward the movable contact 321 (the protruding contact 322). That is, the current (arc) is formed in a direction of coming out of the paper.

In this case, when considering the current direction of the arc, a magnetic field B1 is formed in a direction surrounding the arc generated by Ampere's right-handed screw rule, that is, in a counterclockwise direction with respect to the drawing.

A magnetic field B2 induced in a direction obstructing the magnetic field B1 generated by the arc is generated in the grid leg 621. At this time, instantaneously, the second grid leg 621*b* may be magnetized to the N pole, and the first grid leg 621*a* may be magnetized to the S pole.

By the magnetic field B2 induced in the grid leg 621, the arc is subjected to an electromagnetic force F toward the arc extinguishing unit 600, i.e., the upper side, according to Fleming's left-hand rule. In this case, the arc-guided path A.P is toward the same upper side as the direction of the electromagnetic force F, and accordingly, the generated arc can be quickly applied to the grid 620.

The arc extinguishing unit 600, the circuit breaking unit and the air circuit breaker 10 including the same according to an embodiment of the present disclosure form an arc-guided path A.P upward, regardless of the direction of the current, through the electromagnetic force applied to the arc by the magnetic field induced in the grid leg 621. Accordingly, an arc may be applied toward the grid 620 and extinguished more quickly.

Meanwhile, referring to FIG. 19, a magnet unit 500 may be further disposed on the rear surface of the low runner. In this case, the N pole of the magnet unit 500 is disposed in a direction toward the fixed contact, and the S pole is disposed in a direction away from the fixed contact.

Referring to FIG. 20(*a*), a magnetic field is induced in the grid leg 621 by an arc generated under the arc extinguishing unit 600. In this case, the direction of the current of the arc generated when the air circuit breaker 10 is tripped flows from the fixed contact 311 (the low runner 330) toward the movable contact 321 (the protruding contact 322). That is, the current (arc) is formed in a direction of coming out of the paper.

A magnetic field B2 induced in a direction obstructing the magnetic field B1 generated by the arc is generated in the grid leg 621. At this time, instantaneously, the second grid leg 621*b* may be magnetized to the N pole, and the first grid leg 621*a* may be magnetized to the S pole.

By the magnetic field B2 induced in the grid leg 621, the arc is subjected to an electromagnetic force F2 toward the arc extinguishing unit 600, i.e., the upper side, according to Fleming's left-hand rule.

Referring to FIG. 20(*b*), a magnetic field B3 formed by the magnet unit 500 is displayed. The arc may be subjected to an electromagnetic force due to the magnetic field B3 formed by the magnet unit 500.

Specifically, the magnetic field B3 formed by the magnet unit 500 is in an upward direction, that is, a direction toward the arc extinguishing unit 600 disposed on the upper side with respect to the arc.

According to Fleming's left-hand rule in consideration of the current direction of the arc and the direction of the magnetic field B3 formed by the magnet unit 500, the arc is subjected to an electromagnetic force F3 in the left direction. That is, the direction of the electromagnetic force F3 received by the arc by the magnetic field B3 of the magnet unit 500 is the leftward direction.

Referring to FIG. 20(*c*), the net force of the electromagnetic force applied to the arc is a resultant force F of the electromagnetic force F2 by the magnetic field B2 induced by the grid leg 621 and the electromagnetic force F3 by the magnetic field B3 by the magnet unit 500. That is, an arc-guided path A.P applied to the arc may be formed in a direction toward the upper left side.

As the electromagnetic force is applied to the arc to move along the arc-guided path A.P, the arc may be applied toward the grid 620 or the grid leg 621 of the arc extinguishing unit 600.

Referring to FIG. 27, a magnetic field is induced in the grid leg 621 by an arc generated under the arc extinguishing unit 600, and this is a diagram for explaining the direction in which an electromagnetic force by the magnetic field induced in the grid leg 621 is applied to the generated arc.

Referring to FIG. 27(*b*), the direction of the current of the arc generated when the air circuit breaker 10 is tripped flows from the movable contact 321 (the protruding contact 322) toward the fixed contact 311 (the low runner 330). That is, the current (arc) is formed in a direction of entering toward the paper.

In this case, when considering the current direction of the arc, a magnetic field B1 is formed in a direction surrounding the arc generated by Ampere's right-handed screw rule, that is, in a clockwise direction with respect to the drawing.

A magnetic field B2 induced in a direction obstructing the magnetic field B1 generated by the arc is generated in the grid leg 621. At this time, instantaneously, the first grid leg 621*a* may be magnetized to the N pole, and the second grid leg 621*b* may be magnetized to the S pole.

And, by the induced magnetic field B2, the arc is subjected to an electromagnetic force F2 toward the arc extinguishing unit 600, i.e., the upper side, according to Fleming's left-hand rule. In this case, the arc-guided path A.P is toward the same upper side as the direction of the electromagnetic force F, and accordingly, the generated arc can be quickly applied to the grid 620.

Figure 28:
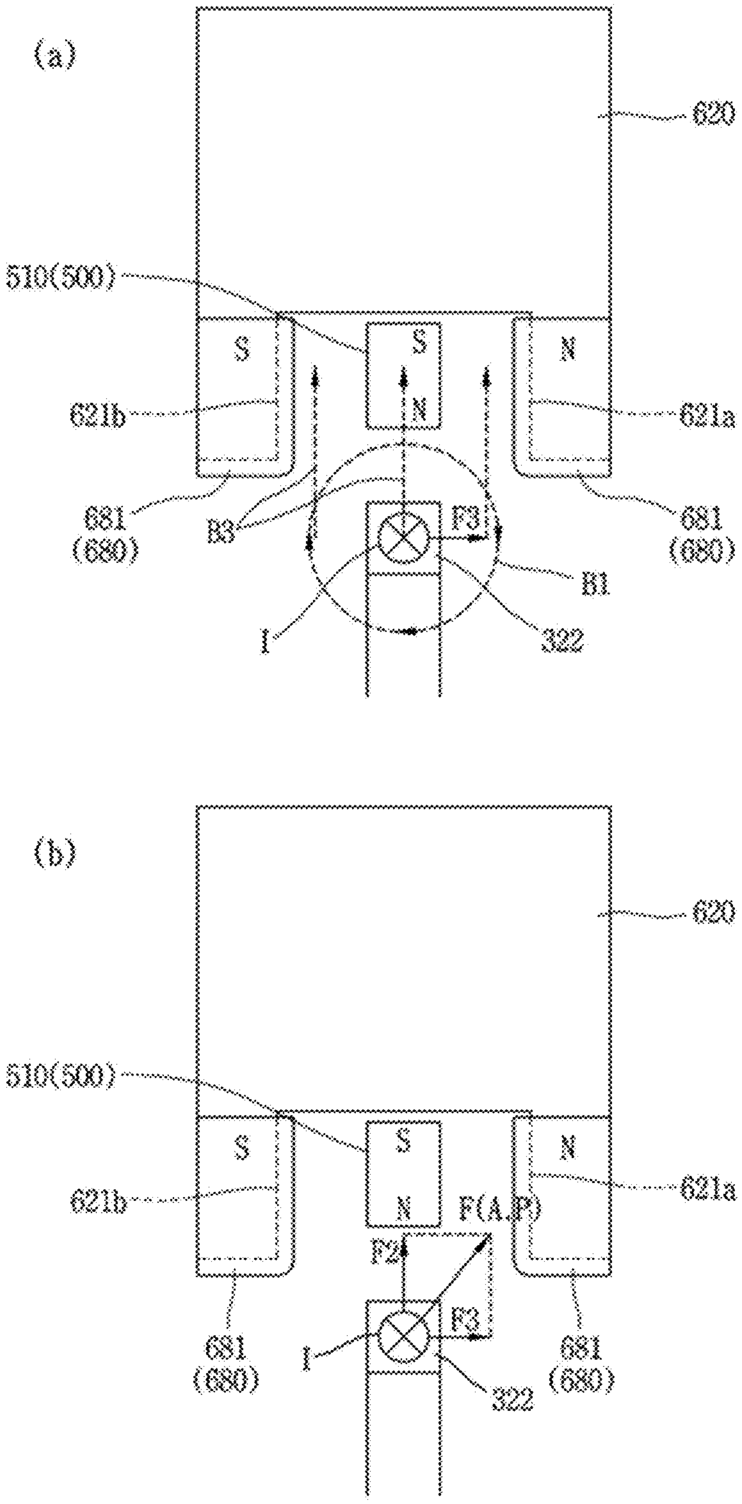

Meanwhile, referring to of FIG. 28(*a*) according to another embodiment, a magnet unit 500 may be additionally disposed on the rear surface of the low runner 330. The magnetic field B3 formed by the magnet unit 500 is in an upward direction, that is, a direction toward the arc extinguishing unit 600 disposed on the upper side with respect to the arc.

According to Fleming's left-hand rule in consideration of the current direction of the arc (the direction of entering toward the paper) and the direction of the magnetic field B3 formed by the magnet unit 500, the arc is subjected to an electromagnetic force F3 in the right direction. That is, the direction of the electromagnetic force F3 received by the arc by the magnetic field B3 of the magnet unit 500 is the rightward direction.

And, referring to FIG. 28(*b*), the net force of the electromagnetic force applied to the arc is a resultant force F of the electromagnetic force F2 by the magnetic field B2 induced by the grid leg 621 and the electromagnetic force F3 by the magnetic field B3 by the magnet unit 500. That is, an arc-guided path A.P applied to the arc may be formed in a direction toward the upper right side.

As the electromagnetic force is applied to the arc to move along the arc-guided path A.P, the arc may be applied toward the grid 620 or the grid leg 621 of the arc extinguishing unit 600.

In addition, as described above, by forming the air gap A.G between the protruding contact 322 and the first protective part 680, the pressure applied to the generated arc increases, so that a force for the arc to rise toward the arc extinguishing unit 600 is generated.

Therefore, the force applied to the arc is the electromagnetic force F2 due to the magnetic field induced in the grid leg 621, the electromagnetic force F3 due to the magnetic field of the magnet unit 500, and the rising force due to the pressure caused by the air gap A.G. Accordingly, the arc can be more easily applied to the arc extinguishing unit 600 and the grid 620.

Figure 29:
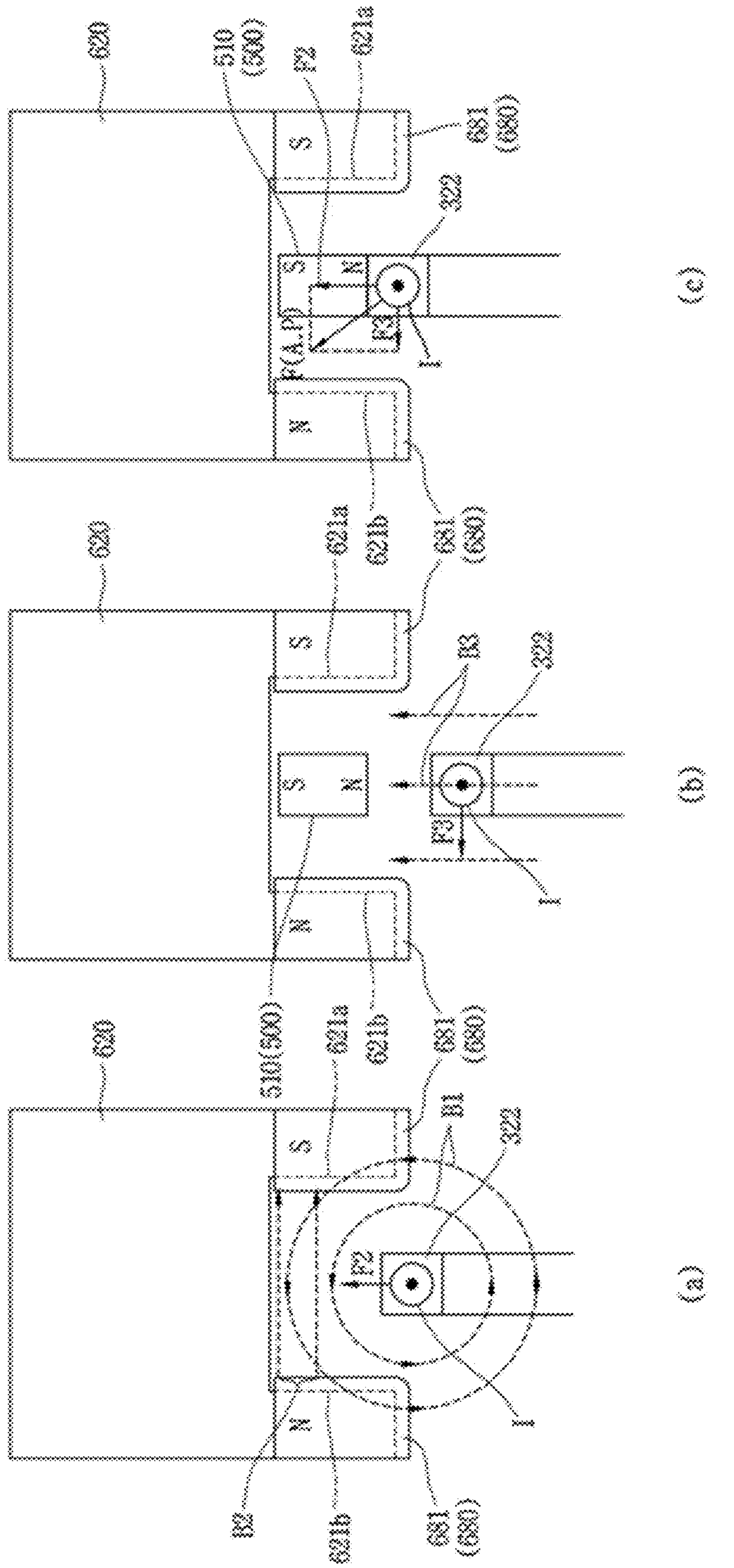
Figure 30:
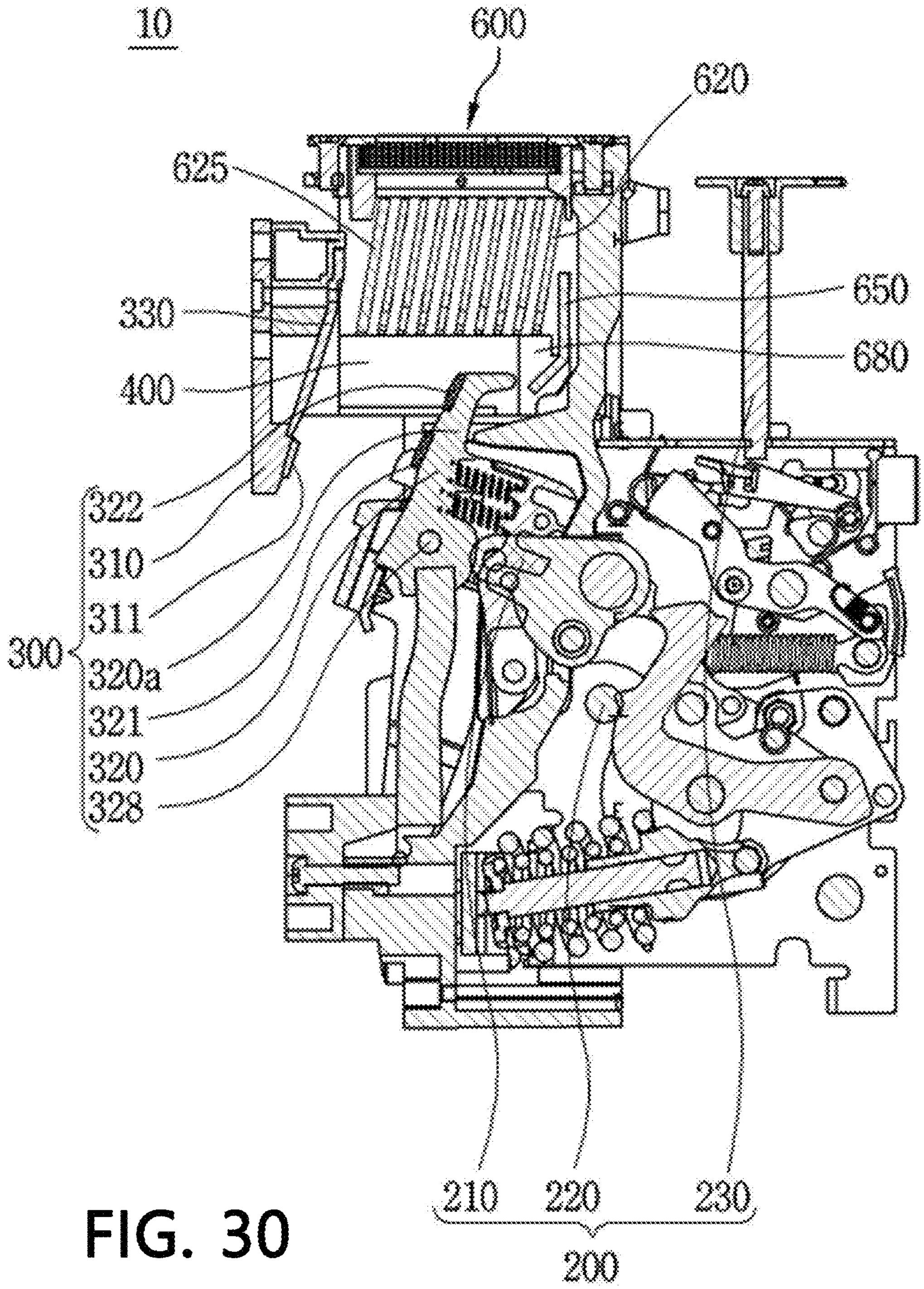
FIG. 30 is a cross-sectional view illustrating a state in which a rear cover is removed from an air circuit breaker in which a U assembly is additionally disposed according to another exemplary embodiment of the present disclosure.

FIG. 29(*a*) shows a magnetic field applied to the grid leg and an electromagnetic force applied to the arc when the arc is formed in a direction coming out of the paper.

A magnetic field is induced in the grid leg 621 by the arc generated under the arc extinguishing unit 600. The direction of the current of the arc generated when the air circuit breaker 10 is tripped flows from the fixed contact 311 (the low runner 330) toward the movable contact 321 (the protruding contact 322). That is, the current (arc) is formed in a direction of coming out of the paper.

In this case, when considering the current direction of the arc, a magnetic field B1 is formed in a direction surrounding the arc generated by Ampere's right-handed screw rule, that is, in a counterclockwise direction with respect to the drawing.

A magnetic field B2 induced in a direction obstructing the magnetic field B1 generated by the arc is generated in the grid leg 621. At this time, instantaneously, the second grid leg 621*b* may be magnetized to the N pole, and the first grid leg 621*a* may be magnetized to the S pole.

By the magnetic field B2 induced in the grid leg 621, the arc is subjected to an electromagnetic force F2 toward the arc extinguishing unit 600, i.e., the upper side, according to Fleming's left-hand rule.

And, FIG. 29(*b*) shows a magnetic field generated by the magnet unit 500 disposed on the rear surface of the low runner 330 and an electromagnetic force applied to the arc according to the magnetic field.

The magnetic field B3 formed by the magnet unit 500 is in an upward direction, that is, a direction toward the arc extinguishing unit 600 disposed on the upper side with respect to the arc.

According to Fleming's left-hand rule in consideration of the current direction of the arc (the direction of coming out of the paper) and the direction of the magnetic field B3 formed by the magnet unit 500, the arc is subjected to an electromagnetic force F3 in the left direction. That is, the direction of the electromagnetic force F3 received by the arc by the magnetic field B3 of the magnet unit 500 is the leftward direction.

And, referring to FIG. 29(*c*), the net force of the electromagnetic force applied to the arc is a resultant force F of the electromagnetic force F2 by the magnetic field B2 induced by the grid leg 621 and the electromagnetic force F3 by the magnetic field B3 by the magnet unit 500. That is, an arc-guided path A.P applied to the arc may be formed in a direction toward the upper left side.

As the electromagnetic force is applied to the arc to move along the arc-guided path A.P, the arc may be applied toward the grid 620 or the grid leg 621 of the arc extinguishing unit 600.

However, in the above-described embodiment, the magnet unit 500 may not be provided. In this case, an electromagnetic force applied to the arc to the left or to the right depending on the direction of the current of the arc may not be generated. Accordingly, in case the magnet unit 500 is not provided, the arc can be subjected to the electromagnetic force by the grid leg 621 only upward.

According to an embodiment of the present disclosure, the electromagnetic force received by the arc is directed to the upper right or upper left side by the magnetic field induced by the grid leg 621 and the magnetic field by the magnet unit 500, regardless of the direction of the current of the arc generated during tripping. Accordingly, as the arc is applied to the grid 620, the arc can be quickly extinguished.

Furthermore, according to an embodiment of the present disclosure, the space where the arc generated during tripping is further reduced by the first protective part 680, so that the pressure applied to the generated arc increases.

Therefore, the arc can be applied to the grid 620 more quickly by adding the electromagnetic force by the magnetic field and the rising force by the pressure.

Figure 38:
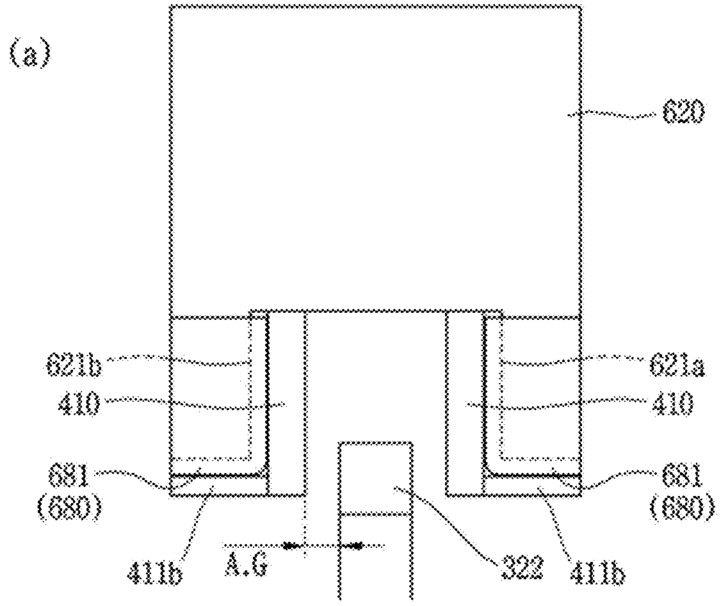
FIGS. 38 to 40 are conceptual views of a magnetic field induced in a grid leg, a magnetic field formed by a magnet unit, and an arc-guided path A.P of an arc in an air circuit breaker shown in FIG. 30.
Figure 38:
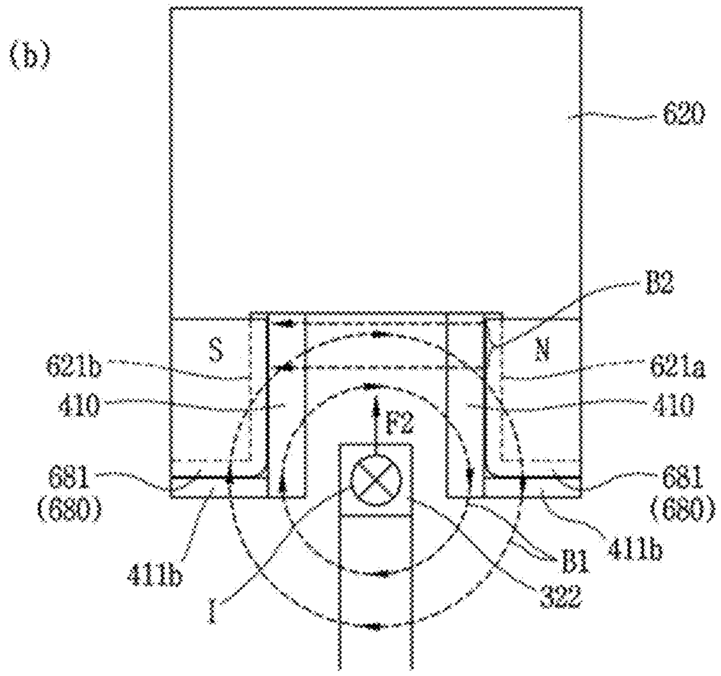
Figure 39:
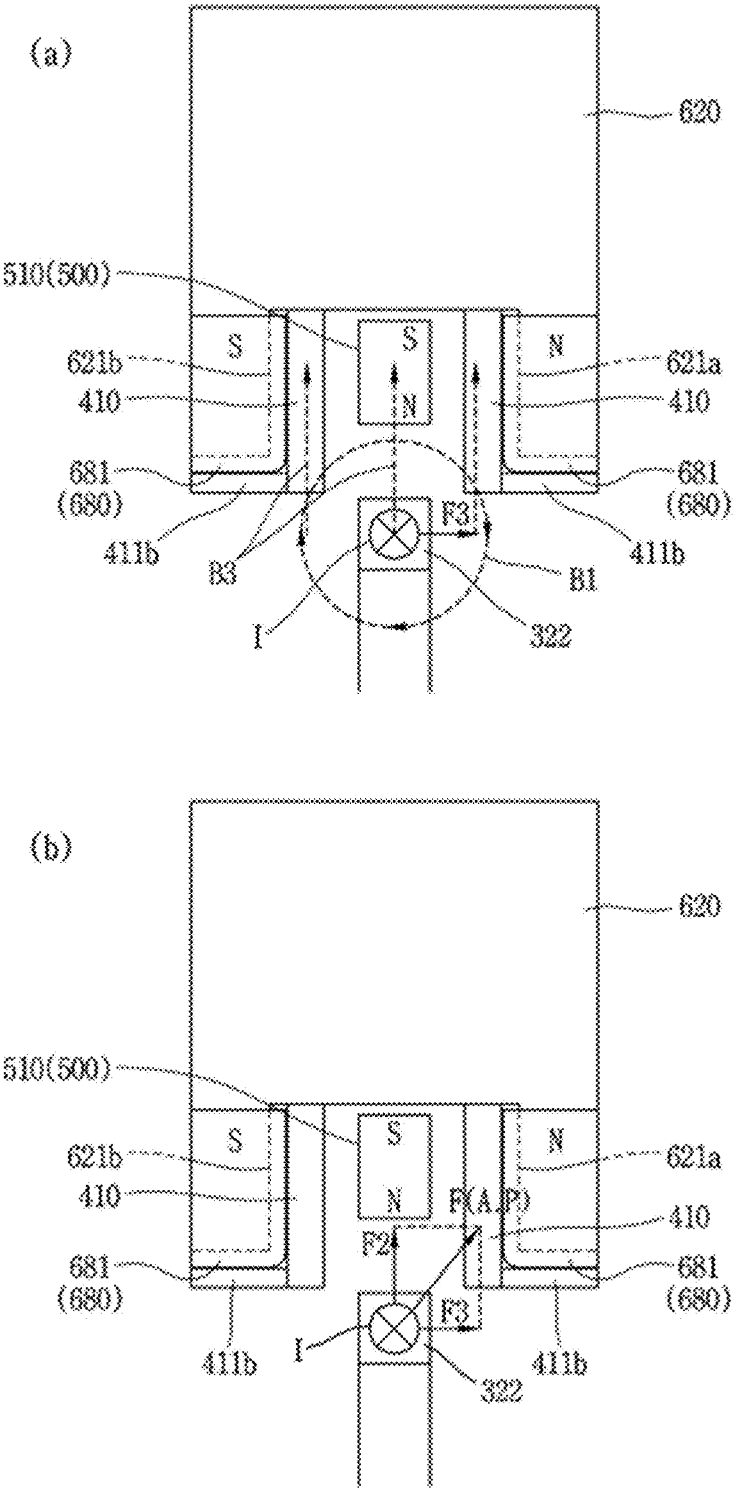
Figure 40:
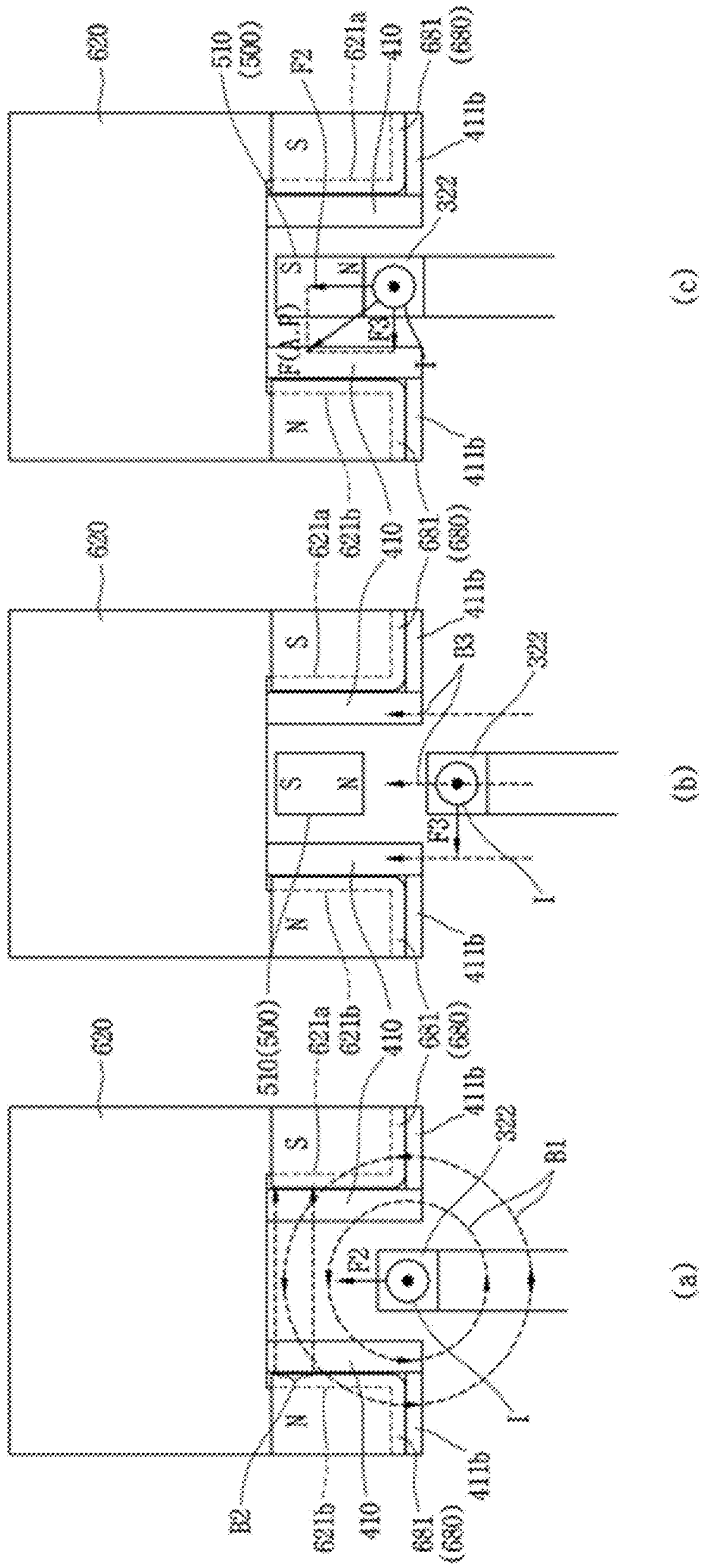
Figure 41:
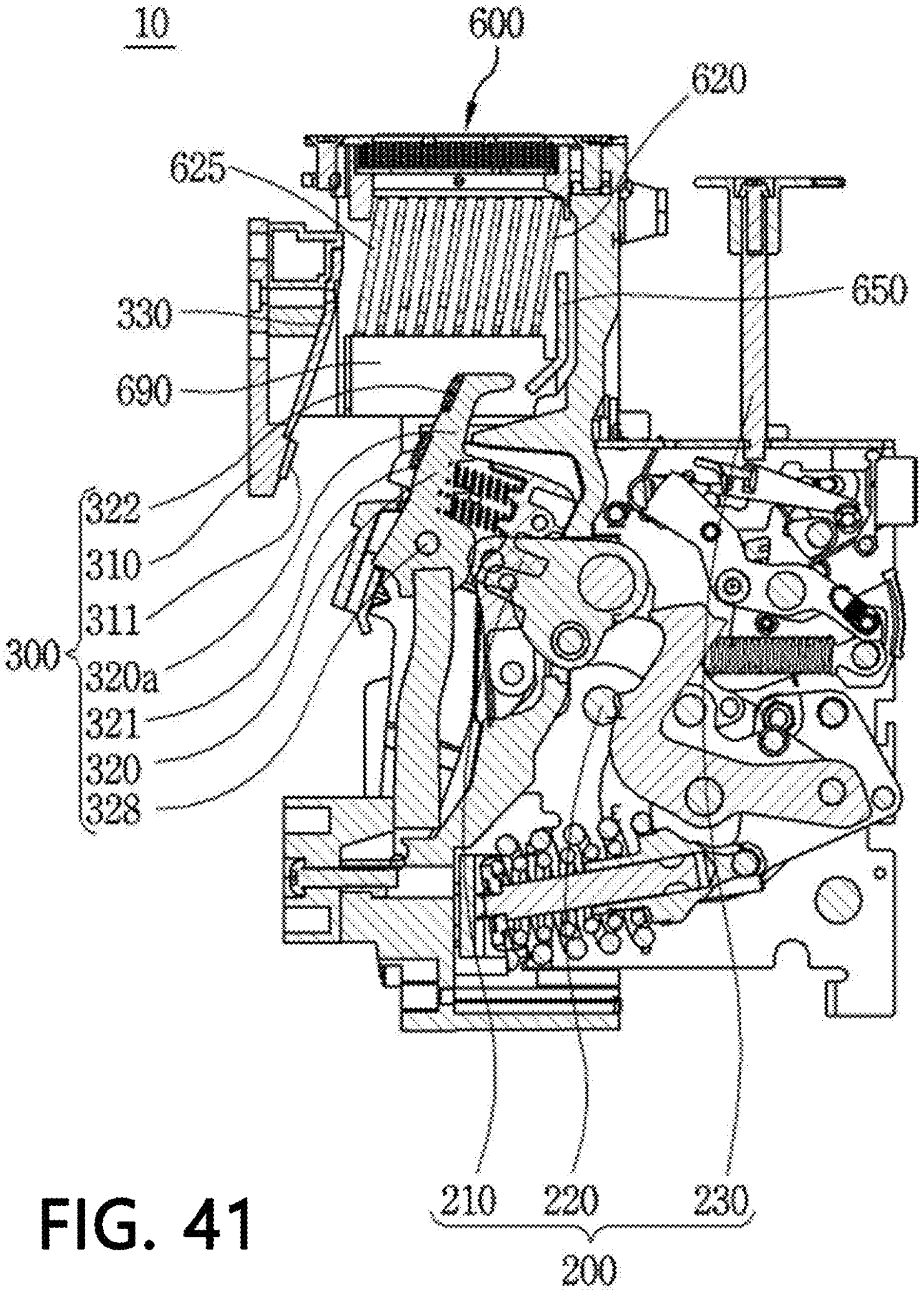
FIG. 41 is a cross-sectional view illustrating a state in which a rear cover is removed from an air circuit breaker in which a first protective part and a second protective part are disposed according to yet another exemplary embodiment of the present disclosure.
Figure 42:
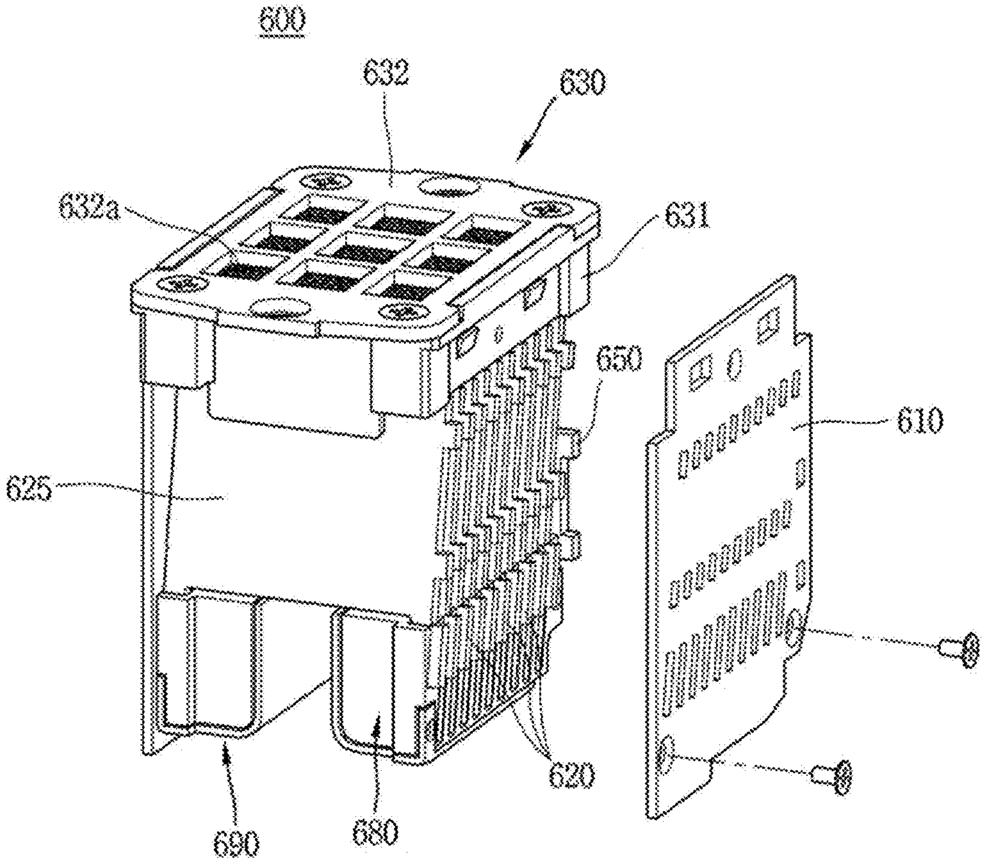
FIGS. 42 and 43 are perspective views illustrating an arc extinguishing unit provided in the air circuit breaker of FIG. 41.

Meanwhile, FIGS. 38 to 40 show the electromagnetic force applied to the arc and the arc-guided path A.P when the U assembly 400 is further included. FIGS. 38 and 39 show cases in which an arc is formed in a direction entering toward the paper. In addition, FIG. 39 shows the magnetic field and the electromagnetic force transmitted to the arc when the magnet unit 500 is additionally provided.

Therefore, in FIGS. 38 and 39, the magnetic field and electromagnetic force are formed in the same direction as that of the above-described FIGS. 27 and 28. That is, the electromagnetic force formed in the arc and the arc-guided path A.P are formed toward the upper right side.

However, in FIGS. 38 and 39, the air gap A.G between the protruding contact 322 and the U assembly 400 is formed shorter than the air gap A.G between the protruding contact 322 and the first protective part 680 in FIGS. 27 and 28 described above.

Therefore, in the arc formed in FIGS. 38 and 39, a greater pressure may be formed in the space where the arc is generated than in the above-described embodiments of FIGS. 27 and 28. Accordingly, the rising force of the arc may be increased.

In addition, FIG. 40 is a case where an arc is formed in a direction coming out of the paper. In addition, FIG. 40(*b*) shows the magnetic field and the electromagnetic force transmitted to the arc when the magnet unit 500 is additionally provided. Therefore, in the embodiment of FIG. 40, the magnetic field and electromagnetic force are formed in the same direction as that of the above-described FIG. 29. That is, the electromagnetic force formed in the arc and the arc-guided path A.P are formed toward the upper left side.

However, in FIG. 40, the air gap A.G between the protruding contact 322 and the U assembly 400 is formed shorter than the air gap A.G between the protruding contact 322 and the first protective part 680 in FIG. 29 described above.

Therefore, in the arc formed in FIG. 40, a greater pressure may be formed in the space where the arc is generated than in the above-described embodiment of FIG. 29. Accordingly, the rising force of the arc may be increased.

(11) An Air Gap (A.G) and Rising Force of Arc

Referring to FIG. 27, in an embodiment of the present disclosure, the protruding contact 322 may protrude from an upper side of the centrally disposed movable contact 321 among the plurality of movable contacts 321.

The protruding contact 322 may form an air gap A.G between the grid leg 621, the first protective part 680, or the U assembly 400 in various embodiments of the present disclosure.

First, the protruding contact 322 is arranged to be surrounded by the grid leg 621 that extends downward from both sides of the grid 620 of the arc extinguishing unit 600. Specifically, referring to FIG. 16, an air gap A.G may be formed between the protruding contact 322 and the grid leg 621.

The air gap A.G means a distance between an arc generated between the protruding contact 322 and the low runner 330 and a component of the arc extinguishing unit 600 or circuit breaking unit 300 adjacent to the arc. In this case, when the length of the air gap A.G is formed short, when an arc is generated, the pressure in the space where the arc is generated increases. Accordingly, the pressure applied to the generated arc increases. Accordingly, a rising force applied toward the arc extinguishing unit 600 may be applied to the arc.

In another embodiment, the protruding contact 322 is disposed to be surrounded by the first protective part 680 surrounding the grid leg 621.

Specifically, referring to FIG. 27, an air gap A.G is formed between the protruding contact 322 and one side surface of the first protective part 680 surrounding the grid leg 621. In this case, the length of the air gap A.G may be shorter than the length of the air gap A.G formed between the grid leg 621 and the protruding contact 322 in the above-described embodiment.

That is, as the length of the air gap A.G is shortened, the pressure applied to the generated arc may be increased. Accordingly, the rising force for the generated arc to rise may be greater.

In yet another embodiment, the protruding contact 322 may be arranged to be surrounded by the U assembly 400 disposed inside the grid leg 621.

Specifically, referring to FIG. 38, an air gap A.G may be formed between the protruding contact 322 and the holder 410 of the U assembly 400. In this case, the grid leg 621 extending below the grid 620, the first protective part 680 surrounding the grid leg 621, and the holder 410 of the U assembly 400 disposed inside the first protective part 680 are disposed.

Accordingly, the length of the air gap A.G between the holder 410 of the U assembly 400 and the protruding contact 322 may be formed shorter than the length of the air gap A.G of the other embodiments described above. Accordingly, as the length of the air gap A.G is shortened, the pressure applied to the generated arc may be increased. Accordingly, the rising force for the generated arc to rise may be greater.

In the present disclosure, by forming an air gap A.G between the protruding contact 322 and the grid leg 621, the first protective part 680 or the U assembly 400, a pressure applied to an arc generated between the protruding contact 322 and the low runner 330 may be increased, and thus a force to rise may be applied to the generated arc.

An air gap A.G is formed in the area where the arc is generated, thereby reducing the space of the arc-generation area, and accordingly, a pressure applied to the generated arc is increased, so that the generated arc may be subjected to a rising force. Accordingly, the arc can be more easily applied to the grid 620 or grid leg 621, so that it can be quickly extinguished.

3. Description of the Air Circuit Breaker 10 According to Another Embodiment of the Present Disclosure Hereinafter, an air circuit breaker 10 according to another exemplary embodiment of the present disclosure will be described with reference to FIGS. 41 to 56.

The air circuit breaker 10 according to the present embodiment includes a cover unit 100, a driving unit 200, a circuit breaking unit 300, a U assembly 400, and an arc extinguishing unit 600.

The cover unit 100, the driving unit 200, and the circuit breaking unit 300 according to the present embodiment have the same structure and function as the cover unit 100, the driving unit 200, and the circuit breaking unit 300 according to the above-described embodiment.

However, the U assembly 400 and the arc extinguishing unit 600 according to the present embodiment have some differences from the U assembly 400 and the arc extinguishing unit 600 according to the above-described embodiment in their structures and functions. Hereinafter, the U assembly 400 and the arc extinguishing unit 600 according to the present embodiment will be described focusing on the above differences.

(1) Description of the U Assembly 400

Referring to FIGS. 50 to 56, the U assembly 400 extends between the arc extinguishing unit 600 and the protruding contact 322. That is, the U assembly 400 goes away from the fixed contact terminal 310 and extends toward the movable contact 321. The U assembly 400 may extend between the second protective part 690 that are disposed to be spaced apart from each other.

Specifically, the U assembly 400 extends between the arc extinguishing unit 600 and the movable contact terminal 320 or between the arc extinguishing unit 600 and the protruding contact 322 in the trip state. That is, the U assembly 400 extends between the arc extinguishing unit 600 and the protruding contact 322 from both sides of the low runner 330. The U assembly 400 may extend to surround a side surface of the protruding contact 322 when the protruding contact 322 is disposed in a trip state.

An air gap A.G, which is a separation space, may be formed between the U assembly 400 and the protruding contact 322.

The holder 410 is inserted between the low runner 330 and the fixed contact terminal 310, has a space formed therein, and protrudes from both sides of the low runner 330.

The holder 410 includes a main body 411. The main body 411 is spaced apart from each other on opposite sides and protrudes in parallel. The above-described protruding contact point 322 may move between the intervals of the main body 411. Thus, an arc may be generated in the interval portion of the main body 411. However, the main body 411 may be extended so as to be farther away or closer to each other.

The main body 411 is formed to surround the second portion 692 of the second protective part 690. Specifically, referring to FIG. 53, the main body 411 is formed to surround the second portion 692 of the second protective part 690 from the protruding contact 322.

Meanwhile, in another embodiment, the U assembly 400 may be provided, but the first protective part 680 and the second protective part 690 surrounding the grid leg 621 may not be provided. In this case, the main body 411 of the U assembly 400 may be formed to surround the side of the grid leg 621.

A side wing portion **411*d* may protrude to the outside of the main body 411. The side wing portion 411*d* may protect the second portion 692 of the second protective part 690 from the rotating movable contact terminal 320**.

Meanwhile, in another embodiment, the U assembly 400 may be provided, but the first protective part 680 and the second protective part 690 surrounding the grid leg 621 may not be provided. In this case, the side wing portion **411*d* may be formed to protect the bottom surface of the grid leg 621**.

Meanwhile, an air gap A.G may be formed between the main body 411 of the holder 410 and the protruding contact 322. Specifically, as shown in FIG. 24, an air gap A.G is formed between the main body 411 of the holder 410 and the protruding contact 322. In this case, the air gap A.G may be formed narrower than the air gap A.G between the second protective part 690 and the protruding contact 322 in the above-described embodiment.

A coupling protrusion 413 may protrude from the rear surface of the main body 411, that is, the central surface of the main body 411 toward the side where the main body 411 is close to the fixed contact terminal 310. The coupling protrusion 413 may be coupled to a coupling groove 433 of the fixing part 430 to couple the holder 410 and the fixing part 430.

The fixing part 430 may be provided between the low runner 330 and the fixed contact terminal 310. Since the fixing part 430 is provided, the holder 410 can be stably coupled to the fixed contact terminal 310.

The fixing part 430 may include a first fixing part 431 and a second fixing part 432.

Specifically, the first fixing part 431 may contact the fixed contact terminal 310 and have a width corresponding to the width of the fixed contact terminal 310. Specifically, as shown in FIG. 33, the width of the fixed contact terminal 310 and the width of the first fixing part 431 may be the same or formed to be the same. Through this, movement of the first fixing part 431 in the left-right direction with respect to the fixed contact terminal 310 can be reduced. In addition, the first fixing part 431 can easily absorb the impact received by the low runner 330.

And, the first fixing part 431 may be formed to surround the lower side surface of the low runner 330.

The second fixing part 432 may be interposed between the first fixing part 431 and the low runner 330. And, the second fixing part 432 may be formed to surround the upper side surface of the low runner 330.

As the second fixing part 432 is formed to surround an upper portion of the low runner 330, as described above, an impact received by the low runner 330 due to contact with and separation from the protruding contact 322 or an impact received when an arc is applied may be absorbed by the second fixing part 432.

A concave portion 4321 may be formed in the second fixing part 432 to surround an upper portion of the low runner 330.

Specifically, the second fixing part 432 has a concave portion 4321 into which the low runner 330 protruding from the fixed contact terminal 310 at a predetermined angle can be inserted.

In this case, one surface forming the concave portion 4321 has a contact surface 4322 in contact with a surface where the upper portion of the low runner 330 faces the fixed contact terminal 310. And, a side surface 4323 may be formed that is perpendicular to the contact surface 4322. A coupling hole 432*a* opened for coupling with the low runner 330 and the fixed contact terminal 310 may be formed in the contact surface 4322.

The second fixing part 432 has a coupling groove 433 formed to be coupled with the coupling protrusion 413 of the main body 411 described above to fix the fixing part 430 to the holder 410.

(2) Description of the Grid 620, the First Protective Part 680 and the Second Protective Part 690

Referring to FIGS. 41 to 49, the grid 620 according to the present embodiment may include a grid leg 621. The grid leg 621 may include a grid leg 621 that extends from at least one end in the width direction and extends downward to surround the protruding contact 322 from both sides.

The grid leg 621 extend downward along the side plate 610. Specifically, the grid leg 621 extends adjacent to the lower end of the side plate 610.

In addition, when the first protective part 680 and the second protective part 690 are not provided, an air gap A.G, which is a separation space, may be formed between the grid leg 621 and the protruding contact 322.

In addition, since the first protective part 680 is surrounded by the second protective part 690 to be described later, damage to the first protective part 680 due to the generated arc can be reduced. Accordingly, the grid leg may be primarily protected by the second protective part 690 and secondarily protected by the first protective part 680. In addition, the first protective part 680 may be protected by the second protective part 690.

Meanwhile, the first protective part 680 may further include an outermost insertion groove 682*a* for accommodating the grid leg of the outermost grid 625.

In this case, the width of the grid leg 626 of the outermost grid 625 may be formed narrower than the width of the grid leg 621 of the other grid 620, and the width of the outermost insertion groove 682*a* may be formed to correspond to the width of the grid leg 626 of the outermost grid 625. That is, the width of the outermost insertion groove 682*a* may be formed shorter than the width of the other insertion grooves 682.

Meanwhile, a concave region 681*c* may be formed in the first protective part 680. Specifically, referring to FIG. 43, a concave region 681*c* may be formed in the first protective part 680 by being recessed in a direction toward the protruding contact 322 of the outermost insertion groove 682*a* disposed in a direction toward the fixed contact 311.

All of the grid legs 621 of the plurality of grids 620 are inserted into the insertion groove 682, and at the same time, the first protective part 680 is coupled to the side plate 610, so that separation of the grid 620 from the side plate 610 due to an impact generated when an arc is applied to the grid 620 can be reduced.

The second protective part 690 spaced apart from each other to face each other may form an air gap A.G between it and the protruding contact 322.

Figure 47:
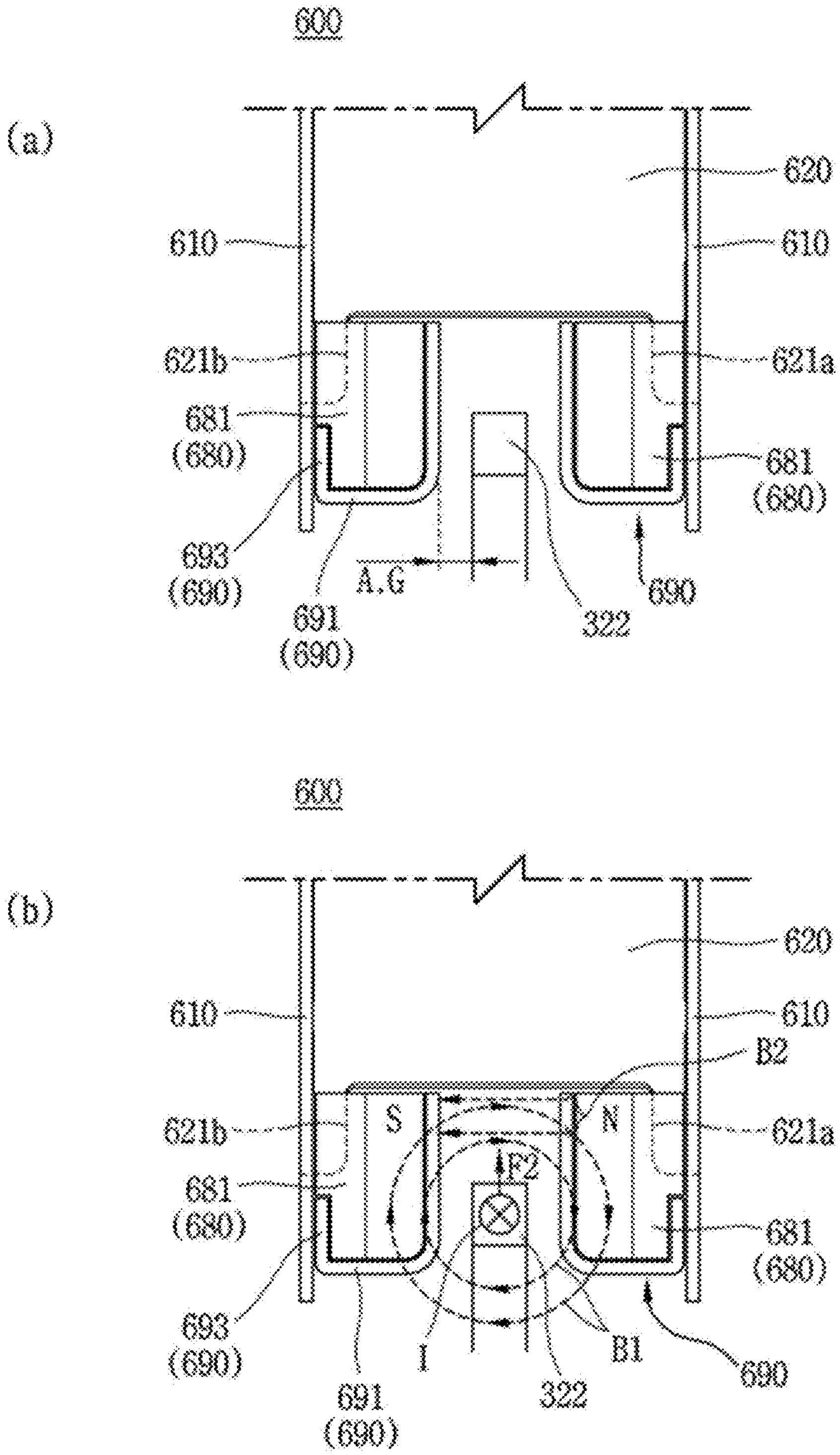
FIG. 47 is a conceptual view of a magnetic field induced in a grid leg and a path along which an arc is guided accordingly, in the air circuit breaker shown in FIG. 41.
Figure 48:
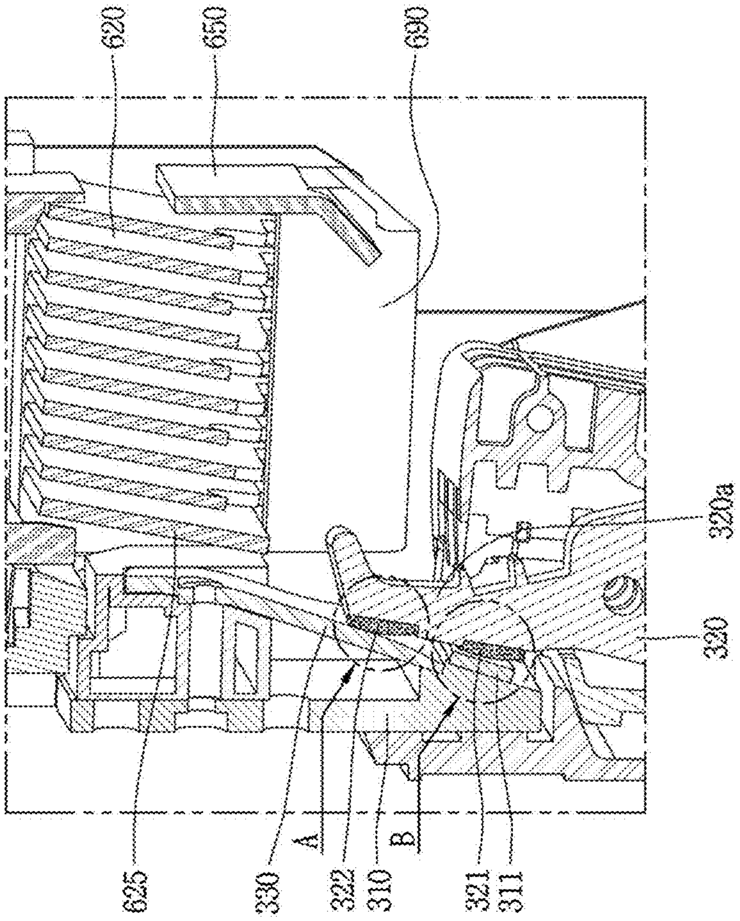
FIG. 48 is a perspective view illustrating the circuit breaking unit and the arc extinguishing unit shown in FIG. 41.
Figure 49:
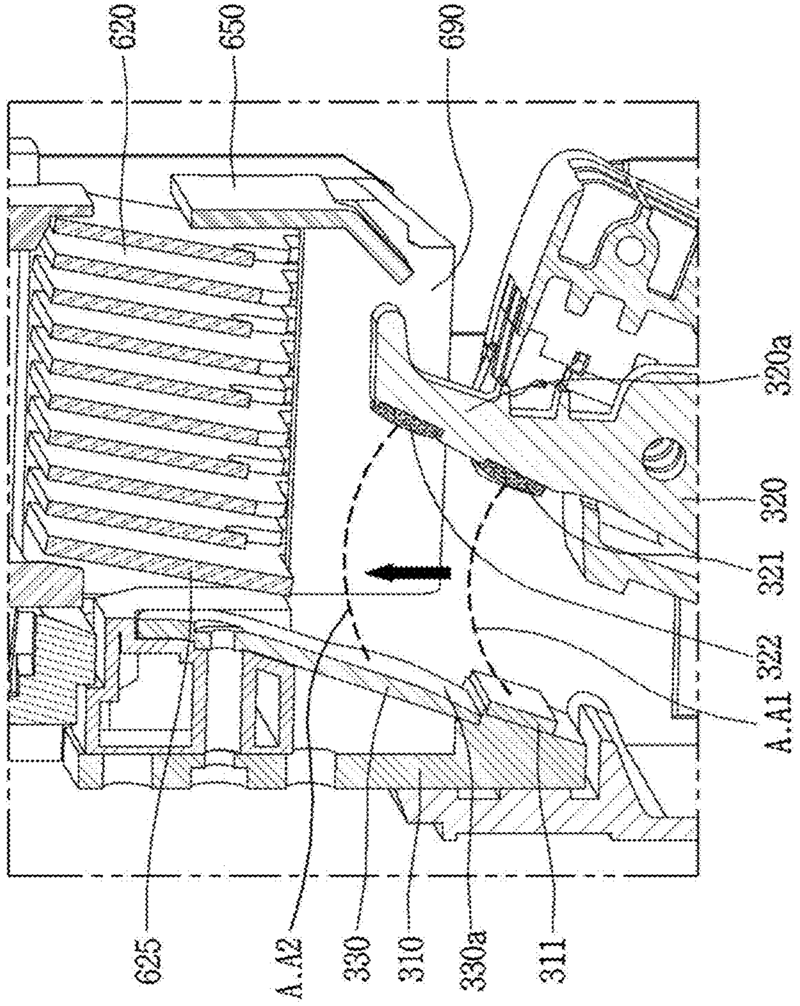
FIG. 49 is a perspective view illustrating a state in which the circuit breaking unit and the arc extinguishing unit shown in FIG. 48 are disposed in a trip state.
Figure 50:
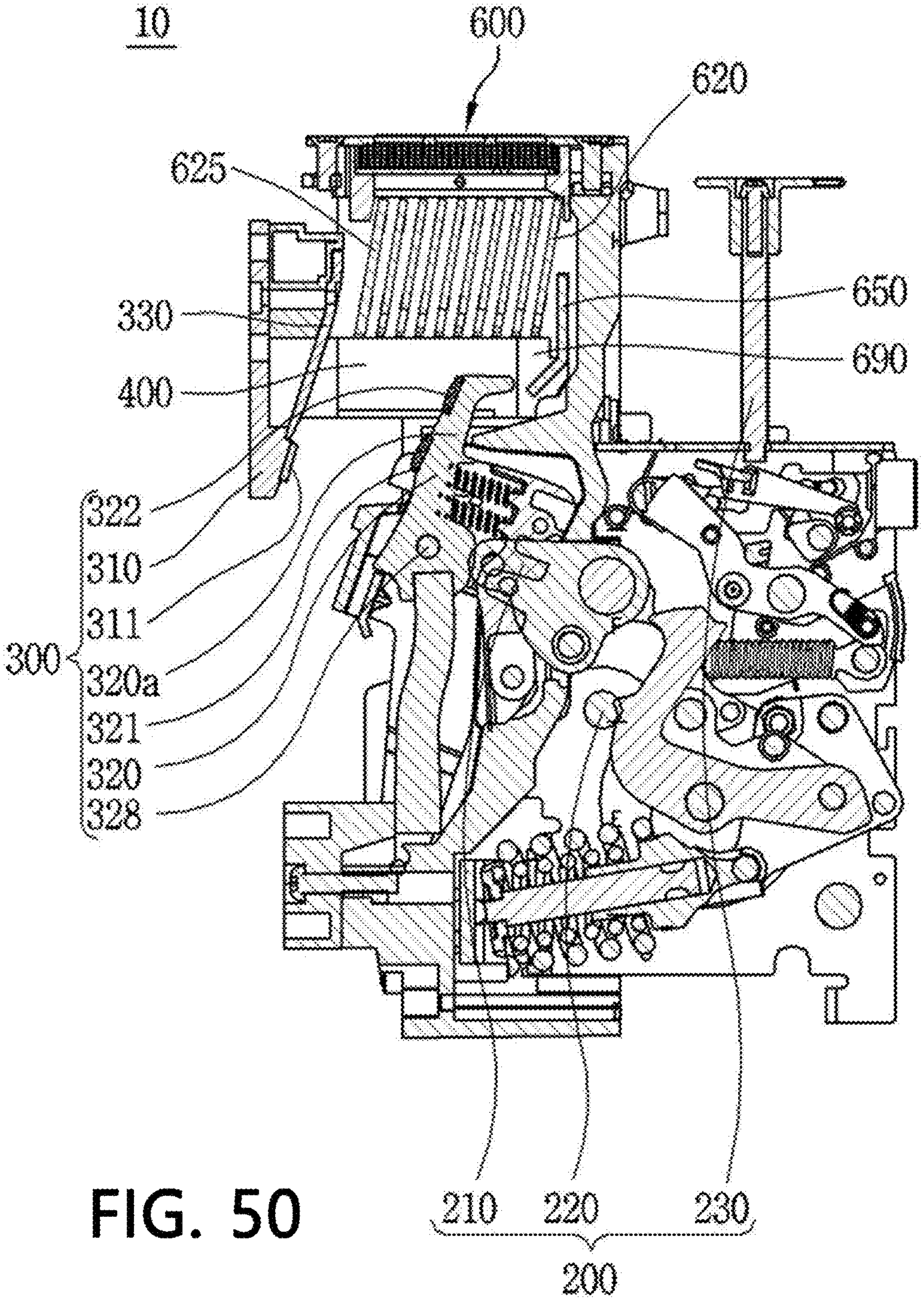
FIG. 50 is a cross-sectional view illustrating a state in which a rear cover is removed from an air circuit breaker in which a U assembly is additionally disposed according to yet another exemplary embodiment of the present disclosure.

Specifically, referring to FIG. 47(*a*), an air gap A.G is formed between the second protective part 690 and the protruding contact 322.

In this case, the length of the air gap A.G is the distance between the second protective part 690 and the protruding contact 322. In this case, compared to the case where the second protective part 690 is not provided, the length of the air gap A.G is formed shorter.

That is, since the second protective part 690 is disposed, the length of the air gap A.G between the second protective part 690 and the protruding contact 322 is formed shorter than the length of the existing air gap A.G between the grid leg 621 and the protruding contact 322 or the length of the first protective part 680 and the protruding contact 322.

Through this, the space in which the arc is generated is reduced, and the pressure generated due to the generation of the arc increases, thereby increasing the rising force for the generated arc to rise.

Meanwhile, the first protective part 680 may further include a mounting portion 683 protruding downward from the arc runner 650 and having coupling grooves 684*a* and 684*b* into which a coupling member for coupling with the side plate 610 can be inserted.

Figure 43:
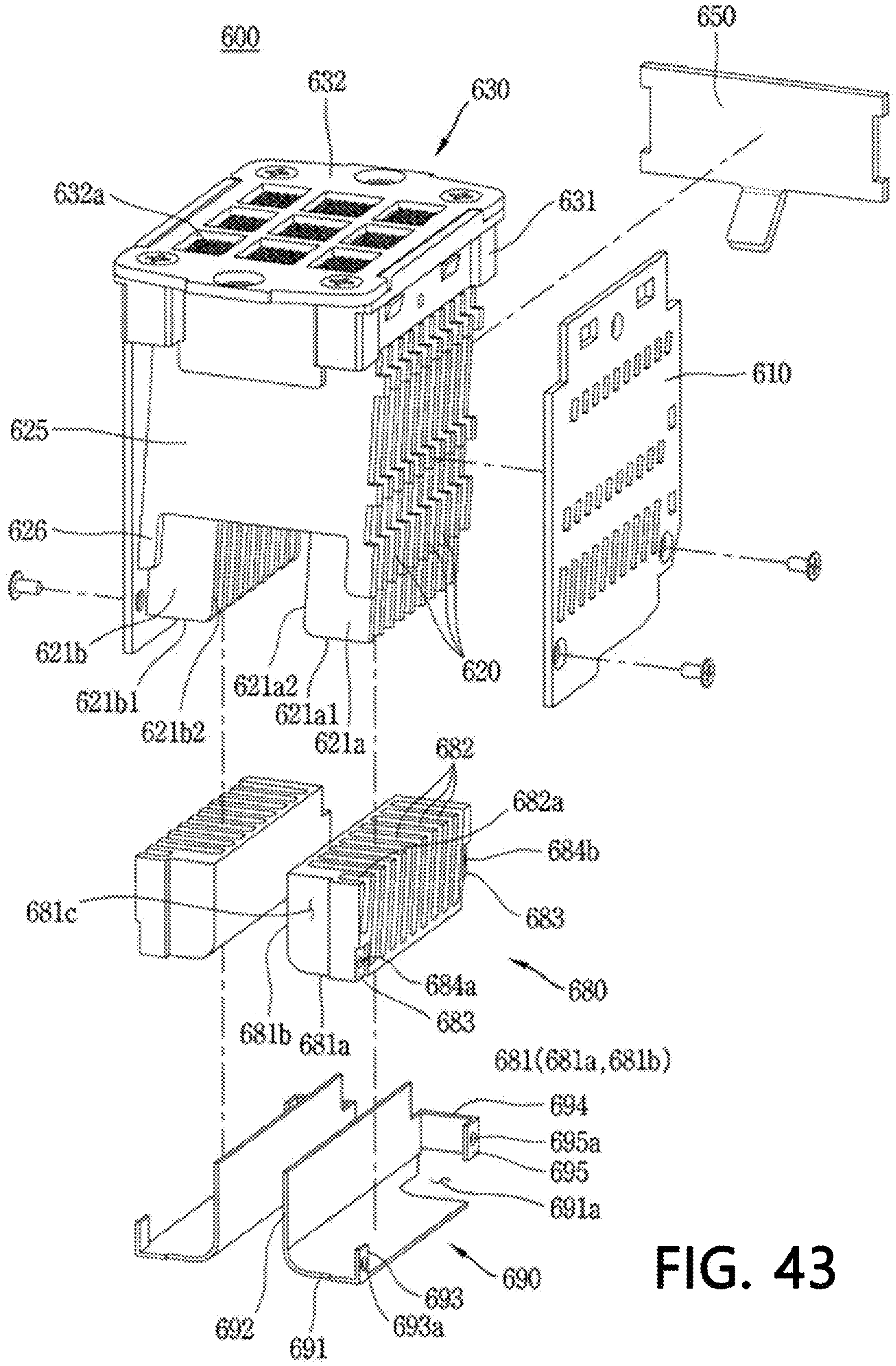
Figure 44:
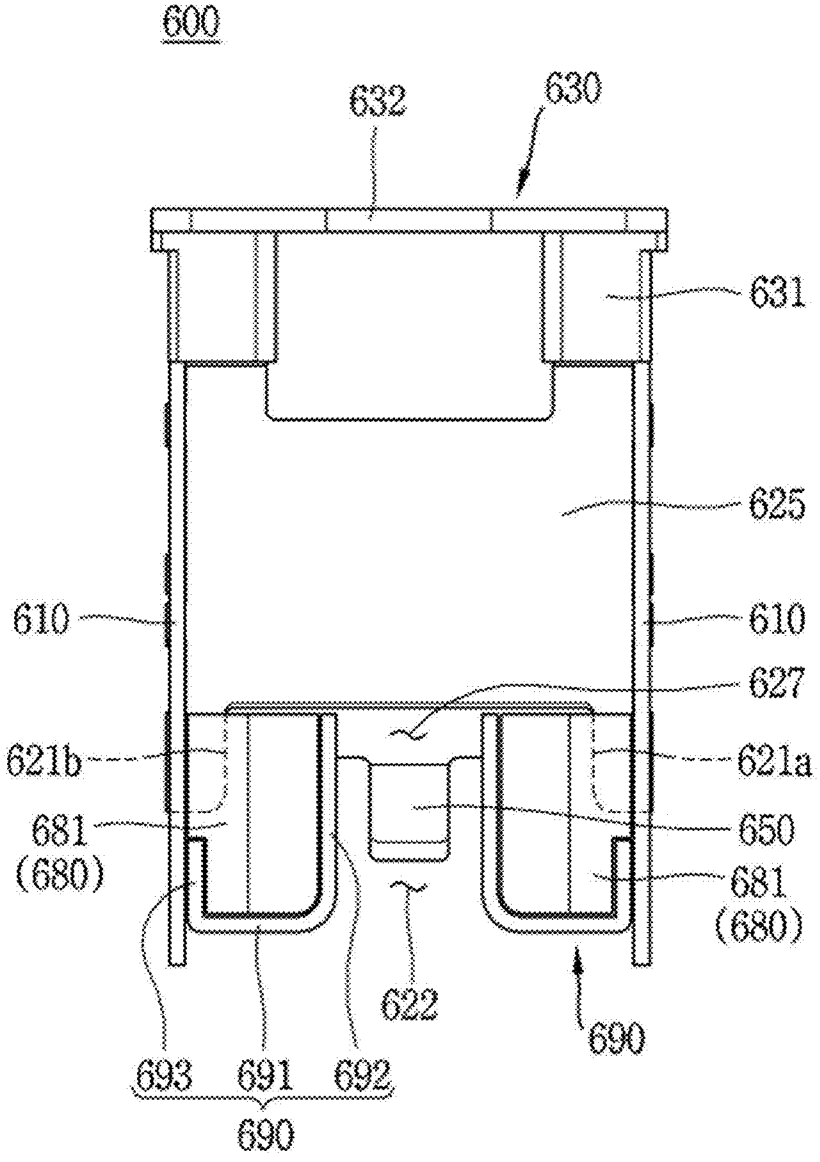
FIG. 44 is a front view illustrating an exemplary embodiment of the arc extinguishing unit shown in FIG. 41.
Figure 45:
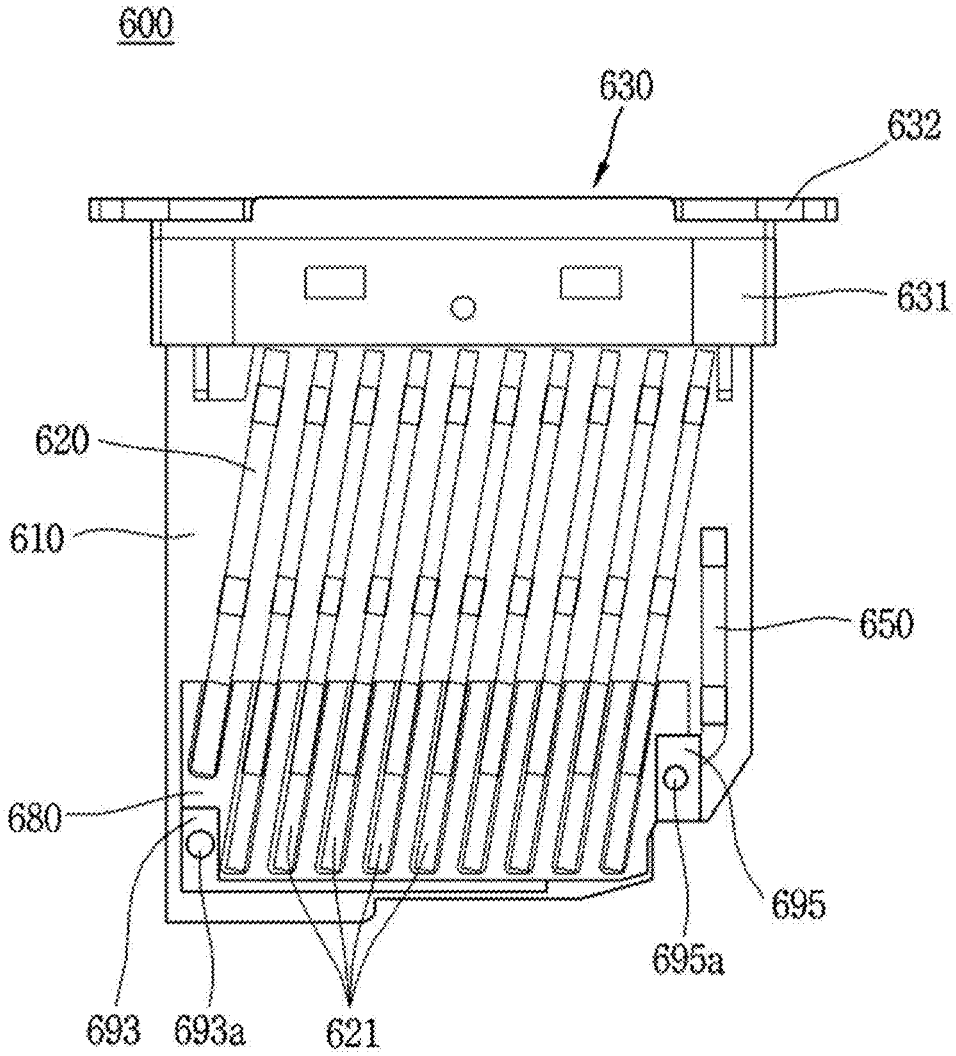
FIG. 45 is a side view illustrating an exemplary embodiment of the arc extinguishing unit shown in FIG. 41.
Figure 46:
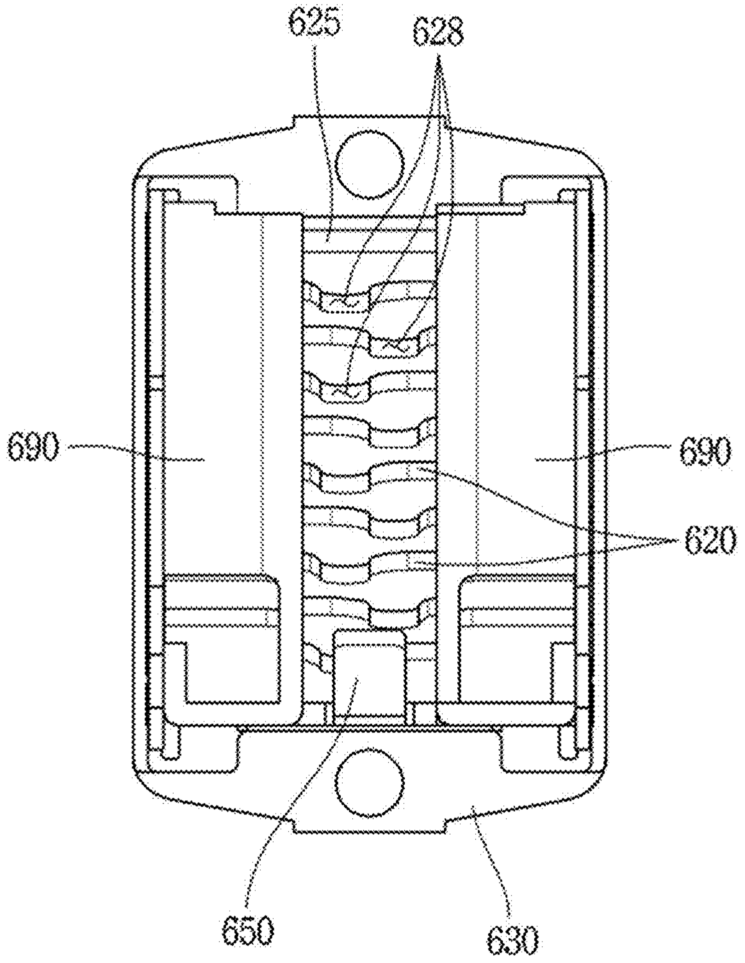
FIG. 46 is a bottom view illustrating an exemplary embodiment of the arc extinguishing unit shown in FIG. 41.
Figure 51:
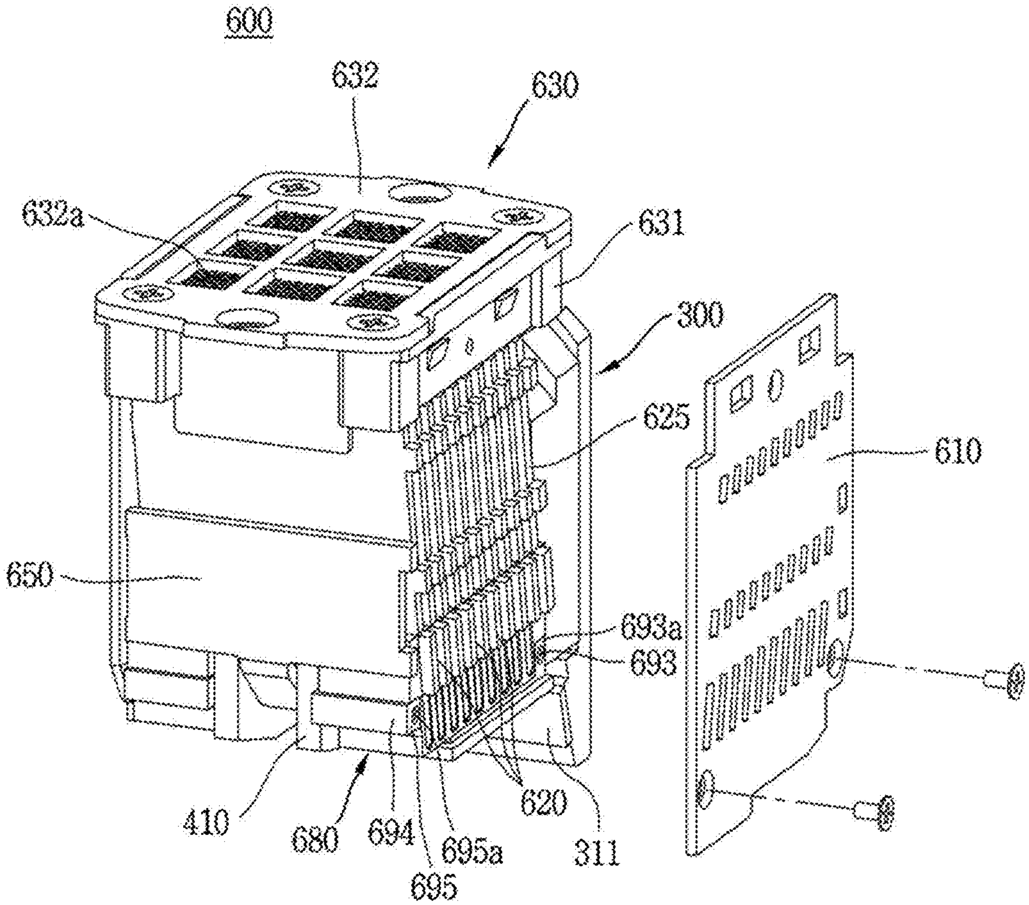
FIGS. 51 and 52 are perspective views illustrating an arc extinguishing unit provided in the air circuit breaker of FIG. 50.
Figure 52:
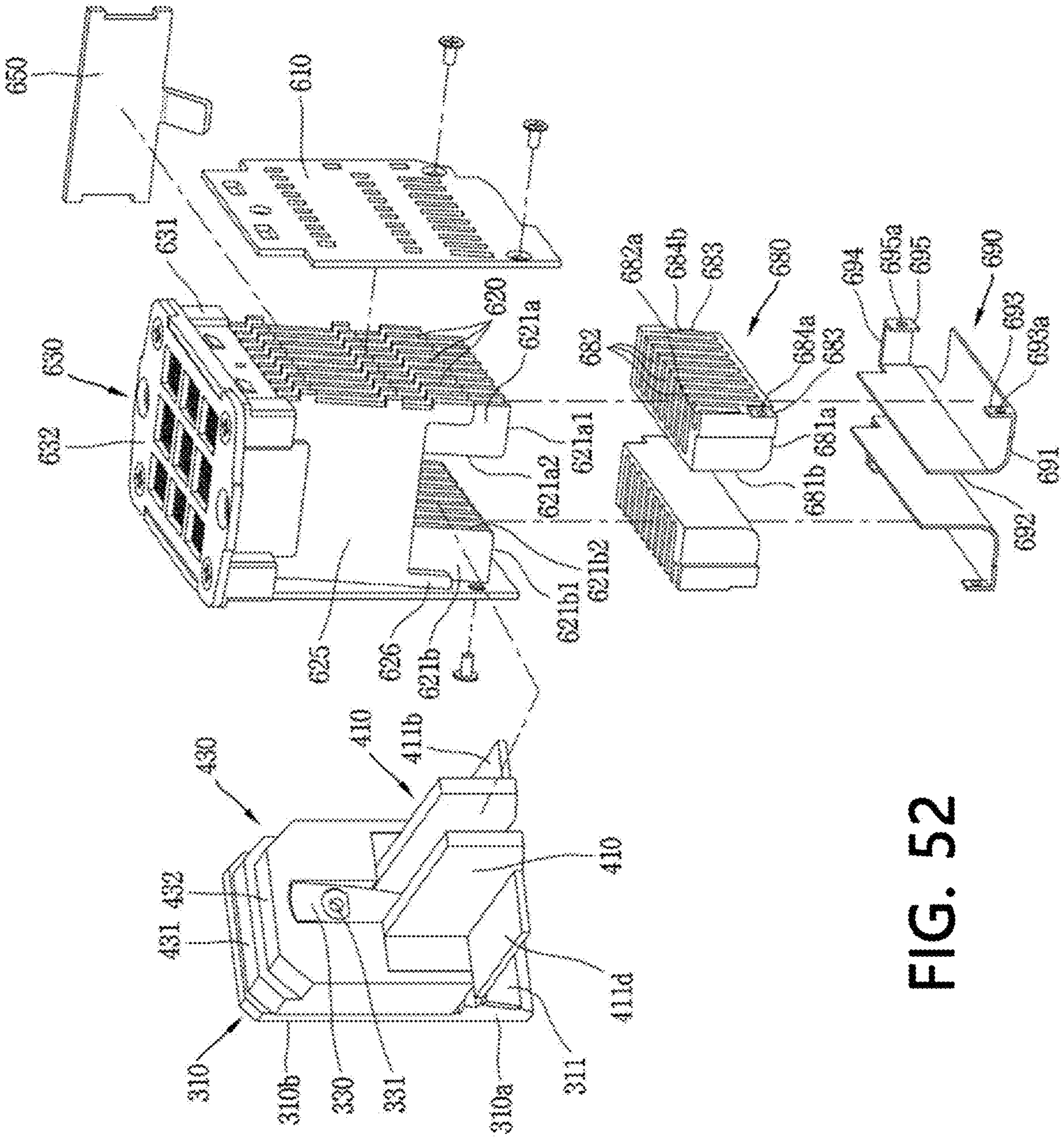
Figure 53:
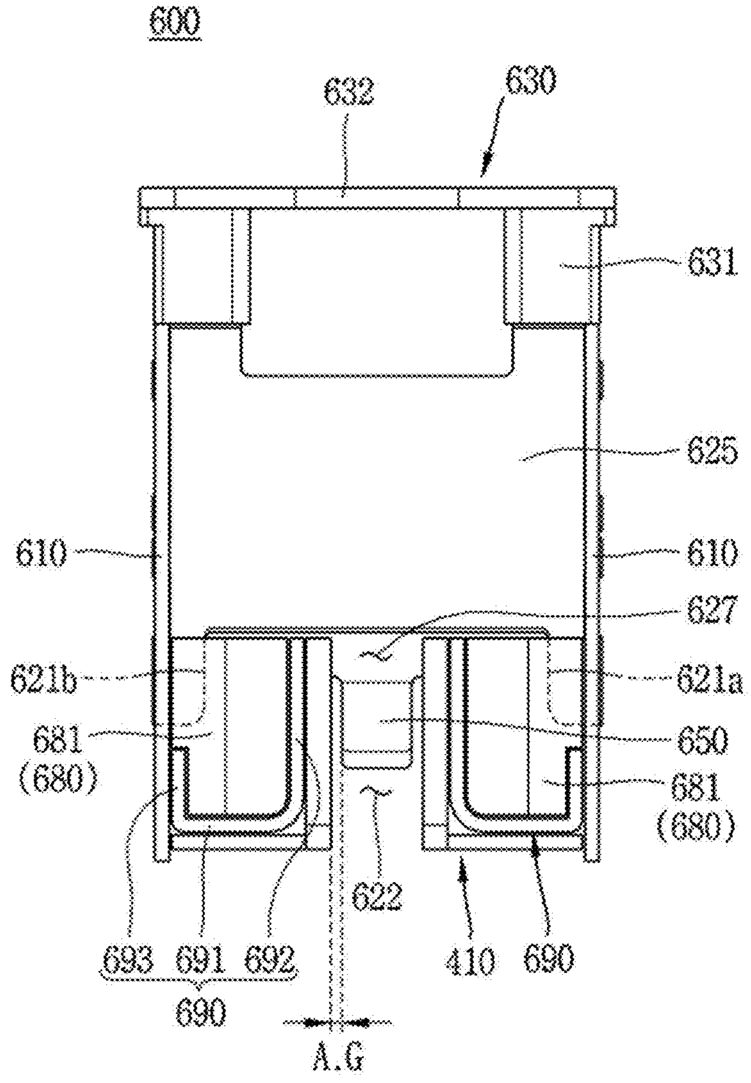
FIG. 53 is a front view illustrating the circuit breaking unit and the arc extinguishing unit shown in FIG. 50.
Figure 54:
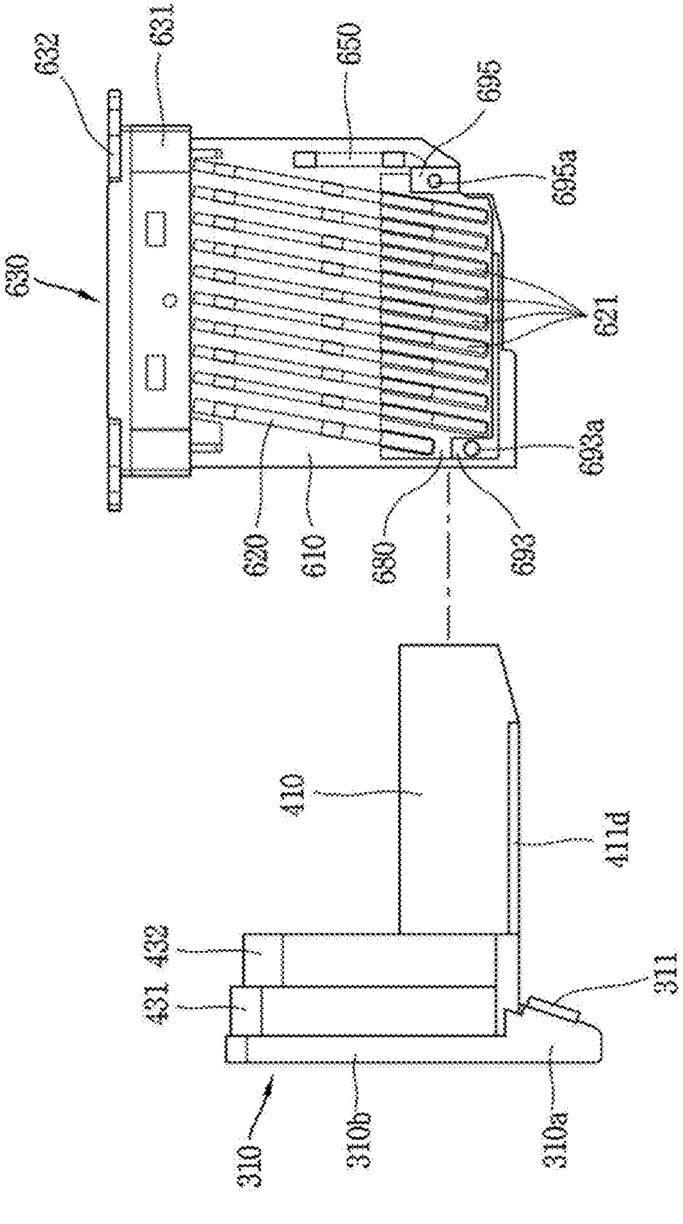
FIG. 54 is a side view illustrating the arc extinguishing unit and the U assembly shown in FIG. 50.
Figure 55:
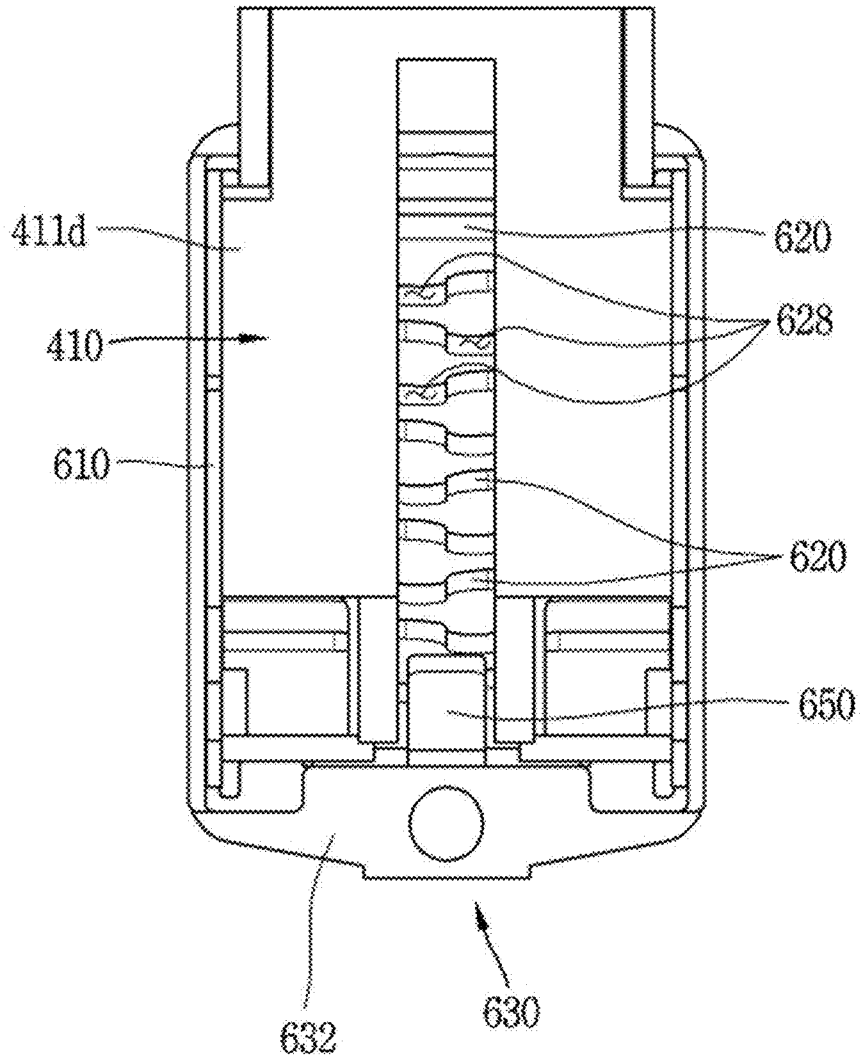
FIG. 55 is a bottom view illustrating the arc extinguishing unit shown in FIG. 50.

Referring to FIGS. 43 and 51, the mounting portion 683 is formed concave inward from the lower side of the arc runner 650.

The mounting portion 683 may be formed concave inward in the first protective part 680 so that the third portion 693 and the fifth portion 695 of the second protective part 690 may be inserted between the side plate 610 and the first protective part 680.

The mounting portion 683 is formed so that the third portion 693 and the fifth portion 695 of the second protective part 690 can be inserted without causing a step difference between the side plate 610 and the first protective part 680. That is, due to the mounting portion 683, the first protective part 680, the second protective part 690, and the side plate 610 may be coupled to each other without causing a step difference in the longitudinal direction.

According to an embodiment of the present disclosure, the first protective part 680 may surround the plurality of grid legs 621 and be coupled to the side plate 610 to protect the grid leg 621 from an arc that is generated and to further reduce the separation of the grid 620 from the side plate 610 when an arc is applied to the grid 620.

The second protective part 690 is disposed below the first protective part 680 and is formed to surround at least a portion of an area where the first protective part 680 is exposed to the outside.

Specifically, referring to FIG. 43, the second protective part 690 is disposed below the first protective part 680 to surround two surfaces of the first protective part 680 that are bent to each other. Accordingly, an area of the first protective part 680 exposed to the outside from inside the arc extinguishing unit 600 can be minimized. Specifically, the first protective part 680 may not be exposed to the outside along a path through which the protruding contact 322 passes. As the first protective part 680 is surrounded by the second protective part 690, deterioration of the first protective part 680 by an arc or impact caused by an arc may be reduced.

The second protective part 690 may be disposed between the first protective part 680 and the protruding contact 322. Specifically, referring to FIG. 47, the second protective part 690 is disposed between the first protective part 680 and the protruding contact 322. That is, the inner surface of the second protective part 690 is disposed in contact with the first protective part 680, and the outer surface of the second protective part 690 is disposed spaced apart from the protruding contact 322.

The second protective part 690 may be formed long along the longitudinal direction of the side plate 610 and surrounding the first protective part 680. Accordingly, it may be formed to surround the entire longitudinal direction of the first protective part 680 disposed below the arc extinguishing unit 600. However, in another embodiment, the second protective part 690 may be formed to surround only a portion of the first protective part 680.

The second protective part 690 is formed to surround the first protective part 680 on at least two surfaces, and thus, may protect the first protective part 680 in a lower region of the arc extinguishing unit 600 where an arc may be generated while the protruding contact 322 passes under the arc extinguishing unit 600.

As shown in FIG. 43, the second protective part 690 is provided in plurality, and may be formed to surround the first protective part 680 formed to face each other by being coupled to the side plate 610, respectively.

Hereinafter, a detailed structure of the second protective part 690 will be described.

The second protective part 690 includes a first portion 691 formed to cover the first surface 681*a* of the first protective part 680, and a second portion 692 formed to cover the second surface 681*b* of the first protective part 680 and extending by being bent with the first portion 691.

The first portion 691 may cover the first surface 681*a*, which is the lower surface of the first protective part 680. In addition, as shown in FIG. 43, a recessed portion 691*a* concavely formed according to the shape of the side plate 610 may be formed on the rear side of the first protective part 680, that is, on the side far from the fixed contact 311. As the recessed portion 691*a* is formed in the first protective part 680, the lower portion of the arc extinguishing unit 600 may be slimmed down. Accordingly, when the arc extinguishing unit 600 is inserted into the circuit breaking unit, it is possible to prevent the lower end of the arc extinguishing unit 600 from being caught.

The second portion 692 may be formed to surround surfaces of the first protective part 680 facing each other. Accordingly, the second portion 692 may prevent an arc generated when the protruding contact 322 passes under the arc extinguishing unit 600 from contacting the first protective part 680.

In addition, the second protective part 690 may include a third portion 693 to a fifth portion 695.

Specifically, the third portion 693 may be bent with the first portion 691 and may extend between the first protective part 680 and the side plate 610 to be coupled to the first protective part 680 and the side plate 610.

The fourth portion 694 may be bent with the second portion 692 and extend, and may be formed to surround a direction away from the fixed contact 311 of the first protective part 680. The fourth portion 694 may be formed to surround the rear surface (a surface far from the fixed contact 311) of the first protective part 680.

The fifth portion 695 may be bent with the fourth portion 694 and extend between the first protective part 680 and the side plate 610 to be coupled to the first protective part 680 and the side plate 610.

The third portion 693 and the fifth portion 695 may be formed to be inserted into the mounting portion 683 of the first protective part 680. Specifically, referring to FIG. 43, the third portion 693 and the fifth portion 695 are inserted into the concave mounting portion 683 formed in the first protective part 680, so that the first protective part 680, the second protective part 690 and the side plate 610 may not have a step difference from each other.

And, coupling holes 693*a* and 695*a* may be formed in the third portion 693 and the fifth portion 695 so that a coupling member inserted from the outside of the side plate 610 is inserted. Accordingly, the coupling member penetrating the side plate 610 from the outside of the side plate 610 passes through the coupling hole 693*a* of the third portion 693 and the coupling hole 695*a* of the fifth portion 695.

And, the coupling member passing through the coupling hole 693*a* of the third portion 693 and the coupling hole 695*a* of the fifth portion 695 is coupled to the coupling grooves 684*a* and 684*b* formed in the first protective part 680.

Coupling holes 693*a* and 695*a* are formed in the third portion 693 and the fifth portion 695, the coupling member coupled from the outside of the side plate 610 of the arc extinguishing unit 600 passes through the coupling holes 693*a* and 695*a*, and the passed-through coupling member is coupled to the coupling grooves 684*a* and 684*b* formed in the first protective part 680, and thus, there is an effect that the side plate 610, the second protective part 690, and the first protective part 680 of the arc extinguishing unit 600 can be firmly coupled to each other.

The second protective part 690 may include a gassing material that generates molecules that extinguish the arc when heat generated by the arc generated when the movable contact and the fixed contact 311 are spaced apart is applied.

The gassing material generates molecules capable of extinguishing the arc as the arc is applied. Accordingly, the generated arc can be quickly extinguished.

Specifically, when heat generated by an arc is applied to the gassing material, the gassing material releases molecules capable of extinguishing the arc. In other words, the gassing material can generate gases that can extinguish the arc. Through this, the arc generated in the arc extinguishing unit 600 can be quickly extinguished.

In this case, since the second protective part 690 includes the gassing material, damage to the first protective part 680 may be reduced by rapidly extinguishing the arc.

In addition, the second protective part 690 forms an air gap A.G between the protruding contact 322 and the second protective part 690, thereby increasing the pressure in the space where the arc is generated, thereby increasing the rising force of the generated arc.

Referring to FIG. 43, an outermost grid 625 having a relatively short length and width of a grid leg may be included among the grids. The outermost grid 625 is a grid disposed closest to the fixed contact 311 among a plurality of grids.

By forming the width of the outermost grid 625 shorter than that of other grids, it is possible to secure a space required for contacting and separating the fixed contact terminal 310 and the movable contact terminal 320 disposed adjacent to the outermost grid 625 or a space required for arranging various components for inducing an arc.

The outermost grid 625 may also be provided with a grid leg 626. The grid leg 626 of the outermost grid 625 may be formed shorter in length than the grid leg 621 of the grid 620. And, the grid leg 626 of the outermost grid 625 may be formed narrower in width than the other grid leg 621.

(3) Description of the Arc-Guided Path A.P by Magnetic Field

Referring to the FIG. 56, a magnetic field formed in the circuit breaking unit 300, electromagnetic force applied to the arc, and an arc-guided path A.P will be described below.

DC air circuit breaker 10 according to an embodiment of the present disclosure breaks direct current flowing from the movable contact 321 (the protruding contact 322) to the fixed contact 311 (the low runner 330), or vice versa. Therefore, the arc generated when tripped is also formed in the same direction as the energized direction.

Referring to the drawing, in a trip state in which the fixed contact 311 and the movable contact 321 are spaced apart from each other, a magnetic field area M.F.A in which an electromagnetic force is applied to an arc generated is formed in a space between the low runner 330 and the protruding contact 322 and a space below the grid 620.

The magnetic field area M.F.A may include a magnetic field formed by a permanent magnet and a magnetic field formed by a ferromagnetic body (grid leg 621) disposed around an area where an arc is generated.

For example, the ferromagnetic body disposed around the area where the arc is generated may be induced to form a magnetic field in a direction obstructing the magnetic field caused by the current of the generated arc. This can be referred to as an induced magnetic field of a ferromagnetic body.

Referring to FIG. 47, a magnetic field is induced in the grid leg 621 by an arc generated under the arc extinguishing unit 600, and this is a diagram for explaining the direction in which an electromagnetic force by the magnetic field induced in the grid leg 621 is applied to the generated arc.

Referring to FIG. 47(*b*), the direction of the current of the arc generated when the air circuit breaker 10 is tripped flows from the movable contact 321 (the protruding contact 322) toward the fixed contact 311 (the low runner 330). That is, the current (arc) is formed in a direction of entering toward the paper.

In this case, when considering the current direction of the arc, a magnetic field B1 is formed in a direction surrounding the arc generated by Ampere's right-handed screw rule, that is, in a clockwise direction with respect to the drawing.

A magnetic field B2 induced in a direction obstructing the magnetic field B1 generated by the arc is generated in the grid leg 621. At this time, instantaneously, the first grid leg 621*a* may be magnetized to the N pole, and the second grid leg 621*b* may be magnetized to the S pole.

And, by the induced magnetic field B2, the arc is subjected to an electromagnetic force F2 toward the arc extinguishing unit 600, i.e., the upper side, according to Fleming's left-hand rule. In this case, the arc-guided path A.P is toward the same upper side as the direction of the electromagnetic force F, and accordingly, the generated arc can be quickly applied to the grid 620.

As the electromagnetic force is applied to the arc to move along the arc-guided path A.P, the arc may be applied toward the grid 620 or the grid leg 621 of the arc extinguishing unit 600.

In addition, as described above, by forming the air gap A.G between the protruding contact 322 and the second protective part 690, the pressure applied to the generated arc increases, so that a force for the arc to rise toward the arc extinguishing unit 600 is generated.

Therefore, the force applied to the arc is the electromagnetic force F2 due to the magnetic field induced in the grid leg 621 and the rising force due to the pressure caused by the air gap A.G. Accordingly, the arc can be more easily applied to the arc extinguishing unit 600 and the grid 620.

According to an embodiment of the present disclosure, the electromagnetic force received by the arc is directed upward by the magnetic field induced by the grid leg 621 regardless of the direction of the current of the arc generated during tripping. Accordingly, as the arc is applied to the grid 620, the arc can be quickly extinguished.

Furthermore, according to an embodiment of the present disclosure, the space where the arc generated during tripping is further reduced by the first protective part 680 and the second protective part 690, so that the pressure applied to the generated arc increases.

Therefore, the arc can be applied to the grid 620 more quickly by adding the electromagnetic force by the magnetic field and the rising force by the pressure.

Figure 56:
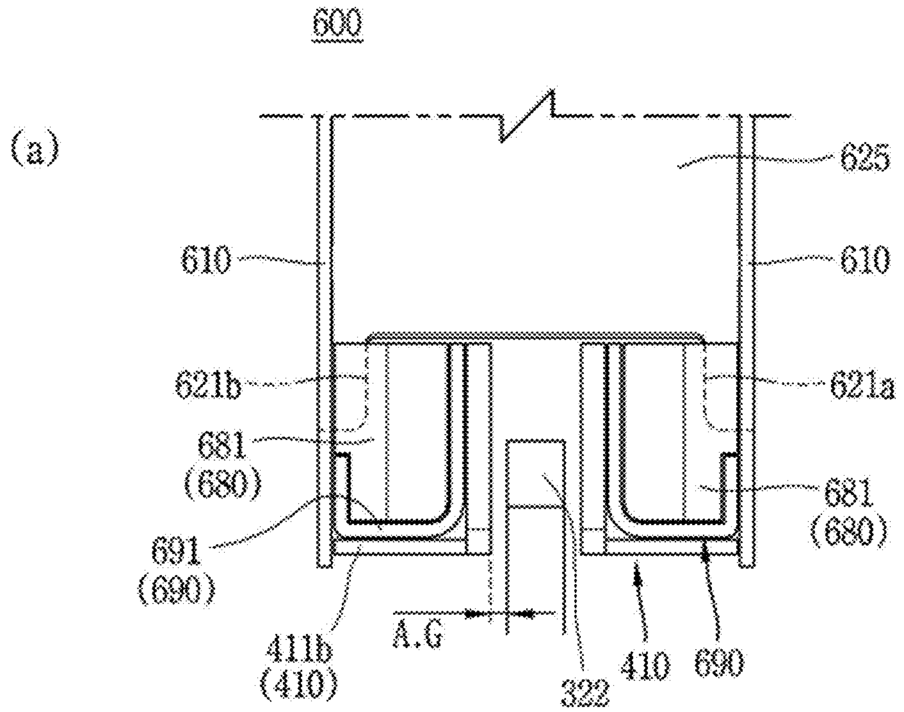
FIG. 56 is a conceptual view of a magnetic field induced in a grid leg and an arc-guided path A.P of an arc in an air circuit breaker shown in FIG. 50.
Figure 56:
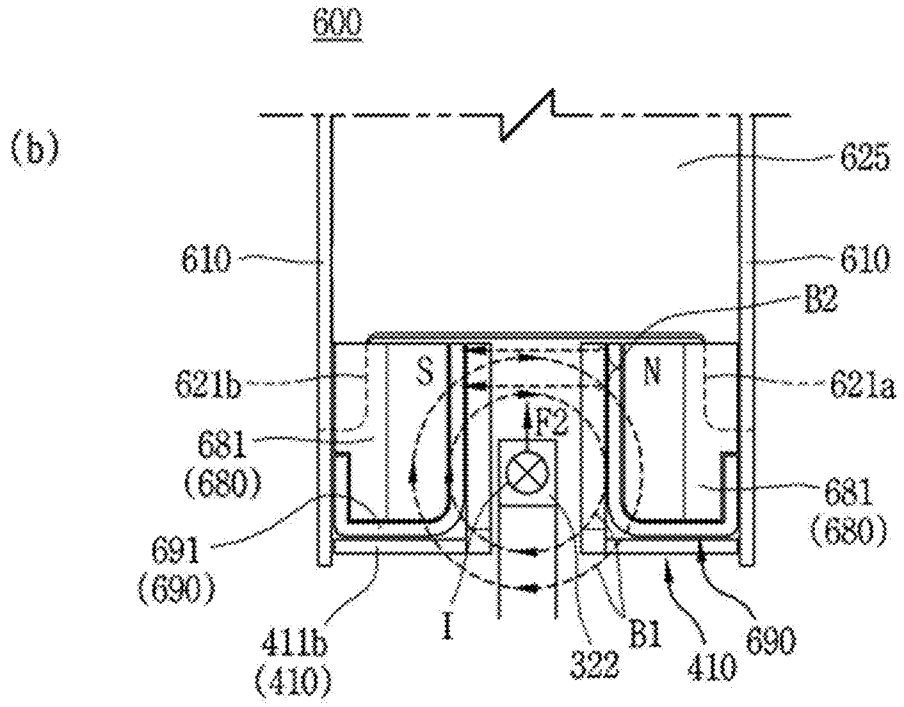

Meanwhile, FIG. 56 shows the electromagnetic force applied to the arc and the arc-guided path A.P when the U assembly 400 is further included. FIG. 56(*b*) shows a case in which an arc is formed in a direction entering toward the paper.

Therefore, referring to FIG. 56, the magnetic field and electromagnetic force are formed in the same direction as that of the above-described FIG. 47. That is, the electromagnetic force formed in the arc and the arc-guided path A.P are formed toward the upper right side.

However, in the embodiment shown in FIG. 56, the air gap A.G between the protruding contact 322 and the U assembly 400 is formed shorter than the air gap A.G between the protruding contact 322 and the second protective part 690 in FIG. 47 described above.

Therefore, in the arc formed in the embodiment of FIG. 56, a greater pressure may be formed in the space where the arc is generated than in the above-described embodiment of FIG. 47. Accordingly, the rising force of the arc may be increased.

(4) An Air Gap (A.G) and Rising Force of Arc

In an embodiment, the protruding contact 322 is disposed to be surrounded by the first protective part 680 and the second protective part 690 surrounding the grid leg 621.

Specifically, referring to FIG. 47, an air gap A.G is formed between the protruding contact 322 and one side surface of the second protective part 690 surrounding the first protective part 680. In this case, the length of the air gap A.G may be shorter than the length of the air gap A.G formed between the grid leg 621 and the protruding contact 322 in the above-described embodiment in which the second protective part 690 is not provided and only the first protective part 680 is provided.

That is, as the length of the air gap A.G is shortened, the pressure applied to the generated arc may be increased. Accordingly, the rising force for the generated arc to rise may be greater.

In yet another embodiment, the protruding contact 322 may be arranged to be surrounded by the U assembly 400 disposed inside the grid leg 621.

Specifically, referring to FIG. 56, an air gap A.G may be formed between the protruding contact 322 and the holder 410 of the U assembly 400. In this case, the grid leg 621 extending below the grid 620, the first protective part 680 surrounding the grid leg 621, and the holder 410 of the U assembly 400 disposed inside the second protective part 690 are disposed.

Accordingly, the length of the air gap A.G between the holder 410 of the U assembly 400 and the protruding contact 322 may be formed shorter than the length of the air gap A.G of the other embodiments described above. Accordingly, as the length of the air gap A.G is shortened, the pressure applied to the generated arc may be increased. Accordingly, the rising force for the generated arc to rise may be greater.

In the present disclosure, by forming an air gap A.G between the protruding contact 322 and the second protective part 690 or the U assembly 400, a pressure applied to an arc generated between the protruding contact 322 and the low runner 330 may be increased, and thus a force to rise may be applied to the generated arc.

An air gap A.G is formed in the area where the arc is generated, thereby reducing the space of the arc-generation area, and accordingly, a pressure applied to the generated arc is increased, so that the generated arc may be subjected to a rising force. Accordingly, the arc can be more easily applied to the grid 620 or grid leg 621, so that it can be quickly extinguished.

Although the above has been described with reference to preferred embodiments of the present disclosure, it will be understood that those skilled in the art can variously modify and change the present disclosure without departing from the idea and scope of the present disclosure described in the claims below.

What is claimed is:

1. An arc extinguishing unit, comprising:
- two side plates spaced apart from each other and disposed to face each other;
- a grid cover disposed between and coupled to the two side plates on a first end of the two side plates;
- a plurality of grids disposed between the two side plates, wherein each grid of the plurality of grids is spaced apart from each, other grid of the plurality of grids and is coupled to the two side plates,
- wherein each grid of the plurality of grids comprises a grid leg extending in a first direction towards a second end of the two side plates, opposite to the first end, to surround a protruding contact disposed to extend in a second direction, opposite to the first direction, from a movable contact;
- a first protective part formed to surround at least a first portion of the grid leg of each grid the plurality of grids, and
- a second protective part formed to surround at least a portion of an area where the first protective part is exposed to an outside of the arc extinguishing unit, wherein the second protective part comprises a gassing material that generates molecules that extinguishes an arc when heat generated by the arc generated when the movable contact and a fixed contact are spaced apart is applied.

2. The arc extinguishing unit of claim 1, wherein the first protective part is formed to be long along a longitudinal direction of the two side plates.

3. The arc extinguishing unit of claim 2, further comprising a third protective part formed to surround a second portion of the grid leg of each grid the plurality of grids,
- wherein the first protective part is coupled to a first side plate of the two side plates and the third protective part is coupled to a second side plate of the two side plates.

4. The arc extinguishing unit of claim 3, wherein the first protective part comprises:
- a first surface surrounding a first surface of the grid leg; and
- a second surface extending at a predetermined angle with respect to the first surface and surrounding a second surface of the first portion of the grid leg facing the second portion of the grid leg of each grid the plurality of grids disposed on an opposing side of that grid relative to the first portion of the grid leg.

5. The arc extinguishing unit of claim 3, wherein the first protective part is spaced apart from the third protective part to define a first air gap between the first protective part and the protruding contact and a second air gap between the third protective part and the protruding contact.

6. The arc extinguishing unit of claim 3, further comprising a fourth protective part formed to surround at least a portion of an area where the third protective part is exposed to the outside of the arc extinguishing unit.

7. The arc extinguishing unit of claim 2, wherein the first protective part defines a plurality of insertion grooves that are spaced apart from each other along the longitudinal direction and into which each first portion for each grid leg of the plurality of grids is inserted thereinto.

8. The arc extinguishing unit of claim 2, wherein the first protective part is coupled to and fixed to a first side plate of the two side plates.

9. The arc extinguishing unit of claim 2, further comprising an arc runner disposed on a first side plate of the two side plates and extending toward the plurality of grids by a predetermined length,
- wherein the first protective part further comprises a mounting portion protruding in the first direction from the arc runner and having a coupling groove into which a coupling member for coupling with the first side plate can be inserted.

10. The arc extinguishing unit of claim 1, wherein the second protective part is formed long along a longitudinal direction of the two side plates and surrounding the first protective part.

11. The arc extinguishing unit of claim 1, wherein the grid leg of an outermost grid of the plurality of grids closest to the fixed contact among the plurality of grids has a width narrower than widths of other grid legs associated with other grids of the plurality of grids.

12. The arc extinguishing unit of claim 11,
- wherein an outermost insertion groove for accommodating the grid leg of the outermost grid of the first protective part is formed to correspond to the width of the grid leg of the outermost grid, and
- wherein a concave region is formed in the first protective part by being recessed in a direction toward the protruding contact of the outermost insertion groove disposed in a direction toward the fixed contact.

13. The arc extinguishing unit of claim 1, further comprising a third protective part formed to surround at least a second portion of the grid leg of each grid the plurality of grids, and
- wherein the first protective part and the third protective part are formed to be long along a longitudinal direction of the two side plates,
- wherein the first protective part is coupled to a first side plate of the two side plates and the third protective part is coupled to a second side plate of the two side plates so that the first protective part and the third protective part face each other, and
- wherein the first protective part and the third protective part each comprise:
  - a first surface surrounding a first surface of the grid leg of each grid of the plurality of grids; and
  - a second surface extending at a predetermined angle with respect to the first surface and surrounding a second surface of the grid leg of each grid of the plurality of grids that faces an opposing side plate of the two side plates, and
- wherein the second protective part comprises:
  - a first portion formed to cover the first surface of the first protective part; and
  - a second portion formed to cover the second surface of the first protective part and extending by being bent with respect to the first portion.

14. The arc extinguishing unit of claim 13, wherein the second protective part comprises:

a third portion that is bent with respect to the first portion, extends between the first protective part and the first side plate to be coupled to the first protective part and the first side plate;

a fourth portion that is bent with respect to the second portion and extends, and is formed to surround a direction away from the fixed contact of the first protective part; and a fifth portion that is bent with respect to the fourth portion and extends between the first protective part and the first side plate to be coupled to the first protective part and the first side plate.

15. The arc extinguishing unit of claim 14, wherein a mounting portion is formed concave inward in the first protective part so that the third portion and the fifth portion can be inserted between the first side plate and the first protective part, and wherein coupling holes are formed in the third portion and the fifth portion to receive a coupling member inserted through the first side plate.

16. The arc extinguishing unit of claim 1, wherein an air gap is formed between the second protective part and the protruding contact.

17. A circuit breaking unit, comprising:

a fixed contact terminal having a fixed contact disposed at a first end thereof and extending in a first direction;

a movable contact terminal comprising a movable contact and configured such that the movable contact is formed to move toward the fixed contact or away from the fixed contact;

a low runner disposed extending in the first direction from the fixed contact, a first end of the low runner coupled to the fixed contact terminal, and a second end of the low runner spaced apart from the fixed contact terminal;

a protruding contact disposed to extend in the first direction from the movable contact and formed to be in contact with the low runner or spaced apart from the low runner, wherein the protruding contact is arranged to be surrounded by a grid leg that extends in a second direction, opposite to the first direction, from both sides of a grid of an arc extinguishing unit; and a U assembly disposed between the low runner and the fixed contact terminal, extending away from the fixed contact terminal and toward the movable contact, and formed to surround a side of the grid leg.

18. The circuit breaking unit of claim 17, further comprising a first protective part formed to surround a first portion of the grid leg, configured to extend in a section in which the movable contact terminal is moved, and disposed between the U assembly and the grid leg.

19. The circuit breaking unit of claim 18, further comprising a second protective part formed to surround a second portion of the grid leg on an opposing side of the first portion of the grid leg that the first protective part surrounds, configured to extend in the section in which the movable contact terminal is moved, and disposed between the U assembly and the grid leg, wherein the first protective part is spaced apart from the second protective part, wherein the U assembly extends between the first protective part and the second protective part.

20. The circuit breaking unit of claim 18, wherein the U assembly comprises:

a holder inserted between the low runner and the fixed contact terminal and protruding from a first side and a second side of the low runner; and a fixing part coupled to the holder and the fixed contact terminal at a first side of the holder so that the holder is not separated from the fixed contact terminal.

21. The circuit breaking unit of claim 20, wherein the holder has a space formed therein, and wherein the U assembly further comprises a U magnetic body stored in the space of the holder and made of a magnetic body.

22. The circuit breaking unit of claim 20, wherein the holder comprises:

a main body surrounding the side of the grid leg; and a side wing portion formed to cover a first surface of the grid leg.

23. The circuit breaking unit of claim 22, wherein the first protective part comprises a first surface surrounding the first surface of the grid leg, and a second surface extending at a predetermined angle with respect to the first surface of the first protective part and surrounding a second surface of the grid leg, wherein the main body surrounds the second surface of the first protective part, and wherein the side wing portion is formed to surround the first surface of the first protective part.

24. The circuit breaking unit of claim 22, wherein an air gap is formed between the main body of the holder and the protruding contact.

25. The circuit breaking unit of claim 17, wherein the protruding contact is disposed adjacent to a first protective part and a second protective part surrounding a grid leg that extends downward from both sides of a grid of an arc extinguishing unit.

26. The circuit breaking unit of claim 25, wherein the first protective part is formed to surround a first portion of the grid leg, and configured to extend in a section in which the movable contact terminal is moved, and wherein the second protective part is disposed between the first protective part and the protruding contact.

27. An arc extinguishing unit, comprising:

two side plates spaced apart from each other and disposed to face each other;

a grid cover disposed between and coupled to the two side plates on a first end of the two side plates;

a plurality of grids disposed between the two side plates, wherein each grid of the plurality of grids is spaced apart from each other grid of the plurality of grids and is coupled to the two side plates, wherein each grid of the plurality of grids comprises a grid leg extending in a first direction towards a second end of the two side plates, opposite to the first end, to surround a protruding contact disposed to extend in a second direction, opposite to the first direction, from a movable contact;

a first protective part formed to surround at least a first portion of the grid leg of each grid the plurality of grids, and a second protective part formed to surround at least a portion of an area where the first protective part is exposed to an outside of the arc extinguishing unit, wherein the grid leg of an outermost grid of the plurality of grids closest to a fixed contact among the plurality of grids has a width narrower than widths of other grid legs associated with other grids of the plurality of grids;

wherein an outermost insertion groove for accommodating the grid leg of the outermost grid of the first protective part is formed to correspond to the width of the grid leg of the outermost grid, and wherein a concave region is formed in the first protective part by being recessed in a direction toward the protruding contact of the outermost insertion groove disposed in a direction toward the fixed contact.

28. An arc extinguishing unit, comprising:

two side plates spaced apart from each other and disposed to face each other;

a grid cover disposed between and coupled to the two side plates on a first end of the two side plates;

a plurality of grids disposed between the two side plates, wherein each grid of the plurality of grids is spaced apart from each other grid of the plurality of grids and is coupled to the two side plates, wherein each grid of the plurality of grids comprises a grid leg extending in a first direction towards a second end of the two side plates, opposite to the first end, to surround a protruding contact disposed to extend in a second direction, opposite to the first direction, from a movable contact;

a first protective part formed to surround at least a first portion of the grid leg of each grid the plurality of grids and coupled to a first plate of the two side plates, a second protective part formed to surround at least a portion of an area where the first protective part is exposed to an outside of the arc extinguishing unit, and a third protective part formed to surround at least a second portion of the grid leg of each grid the plurality of grids, wherein the first protective part is coupled to a first side plate of the two side plates and the third protective part is coupled to a second side plate of the two side plates so that the first protective part and the third protective part face each other, wherein the first protective part and the third protective part each comprise:

a first surface surrounding a first surface of the grid leg of each grid of the plurality of grids; and a second surface extending at a predetermined angle with respect to the first surface and surrounding a second surface of the grid leg of each grid of the plurality of grids that faces an opposing side plate of the two side plates, and wherein the second protective part comprises:

a first portion formed to cover the first surface of the first protective part;

a second portion formed to cover the second surface of the first protective part and extending by being bent with respect to the first portion;

a third portion that is bent with respect to the first portion, extends between the first protective part and a first side plate of the two side plates to be coupled to the first protective part and the first side plate;

a fourth portion that is bent with respect to the second portion and extends, and is formed to surround a direction away from a fixed contact of the first protective part; and a fifth portion that is bent with respect to the fourth portion and extends between the first protective part and the first side plate to be coupled to the first protective part and the first side plate.

* * * * *